US006668253B1

(12) United States Patent
Thompson et al.

(10) Patent No.: US 6,668,253 B1
(45) Date of Patent: Dec. 23, 2003

(54) ENTERPRISE INFORMATION MANAGEMENT SYSTEM AND METHODS

(75) Inventors: Michael R. Thompson, Xenia, OH (US); Tal D. Burkhart, Kettering, OH (US); Lisa D. Smith, Kettering, OH (US); Gregory P. Niehoff, Miamisburg, OH (US); Jamie A. Ward, Kettering, OH (US); Julie L. Horan, Dayton, OH (US); Mark A. Jung, Centerville, OH (US); Rayapa S. Datla, Dayton, OH (US); Safdar R. Syed, Dayton, OH (US); Satya S. Sunkara, West Chester, OH (US); Carol M. Hergenrather, Dayton, OH (US); Mary J. Matthews, Dayton, OH (US); Teresa J. Johnston, Miamisburg, OH (US); Elizabeth E. Campbell-Kaminski, Dayton, OH (US)

(73) Assignee: Reynolds & Reynolds Holdings, Inc., Dayton, OH (US)

( * ) Notice: Subject to any disclaimer, the term of this patent is extended or adjusted under 35 U.S.C. 154(b) by 435 days.

(21) Appl. No.: 09/651,203

(22) Filed: Aug. 30, 2000

(Under 37 CFR 1.47)

Related U.S. Application Data

(60) Provisional application No. 60/153,130, filed on Sep. 8, 1999.

(51) Int. Cl.[7] .............................................. G06F 17/30
(52) U.S. Cl. ....................................................... 707/10
(58) Field of Search .......................... 707/3, 511, 101, 707/100, 104.1, 10, 1; 705/7, 8, 35, 37, 26

(56) References Cited

U.S. PATENT DOCUMENTS

| 5,689,705 A | 11/1997 | Fino et al. .................. 707/523 |
| 5,708,828 A | 1/1998 | Coleman ..................... 707/201 |
| 5,778,386 A | 7/1998 | Lin et al. ....................... 707/10 |
| 5,781,911 A | 7/1998 | Young et al. ................ 707/201 |
| 5,884,310 A | 3/1999 | Brichta et al. ................ 707/10 |
| 6,035,306 A * | 3/2000 | Lowenthal et al. ........... 707/10 |
| 6,070,152 A * | 5/2000 | Carey et al. ................... 705/35 |
| 6,212,524 B1 * | 4/2001 | Weissman et al. .......... 707/101 |
| 6,339,775 B1 * | 1/2002 | Zamanian et al. .......... 707/101 |
| 6,363,353 B1 * | 3/2002 | Chen ....................... 707/104.1 |
| 6,424,979 B1 * | 7/2002 | Livingston et al. .......... 707/511 |

OTHER PUBLICATIONS

Lui et al. Titled "Enterprise Information Systems: Issues, Challenges And Viewpoints " first International Conference on Enterprise Information Systems pp. 1–10.*
Michael R. Genesereth, Arthur M. Keller Oliver and M. Duschka, Titled "Infomaster: An Information Integration System" @ 1997 ACM 0–89791–911–4/97 /0005 pp. 539–542.*

* cited by examiner

Primary Examiner—Diane D. Mizrahi
(74) Attorney, Agent, or Firm—Kirkpatrick & Lockhart, LLP; Stephen C. Glazier

(57) ABSTRACT

A system for enterprise information management includes a data warehouse server; a transformation and staging server connected to the data warehouse server for providing transformed and cleansed data to the data warehouse server; a data source application connected to the transformation and staging server to provide data to the transformation and staging server, wherein the transformation and staging server obtains data from the data source application via requests and places the data into temporary staging tables to prepare for the transformation and cleansing process prior to movement of the data to the data warehouse server; a financial consolidation application connected to the transformation and staging server for performing consolidation and reporting of financial data; a web server connected to the data warehouse server; and a plurality of clients connectable to the web server for accessing data from the data warehouse server via the web server.

34 Claims, 78 Drawing Sheets

| NISSAN | 21,913 | |
|---|---|---|
| OLDSMOBILE | 1,138200 | 449,506 |
| PONTIAC | PRINT ▷ | 6,000 |
| TOYOTA | SHOW TOTALS ▷ | |
| STRAW MITSUB | OUTLINE MODE | 393,549 |
| AUDI | DRILL ▷ | DRILL DOWN ▷ | CARLINE |
| EAGLE | SHOW DETAILS | DRILL UP | MODEL |
| MITSUBIS | SCROLL ROW HEADINGS | DRILL WITHIN ▷ | VEHICLE |
| NISSAN | RESTORE | DRILL ACROSS ▷ | |
| PONTIAC | MAKE PROPERTIES | 12,995 |
| TOYOTA | | 8,600 |
| STRAW NISSAN | ABOUT DSSGRID | 490,937 |

FIG. 6

ACCCODE

| FIELD NAME | FIELD NUMBER | DATA TYPE | NOTES |
|---|---|---|---|
| Accessory Code | 0 | varchar(6) | |
| Accessory Make | 0 | char(2) | Factory Accessory only - STDMAKES code |
| Accessory Year | 0 | char(2) | Factory Accessory only - two digit validation only. |
| Accessory Description | 1 | varchar(30) | |
| Accessory Cost | 5 | money | Stored without decimals, assume 2 decimals. |
| Accessory Type | | | This field will need to be set at the time of the extraction. To determine if the accessory code is Factory or Dealer |

ACCOUNTS

| FIELD NAME | FIELD NUMBER | DATA TYPE | NOTES |
|---|---|---|---|
| Account Number | 0 | varchar(6) | Account number length may change. Project pending to lengthen to 8 or 11 characters. Need to verify length at time of implementation. |
| Account Description | 1 | varchar(51) | |
| Schedule Number | 7 | varchar(4) | |

FIG.27(A)

| ARCUSTOMER | | | |
|---|---|---|---|
| DATA REQUIREMENTS | FIELD NAME | FIELD NUMBER : DATA TYPE | NOTES |
| Name id | KEY | 0 varchar(8) | |
| Charge Account Number | CHARG.ACCT | 21 varchar(6) | This is a valid GL account number |

| BODYSIZE | | | |
|---|---|---|---|
| DATA REQUIREMENTS | FIELD NAME | FIELD NUMBER : DATA TYPE | NOTES |
| Bodysize Code | KEY | 0 char(1) | Codes are predefined. |
| Description | DESC | 1 varchar(10) | CHARXCHECK - type N |

| CARLINE | | | |
|---|---|---|---|
| DATA REQUIREMENTS | FIELD NAME | FIELD NUMBER : DATA TYPE | NOTES |
| Make Code | KEY | 0 char(2) | STDMAKES code |
| Carline Code | KEY | 0 varchar(2) | |
| Carline Description | DESC | 1 varchar(15) | |

FIG.27(B1)

| CASH JOURNAL | | | | |
|---|---|---|---|---|
| DATA REQUIREMENTS | FIELD NAME | FIELD NUMBER | DATA TYPE | NOTES |
| Transaction Id | KEY | 0 | varchar(12) | |
| Reference Number | KEY | 0 | varchar(12) | If the reference number has been reversed, the reference number will be the first part of the key without the -REV extension. |
| Deposit Date | JRNL.DATE | 2 | datetime | Stored in internal format. |
| Total Deposit Amount | TYPE.AMT | 4.MV1 - N | money | Stored without decimals, assume 2 decimals. |
| Cash Line Number | | | | This will be sourced at the time of the extraction. It will be a number representing the position of the detail within the mult-value sequence. This number will be used to group Attributes 5 - 13. |
| GL Receipt Number | RCPT.NO | 5.MV1 - N | varchar(8) | |
| Account Number | ACCT.NO | 6.MV1 - N | varchar(5) | Length of account number may change to len of 8 or 11. |
| GL Account | AMT | 7.MV1 - N | money | Stored without decimals, assume 2 decimals. |
| Control Number | CTRL.NO | 8.MV1 - N | varchar(17) | |
| Description | DESC | 9.MV1 - N | varchar(26) | |

FROM FIG.27(B2)

| Invoice Number | INV.NO | 10.MV1 - N | varchar(10) | |
|---|---|---|---|---|
| Invoice Amount | INV.AMT | 11.MV1 - N | money | Stored without decimals, assume 2 decimals. |
| Invoice Date | INV.DATE | 12.MV1 - N | datetime | Stored in internal format. |
| Invoice Due Date | INV.DUE.DATE | 13.MV1 - N | datetime | Stored in internal format. |
| Reverse Date | REV.DATE | 17 | datetime | Stored in internal format. |
| Receipt Number | RCPT.NO.LIST | 20.MV1 - N | varchar(10) | |
| Receipt Payment Date | RCPT.RECV.DATE | 24.MV1 - N | datetime | |
| Customer Number | CUST.NO | 21.MV1 - N | varchar(8) | |
| Receipt Deposit Code | RCPT.DEP.CODE | 26.MV1 - N | char(1) | Valid entries are 1,2,3. 1=Cash, 2=Check, 3=Credit Card. |
| Receipt Payment Amt | RCPT.DEP.AMT | 27.MV1 - N | money | Stored without decimals, assume 2 decimals. |
| Check #/ Credit Card | RCPT.DTL.ID | 30.MV1 - N | varchar(12) | |
| Employee Number | EMPL.NO | 38.MV1 - N | varchar(8) | |

FIG.27(B2) Cont.

CDJOURNAL

| DATA REQUIREMENTS | FIELD NAME | FIELD NUMBER | DATA TYPE | NOTES |
|---|---|---|---|---|
| Transaction Id | KEY | 0 | varchar(11,4) | |
| Check Number | KEY | 0 | varchar(11) | The check number is the first part of the key to the left of the asterick. |
| Vendor Number | VEND.NO | 1 | varchar(8) | This field will contain a value if the flag in field 10 is equal to a "V". |
| Customer Number | VEND.NO | 1 | varchar(8) | This field will contain a value if the flag in field 10 is equal to a "C". |
| Employee Number | VEND.NO | 1 | varchar(8) | This field will contain a value if the flag in field 10 is equal to a "E". |
| Check Amount | CHK.AMT | 2 | money | Stored without decimals, assume 2 decimals. |
| Check Date | JRNL.DATE | 3 | datetime | Stored in internal format. |
| Disbursement Line No | | | | This will be sourced at the time of the extraction. It will be a number representing the position of the detail within the mult-value sequence. This number will be used to group Attributes 4 - 7 & 23 - 25 & 32 |
| Account Number | ACCT.NO | 4,MV1 - N | varchar(5) | Length of account number may change to len of 8 or 11. |
| Account Amount | AMT | 5,MV1 - N | money | Stored without decimals, assume 2 decimals. |
| Control Number | CTRL.NO | 6,MV1 - N | varchar(17) | |
| Description | DESC | 7,MV1 - N | varchar(26) | |
| Miscellaneous Name | NAME | 8,MV1 | varchar(35) | |
| Misc Name Address | NAME | 8,MV2 | varchar(30) | |
| Misc Name City | NAME | 8,MV3 | varchar(20) | |
| Misc Name State | NAME | 8,MV4 | char(2) | |
| Misc Name Zip | NAME | 8,MV5 | varchar(9) | |
| Misc Name Phone | NAME | 8,MV6 | varchar(11) | |
| Bank Code | BANK.CODE | 9 | varchar(4) | |

FROM FIG.27(C)

| | | | |
|---|---|---|---|
| Vendor-Customer Flag | VC.FLAG | 10 char(1) | This field will contain a C, V, M, or E. C=Customer, V=Vendor, M=Miscellaneous, E=Employee. This field identifies the type of name associated with the name id in attr 1 of the CKJOURNAL. If this field contains an "M" then pull name information form attribute 8. There will not be a lookup table. |
| Check Status | CHK.STAT | 11 char(1) | Valid entries are T, C, N. T=Temporarily cleared, C=Cleared, N=Outstanding. |
| CUC Amount | CUC.AMT | 17.MV1 - N money | Stored without decimals, assume 2 decimals. |
| Reverse Date | REV.DATE | 18 datetime | Stored in internal format. |
| CKJOURNAL | | | |
| DATA REQUIREMENTS | FIELD NAME | FIELD NUMBER  DATA TYPE | NOTES |
| CUC Amount | CUC.ACCT | 21.MV1 - N varchar(6) | |
| Invoice Number | INV.NO | 23.MV1 - N varchar(12) | |
| Invoice Amount | INV.AMT | 24.MV1 - N money | Stored without decimals, assume 2 decimals. |
| Invoice Date | INV.DATE | 25.MV1 - N datetime | Stored in internal format. |
| Stock Number | STK.NO | 26.MV1 - N varchar(8) | |
| Remittance Type | REMIT.TYPE | 28 char(1) | Valid entries are N, F, L, D, C, S. N=No GL distribution, C=Customer GL distribution, S=Standard GL distribution, F=Floorplan, L=Lien, D=Direct. |
| Cancel Date | CNCL.DATE | 31 datetime | Stored in internal format. |
| Lease Number | LS.NO | 32 varchar(8) | |

FIG.27(C) Cont.

CONTROLS

| DATA REQUIREMENTS | FIELD NAME | FIELD NUMBER | DATA TYPE | NOTES |
|---|---|---|---|---|
| Schedule Types | | Attr # | char(1) | This information will come from a record stored within the Controls called "SCHEDULE-TYPES". This field will store the attribute number. |
| Schedule Type Desc | | FM1-8 | varchar(20) | This information will come from a record stored within the Controls called "SCHEDULE-TYPES". This field will store the description associated with each attribute. Ie. 1 = Cash In Bank |
| Control Types | | Attr # | char(1) | This information will come from a record stored within the Controls called "CONTROL-TYPES". This field will store the attribute number. |
| Control Type Desc | | FM1-8 | varchar(20) | This information will come from a record stored within the Controls called "CONTROL-TYPES". This field will store the description associated with each attribute. Ie. 1 = Customer Number |

DEALERMAKES

| DATA REQUIREMENTS | FIELD NAME | FIELD NUMBER | DATA TYPE | NOTES |
|---|---|---|---|---|
| Make Code | MAKE.CODE | 0 | varchar(3) | |
| Make Description | MAKE.DESC | 9 | varchar(30) | Pulled from STDMAKES file. |

FIG. 27(D)

| FIMAST | | | | |
|---|---|---|---|---|
| DATA REQUIREMENTS | FIELD NAME | FIELD NUMBER | DATA TYPE | NOTES |
| Deal/Sales Ref Number | ID | 0 | varchar(6) | |
| Deal/Sales Status | STAT | 2 | char(1) | |
| Customer Number | CUST.NO | 11 | varchar(8) | |
| Deal Date | DEAL.DATE | 12 | datetime | Stored in internal format. |
| New/Used | NJO | 27 | char(1) | |
| Stock Number | STK.NO | 28 | varchar(8) | |
| Over Allowance | VMS.OVER.UNDER.ALW | 49 | money | VMS field only. Amounts stored with upto 2 decimals. |
| Bank Name | BANK.NAME | 111 | varchar(20) | FANDI and SHOWR field only. |
| Terms of Loan | TERM | 136 | | FANDI and SHOWR field only. |
| Terms of Lease | TERM | 136 | | FANDI and SHOWR field only. |
| Vehicle Price | PRICE | 178 | money | FANDI field only. Amounts stored with upto 2 decimals. |
| Sales Tax | S.TAX.AMT | 188 | money | FANDI field only. Amounts stored with upto 2 decimals. |
| Loan/Lease Amount | AMT.FIN | 196 | money | FANDI field only. Amounts stored with upto 2 decimals. |
| Monthly Payment | MP | 203 | money | FANDI and SHOWR field only. Amounts stored with upto 2 decimals. |
| Vehicle Cost | COST.VEH | 216 | money | FANDI field only. Amounts stored with upto 2 decimals. |
| Life Insurance Reserve | LIFE.RES | 220 | | |
| A & H Reserve | AH.RES | 221 | | |
| Warranty Reserve | S.CON.RES | 223 | | |

FROM FIG.27(E)

| | | | | |
|---|---|---|---|---|
| PDI Reserve | PDI.RES | 224 | money | FANDI field only. Amounts stored with upto 2 decimals. |
| Total Insurance Reserve | T.INS.RES | 225 | | |
| Finance Reserve | FIN.RES | 226 | money | FANDI field only. Amounts stored with upto 2 decimals. |
| Net F&I Reserve | NET.FI | 227 | money | FANDI field only. Amounts stored with upto 2 decimals. |
| Net Profit | NET.PFT | 233 | money | FANDI field only. Amounts stored with upto 2 decimals. |
| MBI Reserve | MBI.RES | 236 | | |
| Commission | FIN.COM | 238 | money | FANDI field only. Amounts stored with upto 2 decimals. |
| Total F&I | TFI.RES | 239 | money | FANDI field only. Amounts stored with upto 2 decimals. |
| Lease Monthly Payment | L.MP | 285 | money | FANDI field only. Amounts stored with upto 2 decimals. |
| Holdback Amount | HOLDBACK | 436 | money | This field represents holdback for recap reserve. FANDI field only. |
| Reconditioning Costs | RECOND.CST | 502 | money | FANDI field only. Amounts stored with upto 2 decimals. |
| Trade-In Differential | | 100,506 | | |
| Dlr Accessories | ACC.CODE | 55.MV1 - N | varchar(5) | |
| Fact Accessories | FACT.ACC.CODE | 59.MV1 - N | varchar(6) | |
| Salesman Number | SLS.NO | 70.MV1 - N | varchar(8) | |
| Trade-In-Stock Number1 | TI.STK.NO | 73.MV1 | varchar(8) | |
| Trade-In-Stock Number2 | TI.STK.NO | 73.MV2 | varchar(8) | |
| Trade-In-Stock Number3 | TI.STK.NO | 73.MV3 | varchar(8) | |
| Trade-In-Appraisal Value | TI.ACV | 99.MV1-N | money | Amounts stored with upto 2 decimals |
| Finance Mgr Number | | | | |
| Lien Holder | LIEN.NO | 318 | | FANDI field only. |

FIG.27(E) Cont.

| GL | | | | |
|---|---|---|---|---|
| DATA REQUIREMENTS | FIELD NAME | FIELD NUMBER | DATA TYPE | NOTES |
| Account Number | KEY | 0 | varchar(6) | Length of account number may change to len of 8 or 11. |
| Month | KEY | 0 | char(2) | Month will always be len (will zero fill - Jan. = 01, Feb = 02,...). |
| Year | KEY | 0 | char(2) | Year will remain 2 digit year. Month/Year portion of key will always be 4 digits (MMYY). |
| Beginning Balance | BEG.BAL | 1 | money | Stored without decimals, assume 2 decimals. |
| Ending Balance | END.BAL | 7 | money | Stored without decimals, assume 2 decimals. |

FROM FIG.27(F)

| | | | |
|---|---|---|---|
| Alternate End Of Year Beginning Balance | ALT.BAL | 4,MV1 money | Stored without decimals, assume 2 decimals. |
| Alternate End Of Year Ending Balance | | 4,MV2 money | Stored without decimals, assume 2 decimals. |
| Daily Amount | DAY#.AMT | A10-A40 money | Stored without decimals, assume 2 decimals. |
| Source | SRC | 2,MV1 - N varchar(2) | |
| Journal Transaction Cnt | GL.TRANS.CNT | 3,MV1 - N varchar(4) | |
| Debit Amount | DR.AMT | 5,MV1 - N money | Stored without decimals, assume 2 decimals. |
| Credit Amount | CR.AMT | 6,MV1 - N money | Stored without decimals, assume 2 decimals. |

FIG.27(F) Cont.

JOURNAL

| DATA REQUIREMENTS | FIELD NAME | FIELD NUMBER | DATA TYPE | NOTES |
|---|---|---|---|---|
| Journal Seq Number | KEY | 0 | varchar(12) | Internally generated sequence number. |
| Source | SRC | 1 | varchar(2) | |
| Reference Number | REF.NO | 2 | varchar(12) | Stored in internal format. |
| Journal Date | DATE | 3 | datetime | |
| GL Account | ACCT.NO | 4,MV1 - N | varchar(6) | Length of account number may change to len of 8 or 11. |
| Transaction Amount | AMT | 5,MV1 - N | money | Stored without decimals, assume 2 decimals. |
| Control Number | CTRL.NO | 6,MV1 - N | varchar(17) | |
| Description | DESC | 7,MV1 - N | varchar(26) | |
| Account Prefix | ACCT.PFX.PRT | 9 | char(1) | |
| Journal Prefix | JRNL.PFX | 10 | varchar(5) | |
| Purchase Order Number | PO.NO | 12 | varchar(8) | |
| Bank Code/ Vendor | TRANS.KEY | 14 | varchar(11) | This field represents: for Cash Disbursements it is check number and bankcode: purchases it is invoice number, vendor number and accounts payable GL |

FIG.27(G)

| NAME | | | |
|---|---|---|---|
| DATA REQUIREMENTS | FIELD NAME | FIELD NUMBER | DATA TYPE | NOTES |
| Name Id | KEY | 0 | varchar(8) | This file will contain all general type of information for a name regardless of the type of name. If only need general info this is the file to look at and can verify type of name by name type field. |
| Last Name | LAST.NAME | 1 | varchar(35) | |
| First Name | FIRST.NAME | 2 | varchar(35) | |
| Middle Name | MIDDLE.NAME | 3 | varchar(35) | |
| Full Name | FULL.NAME | 1-desc | varchar(35) | Full name composed of: First Name, Middle Name, Last Name and Suffix. |
| Name Suffix | SUFFIX | 30 | varchar(10) | |
| Street Address 1 | ADDR | | varchar(30) | First line of address - multi value 1 |
| Street Address 2 | ADDR | 9 | varchar(30) | Second line of address - multi value 2 |
| City | CITY | 10 | varchar(20) | |
| County | CNTY | 13 | varchar(20) | |
| State | ST | 11 | char(2) | State code stored, will need to pull description from the STATECODES file (static file). |

| | | | | |
|---|---|---|---|---|
| Zip | ZIP | 12 | varchar(9) | |
| Zip Plus 4 | | | | |
| Business Phone | PHONE.BUS | 19 | varchar(11) | |
| Residence Phone | PHONE.RES | 17 | varchar(11) | |
| Name Types | NAME.TYPE | 9 | char(9) | A name be multiple types defined as follows: pos 1 = S (service customer), pos 2 = P (parts customer), pos 3 = R (Accts. Recv customer), pos 4 = V (Vehicle, Showroom Control), pos 5 = A (Vendor), pos 6 = E (Employee), pos 7 = 0 (Internal), pos 8 = C (Customer), pos 9 = O (Prospect). Position 8 will always be set. if the user has not setup the name as one of the above types the position will contain an X. |
| Employee Types | EMP.TYPE | 34 | char(4) | If the emp name type is set (position 6) in attr 9, then the one or more of the emp types will be set. if employee type set in attr 9 then will be all X's (XXXX). Employee types are represented as follows: position 1 = C (counterperson), pos2 = T (technician / advisor), pos 3 = S (salesperson), pos4 = P (payroll employee). |

FIG.27(H) Cont.

| NEWSTATUS | | | | |
|---|---|---|---|---|
| DATA REQUIREMENTS | FIELD NAME | FIELD NUMBER | DATA TYPE | NOTES |
| NewVehicle Status Code | KEY | 0 | varchar(2) | This file only holds the statuses the user has setup for the sales area in 4158 (established as valid codes). |
| NewVehicle Status Desc | DESC | 1 | varchar(10) | |

FIG.27(I)

| 2N/INVENTORY | | | |
|---|---|---|---|
| DATA REQUIREMENTS | FIELD NAME | FIELD NUMBER | DATA TYPE | NOTES |
| Stock# | STK.NO | 0 | varchar(8) | This file contains two types of vehicles, in stock and on order. The on order vehicles are identified by their record ID. The stock number is concatenated with a *0 (12345*0). |
| Model# | MDL.NO | 1 | varchar(7) | |
| Make | MAKE | 2 | char(2) | |
| Carline Description | CARLINE | 3 | varchar(15) | |
| Model Description | DESC | 4 | varchar(20) | |
| Model Year | YR | 5 | tinyint | |
| Serial# | SER.NO | 6 | varchar(17) | |
| Engine# | ENG.NO | 8 | varchar(20) | |
| Vendor Name | VENDOR.NO | 11 | varchar(8) | |
| Purchase Date | PURCH.DATE | 12 | datetime | Stored in internal format. |
| Status Code | STATUS.CODE | 21 | tinyint | Vehicle status code = 1 to 16, 1-13 predefined, 14-16 user defined. |

FROM FIG.27(12)a

| | | | | |
|---|---|---|---|---|
| Deal Number | DEAL.NO. | 24 | varchar(6) | |
| Make Code | MDL.ACCTG.MK | 27 | char(2) | |
| Floor Plan Amount | FLRPLN.AMT | 28 | money | Stored without decimals, assume 2 decimals. |
| BodySize | BODYSIZE | 29 | char(1) | |
| Sales Cost | SLS.COST | 31 | money | Stored without decimals, assume 2 decimals. |
| Location | LOC | 34 | varchar(10) | |
| Sales Code | SLS.CODE | 35 | varchar(4) | |
| Payoff Date | FLRPLN.PAYOFF.DATE | 36 | datetime | Stored in internal format. |
| Received Date | RCPT.DATE | 37 | datetime | Stored in internal format. |
| Order Date | ORD.DATE | 38 | datetime | Stored in internal format. |
| List Price | LIST.PRICE | 39 | money | Stored without decimals, assume 2 decimals. |
| Current Interest Rate | FLRPLN.INTR.RATE | 40 | varchar(5) | This field represents a percentage. Stored without decimals, assume 2 decimals. |
| Miles Per Gallon | MIL.PER.GAL | 41 | varchar(5) | This is validated on input for a dash and is stored with a dash for a MPG range (ON-ON). |
| Number Of Cylinders | NO.OF.CYL | 43 | tinyint | |

FIG.27(12)a Cont.

| NV INVENTORY | | | | |
|---|---|---|---|---|
| DATA REQUIREMENTS | FIELD NAME | FIELD NUMBER | DATA TYPE | NOTES |
| Interest Start Date | INTR.START.DATE | 44 | datetime | Stored in internal format. |
| Order Number | FACT.ORD.NO | 51 | varchar(8) | When adding a vehicle to stock through Exec. 4006. if you attach an order to it (pull order record in) it stores the order number here. This field may also be null. |
| Floorplan Vendor Number | FLRPLN.VEND | 65 | varchar(8) | |
| Factory Accessories | FACT.ACC.CODE | 17.MV 1- N | varchar(6) | |
| Accessory Cost | FACT.ACC.AMT | 18.MV 1- N | money | Stored without decimals. assume 2 decimals. |
| Dealer Accessories | DLR.ACC.CODE | 19.MV 1- N | varchar(5) | |
| Accessory Cost | DLR.ACC.AMT | 20.MV 1- N | money | Stored without decimals. assume 2 decimals. |
| Exterior Color | CLR.CODE | 7 | varchar(4) | Each multivalue could contain both an exterior and interior color. The color codes are stored with a slash (/) as the delimiter.    I.e. Ext clr code/Int clr code |
| Interior Color | CLR.CODE | 7 | varchar(4) | Each multivalue could contain both an exterior and interior color. The color codes are stored with a slash (/) as the delimiter.    I.e. Ext clr code/Int clr code |
| Trim | TRIM | 109 | | Tracked to wo# 7856.1103 prog# js188 KIOSK/CUSTOMER INTERFACE project |
| Vehicle Type | | | | This field will be sourced with a letter "N" for a new vehicle. |
| Inventory Amount | | | money | (ERA) Need to call subroutine "GETINVAMT" to calculate cost to date. |
| Production Date | | | datetime | This appears to be used vehicle field only. |
| Charges To Date | | | | (ERA) Need to call subroutine "FLRPLNCHARG" to calculate charges to date |

FIG.27(I2)b

NV MODEL

| DATA REQUIREMENTS | FIELD NAME | FIELD NUMBER | DATA TYPE | NOTES |
|---|---|---|---|---|
| Model Number | KEY | 0 | varchar(10) | |
| Make | KEY | 0 | varchar(2) | |
| Model Description | DESC | 1 | varchar(10) | |
| Carline Code | CARLINE.CODE | 2 | varchar(2) | |
| Cost Pack | COST.PACK.AMT | 11 | money | Stored without decimals, assume 2 decimals. |

FIG.27(I3)

| NVSJOURNAL | | | | |
|---|---|---|---|---|
| DATA REQUIREMENTS | FIELD NAME | FIELD NUMBER | DATA TYPE | NOTES |
| Transaction Id | KEY | 0 | varchar(12) | |
| Reference Number | KEY | 0 | varchar(12) | If the reference number has been reversed, the reference number will be the first part of the key without the -REV extension. |
| Sales_Journal_Type | | | | This field will be set at extraction time. The value will be "N" to represent .NVSJOURNAL. |
| Sale Date | JRNL.DATE | 1 | datetime | Stored in internal format. |
| Stock Number | STK.NO | 2 | varchar(8) | |
| Customer Number | CUST.NO | 3 | varchar(8) | |
| Sale Type | SALE.TYPE | 4 | char(1) | Valid entries are R, F, I, O. R=Retail, F=Fleet, I=Internal, O=Other |
| Sale Amount | SALE.AMT | 9 | money | Stored without decimals, assume 2 decimals. |
| Vehicle Cost | COST.AMT | 10 | money | Stored without decimals, assume 2 decimals. |
| Accessory Due Cost | ACC.DUE.COST | 11 | money | Stored without decimals, assume 2 decimals. |
| Accessory Sale Amount | ACC.SALE | 12 | money | Stored without decimals, assume 2 decimals. |
| Accessory Cost Amount | ACC.COST | 13 | money | Stored without decimals, assume 2 decimals. |

FIG.27(J)

| SCHEDMASTER | | | | |
|---|---|---|---|---|
| DATA REQUIREMENTS | FIELD NAME | FIELD NUMBER | DATA TYPE | NOTES |
| Schedule Number | KEY | 0 | varchar(4) | |
| Schedule Name | SCHED_NAME | 1 | varchar(41) | |
| Schedule Type | TYPE | 2 | char(1) | Valid types are 1-8. 1=Cash in Bank; 2=Aged Receivable; 3=Warranty; 4=Controlled; 5=Audit; 6=Sublet; 7=Finance Reserve; 8=Lease Aged Receivable. |
| Control_Number_Type | CTRL_TYPE | 6 | char(1) | Valid types are 1-9. 1=Customer number; 2=Vendor number; 3=Employee number; 4=Stock number; 5=Repair Order Number; 6=Reference number; 7=Serial number; 8=Lease Stock number; 9=Miscellaneous number. |

FIG.27(K)

| SCHEDULE1-SCHEDULE8 (COMMON ELEMENTS) | | | | |
|---|---|---|---|---|
| DATA REQUIREMENTS | FIELD NAME | FIELD NUMBER | DATA TYPE | NOTES |
| Accounting Sched Key | KEY | 0 | varchar(8) | |
| Port Number | KEY | 0 | varchar(4) | |
| Sequence Number | KEY | 0 | | |
| Schedule Number | SCHED.NO | 1 | varchar(4) | |
| Transaction Date | DATE | 2 | datetime | Stored in internal format. |
| Control Number | CTRL.NO | 3 | varchar(17) | |
| Source | SRC | 4 | varchar(2) | |
| Reference Number | REF.NO | 5 | varchar(16) | |
| Description | DESC | 6 | varchar(26) | |
| Account Number | ACCT.NO | 7 | varchar(5) | Length of account number may change to len of 8 or 11. |
| Amount | AMT | 8 | money | Stored without decimals, assume 2 decimals. |
| Original Amount | ORIG.AMT | 11 | money | Stored without decimals, assume 2 decimals. |
| Cash Receipt Number | RCPT.NO | 15 | varchar(8) | |

FIG.27(K2)

| USEDSTATUS | | | |
|---|---|---|---|
| DATA REQUIREMENTS | FIELD NAME | FIELD NUMBER | DATA TYPE | NOTES |
| Used Vehicle Status Code | KEY | 0 | varchar(2) | This file only holds the statuses the user has setup for the sales area in 4162 (established as valid codes). |
| Used Vehicle Status Desc | DESC | 1 | varchar(10) | |

| UVINVENTORY | | | | |
|---|---|---|---|---|
| DATA REQUIREMENTS | FIELD NAME | FIELD NUMBER | DATA TYPE | NOTES |
| Stock# | STK.NO | 0 | varchar(8) | |
| Model_Type | MDL.NO | 1 | char(1) | Valid input = P, T or O (P=passenger, T=truck, O=other). |
| Make | MAKE | 2 | char(2) | STDMAKES Validation |
| Carline Description | CARLINE | 3 | varchar(15) | |
| Model Description | DESC | 4 | varchar(20) | CHARXCHECK, type A |
| Model Year | YR | 5 | tinyint | |
| Serial# | SER.NO | 6 | varchar(17) | |
| Engine# | ENG.NO | 8 | varchar(20) | |
| Vendor Name | VENDOR.NO | 11 | varchar(8) | Stored in internal format. |
| Purchase Date | PURCH.DATE | 12 | datetime | |
| Mileage | MIL | 19 | varchar(6) | |
| Status Code | STATUS.CODE | 21 | tinyint | Used vehicle status codes = 1 - 21. 1 - 6 are predefined, 7 - 21 are user defined. |
| Deal Number | DEAL.NO | 24 | varchar(6) | AUTODEAL assigns numbers and wraps back to 1 at 999999. |
| Production Date | PROD.DATE | 28 | datetime | Stored in internal format. |
| Bodysize | BODYSIZE | 29 | char(1) | This field contains the bodysize code, the description needs to be pulled from BODYSIZE file. |

CONT. FROM FIG.27(K3)

| | | | |
|---|---|---|---|
| Sales Cost | SLS.COST | 31 | money | Stored without decimals, assume 2 decimals. |
| Location | LOC | 34 | varchar(10) | |
| Sales Code | SLS.CODE | 35 | varchar(4) | |
| Payoff Date | FLRPLN.PAYOFF.DATE | 36 | datetime | Stored in internal format. |
| Received Date | RCPT.DATE | 37 | datetime | Stored in internal format. |
| List Price | LIST.PRICE | 39 | money | Stored without decimals, assume 2 decimals. |
| Current Interest Rate | FLRPLN.INTR.RATE | 40 | varchar(5) | This field represents a percentage. Stored without decimals, assume 2 decimals. |
| Number Of Cylinders | NO.OF.CYL | 43 | tinyint | |
| Interest Start Date | INTR.START.DATE | 44 | datetime | Stored in internal format. |
| Make Code | MAKE.PFX | 45 | char(2) | |
| Floor Plan Amount | FLRPLN.AMT | 51 | money | Stored without decimals, assume 2 decimals. |
| Cost Pack | COST.PACK.AMT | 64 | money | Stored without decimals, assume 2 decimals. |
| Floorplan Vendor Number | FLRPLN.VEND | 65 | varchar(8) | |
| Used Group | USED.GRP | 66 | varchar(2) | Used Group description is located in the SALESCOMPANY file. rec CATEGORY. |
| Trim | TRIM | 92 | varchar(20) | |
| Accessories | DLR.ACC.CODE | 17,MV 1-N | varchar(5) | |
| Accessory Cost | DLR.ACC.AMT | 18,MV 1-N | money | Stored without decimals, assume 2 decimals. |
| Color Description | CLR.CODE | 7 | varchar(15) | |

FIG.27(K3) CONT.

| | | | | |
|---|---|---|---|---|
| Vehicle_Type | | | | This field will be sourced with a letter "U" for a used vehicle. |
| Charges To Date | | | | (ERA) Need to call subroutine "FLRPLNCHARG" to calculate charges to date |
| Inventory Amount | | money | | (ERA) Need to call subroutine "GETINVAMT" to calculate cost to date. |
| UVSJOURNAL | | | | |
| DATA REQUIREMENTS | FIELD NAME | DATA TYPE | FIELD NUMBER | NOTES |
| | Transaction Id | varchar(12) | 0 | |
| | Reference Number | varchar(12) | 0 | If the reference number has been reversed, the reference number will be the first part of the key without the -REV extension. |

| Sales_Journal_Type | | | This field will be set at extraction time. The value will be "N" to represent NVSJOURNAL. |
|---|---|---|---|
| Sale Date | JRNL.DATE | 1 datetime | Stored in internal format. |
| Stock Number | STK.NO | 2 varchar(8) | |
| Customer Number | CUST.NO | 3 varchar(8) | |
| Sale Type | SALE.TYPE | 4 char(1) | Valid entries are R, F, I, O. R=Retail, F=Fleet, I=Internal, O=Other |
| Sale Amount | SALE.AMT | 9 money | Stored without decimals, assume 2 decimals. |
| Vehicle Cost | COST.AMT | 10 money | Stored without decimals, assume 2 decimals. |

FROM FIG27(L)

FIG.27(L) Cont.

| VEHCOLOR | | | | |
|---|---|---|---|---|
| DATA REQUIREMENTS | FIELD NAME | FIELD NUMBER | DATA TYPE | NOTES |
| Color Code | KEY | 0 | varchar(4) | Key is composed of standard make code, color code, and model year. These fields are separated by an asterisk (*). KEY=MK*CODE*MDLYR |
| Exterior Color Desc | EXT.CLR | INV1-N | varchar(15) | |
| Interior Color Desc | INT.CLR | 2NV1-N | varchar(25) | |

FIG.27(M)

| ACCOUNT BALANCES | |
|---|---|
| FIELD NAME | |
| Year_Number | |
| Month_Number | |
| Account_Number | |
| Store_ID | |
| Beginning_Balance | |
| Ending_Balance | |
| Alternate_EOY_Beginning Balance | |
| Alternate_EOY_Ending_Balance | |

| ACCOUNTING_SCHEDULES | |
|---|---|
| Field Name | |
| Schedule_Type | |
| Accounting_Schedule_Key | |
| Schedule_Number | |
| Year_Number | |
| Month_Number | |
| Account_Number | |
| Store_Id | |
| Source_Number | |
| Customer_Id | |
| Port_Number | |
| Sequence_Number | |
| Schedule_transaction_Date | |
| Schedule_Description | |
| Reference_Number | |
| Cash_Receipt_Number | |
| Invoice_Number | |
| Current_Amount | |

FIG.27(N)

| ACCOUNT TYPE | |
|---|---|
| Field Name | |
| Account Type | |
| Account Type Description | |
| JOURNAL_SOURCE | |
| Field Name | |
| Journal_Source_Number | This field will automatically be sourced by EIM upon installation. The following are valid source numbers: 1, 2, 3, 4, 5, 6, 7, 8, 9, 10, 11, 12, 13, 14, 16, 17, 30, 31, 35, 36, 37. |
| Journal_Source_Description | This field will automatically be sourced by EIM upon installation.<br>1 = NVSJOURNAL<br>2 = UVSJOURNAL<br>3 = ROJJOURNAL<br>4 = PSJOURNAL<br>5 = CAHSJOURNAL<br>6 = CDJOURNAL<br>7 = NVPJOURNAL<br>8 = UVPJOURNAL<br>9 = APJOURNAL<br>10 = TRADEJOURNAL<br>11 = GENJOURNAL<br>12 = ADJJOURNAL-py<br>13 = STDJOURNAL<br>14 = RNTJOURNAL<br>16 = WCJOURNAL<br>17 = ADJJOURNAL-pm<br>30 = PRJOURNAL<br>31 = POJOURNAL<br>35 = FASTDENTJRNL<br>36 = FADISPJRNL<br>37 = FAADJRNL |

FIG.27(O)

| MODEL_TYPE | |
|---|---|
| Field Name | |
| Model_Type | This field will automatically be sourced by EIM upon installation. Valid model types are: 'P', 'T', 'O' |
| Model_Type_Description | This field will automatically be sourced by EIM upon installation.<br>'P'= Passenger<br>'T'= Truck<br>'O'= Other |
| MODEL_YEAR | |
| Field Name | |
| Model_Year | This field will automatically be sourced by EIM upon installation. |
| Model_Year_Description | This field will automatically be sourced by EIM upon installation. |
| MONTH | |
| Field Name | |
| Month_Number | This field will automatically be sourced by EIM upon installation. Month Numbers are numeric values 1-12. |
| Quarter_Number | This field will automatically be sourced by EIM upon installation. Quarter Number will be a foreign key to the Quarter Table. See the table Quarter for valid entries. |
| Month_Description | This field will automatically be sourced by EIM upon installation. Month description will contain the ful name of the month. Ie. 1 = 'January', 2 = February |
| PAYMENT_TYPE | |
| Field Name | |
| Payment_Code | This field will automatically be sourced by EIM upon installation. Valid Payment Codes are numeric values 1 - 3. |
| Payment_Code_Description | This field will automatically be sourced by EIM upon Installation.<br>1 = Cash<br>2 = Check<br>3 = Credit Card |

FIG.27(02)

| QUARTER | | |
|---|---|---|
| FIELD NAME | | |
| Quarter_Number | | This field will automatically be sourced by EIM upon installation. Quarter Numbers are numeric values 1-4. |
| Quarter_Description | | This field will automatically be sourced by EIM upon installation. 1 = First Quarter 2 = Second Quarter 3 = Third Quarter 4 = Fourth Quarter |
| REMITTANCE TYPE | | |
| Field Name | | |
| Remittance Type | | This field will automatically be sourced by EIM upon installation. Valid Remittance Codes are N, F, L, D, C, S. |
| Remittance Description | | This field will automatically be sourced by EIM upon installation. N = No GL Distribution F = Floorplan L = Lien D = Direct C = Custom GL Distribution S = Standard GL Distribution |
| SCHEDULE TYPE | | |
| Field Name | | |
| Schedule Type | | |
| Schedule_Type_Description | | |

FIG. 27(P)

| VEHICLE STATUS | |
|---|---|
| DW FIELD NAME | |
| Status_Code | This field will automatically be sourced by EIM upon installation. Status Codes are numeric values 1-14. |
| Status_Description | This field will automatically be sourced by EIM upon installation.<br>1 = In Stock<br>2 = Deal Pending<br>3 = Rental<br>4 = Loaner<br>5 = Sold<br>6 = Delivered<br>7 = Demo<br>8 = Driver Ed<br>9 = On Order<br>10 = Preference<br>11 = Production<br>12 = In Transit<br>13 = Dealer Trade<br>14 = Stolen |

| VEHICLE TYPE |
|---|
| Field Name |

| YEAR |
|---|
| Field Name |

FIG.27(Q)

ENTERPRISE INFORMATION MANAGEMENT SYSTEM AND METHODS

RELATED APPLICATIONS

This patent application is related to and claims priority under 35 U.S.C. §120 from U.S. Patent application Serial No. 60/153,130, entitled "Enterprise Information Management," filed Sep. 8, 1999, the contents of which are incorporated herein by reference.

BACKGROUND

1. Field of the Invention

This invention relates to enterprise information management ("EIM"), and, more particularly, to enterprise information management systems and associated methods. The term "enterprise" refers to the corporate headquarters, the management company, and the individual stores.

2. Background

Consolidations in the automotive retail channel have brought about new financial complexities for the management companies. Acquiring dealerships which operate on a variety of dealer management systems, has made it difficult for the acquiring enterprise to get a consolidated view of the financial position of and of inventories throughout the enterprise. Additionally, a trend has appeared in the automotive industry to become publicly held in order to raise capital for further expansion. Financial statements report the results of performance and the financial position of an automotive retail enterprise.

The task of consolidation is currently a time and labor intensive task. It has been determined that customers want to maximize the profitability of the enterprise by identifing key drivers of business success and leveraging the knowledge throughout the enterprise.

SUMMARY OF THE INVENTION

Providing the ability for customizable, consolidated financial, operating and inventory reporting from multiple sources will allow the enterprise and store managers to achieve increased bottom-line gains by out performing existing manual data extraction and manipulation process. Additionally, the easier, timely reporting provides better mechanisms for identifying operation inefficiencies, savings or opportunities.

The consolidation process starts with extracting data from the operational systems. The data is then combined to provide an overall view of the conditions and performance of the enterprise. The process of combining the data requires that a common chart of accounts is developed for financials, accounts are summarized and adjustments are made. For other data, mapping occurs to get a consistent view of the data Adjustments are made for inter-company transactions, foreign currency conversions, deferred taxes, goodwill, etc.

Financial consolidation encompasses three primary statements: balance sheet, income statement, and statement of cash flows. The balance sheet is a statement of the resources of the enterprise (assets) and the claims on those assets (liabilities and owners' equity) at some point in time. The income statement provides information about the operating performance of an enterprise for a particular period of time. The cash flow statement reports the amount of cash flow from an enterprisers operating, investing, and financing activities. It also shows the primary sources and uses of cash from these activities.

In one aspect, this invention, EIM, provides a commercial data warehouse product. EIM is a novel combination of vendor purchased software and customized software development. EIM includes data extraction and movement, data transformation and cleansing, database update and tuning, and database access.

Thus, in one aspect, this invention is a system for enterprise information management ("EIM"). The system includes a data warehouse server and a transformation and staging server connected to the data warehouse server for providing transformed and cleansed data to the data warehouse server. The EIM system also includes a data source application connected to the transformation and staging server to provide data to the transformation and staging server, wherein the transformation and staging server obtains data from the data source application via requests and places the data into temporary staging tables to prepare for the transformation and cleansing process prior to movement of the data to the data warehouse server. A financial consolidation application is connected to the transformation and staging server for performing consolidation and reporting of financial data. A web server is connected to the data warehouse server. A plurality of clients are connectable to the web server for accessing data from the data warehouse server via the web server.

In some preferred embodiments, the transformation and staging server itself comprises four physical disk drives and wherein the physical disk drives are separated by individual logical drives, wherein the disk drives serve separate purposes and functionality of the system has been separated by drive so as to minimize disk contention during the various process that run on the transformation and staging server. In some preferred embodiments, the transformation and staging server includes the following databases and files: a master database that contains all system tables; a model database template for the creation of all new databases; a staging database which contains all data from systems that is being or has been cleansed, transformed, denormalized, summarized; an error database which contains source information that could not automatically be cleansed or transformed; a financial database used by the financial consolidation application and containing consolidated and summarized financial information; at least one flat file for loads; a repository database used by the transformation tool and containing information regarding the transformation procedures and automation plans; and a temporary work area for the creation of temporary tables and information. In some of the preferred embodiments of the present invention, the data warehouse server includes the following databases and files: a master database that contains all of the system tables on the data warehouse server; a model database template for the creation of all new databases on the data warehouse server; a temporary database used as a temporary work area for the creation of temporary tables and information on the data warehouse server; a meta-view database that contains all of the metadata, views, and stored procedures that are to be used by the users of the system; and a database that contains some normalized data, but mostly denormalized and summarized data that has been cleansed, transformed on the transformation and staging server, wherein the meta-view database is the sole access method for users to the information in the database.

In some embodiments of the present invention, the system for EIM has a data warehouse server; a transformation and staging server connected to the data warehouse server for providing transformed and cleansed data to the data warehouse server; a data source application connected to the transformation and staging server to provide data to the transformation and staging server; a financial consolidation application connected to the transformation and staging server for performing consolidation and reporting of financial data; a web server connected to the data warehouse server; and a plurality of clients connectable to the web server for accessing data from the data warehouse server via the web server.

Sometimes the transformation and staging server obtains data from the data source application via requests and places the data into temporary staging tables to prepare for the transformation and cleansing process prior to movement of the data to the data warehouse server.

The transformation and staging server may include the following databases and files: a master database that contains all system tables; a model database template for the creation of all new databases; a staging database which contains all data from systems that is being or has been cleansed, transformed, denormalized, summarized; an error database which contains source information that could not automatically be cleansed or transformed; a financial database used by the financial consolidation application and containing consolidated and summarized financial information; at least one flat file for loads; a repository database used by the transformation tool and containing information regarding the transformation procedures and automation plans; and a temporary work area for the creation of temporary tables and information.

The transformation and staging server may have four physical disk drives and wherein the physical disk drives for the transformation and staging server, are separated by individual logical drives.

In some preferred embodiments, the disk drives serve separate purposes and functionality of the system has been separated by drive so as to minimize disk contention during the various process that run on the transformation and staging server.

The data warehouse server may include the following databases and files: a master database that contains all of the system tables on the data warehouse server; a model database template for the creation of all new databases on the data warehouse server; a temporary database used as a temporary work area for the creation of temporary tables and information on the data warehouse server; a meta-view database that contains all of the metadata, views, and stored procedures that are to be used by the users of the system; and a database that contains some normalized data, but mostly denormalized and summarized data that has been cleansed, transformed on the transformation and staging server.

In some preferred embodiments, the meta-view database is the sole access method for users to the information in the database.

The data warehouse server may comprise a plurality of physical disk drives combined into one logical drive to take full advantage of Redundant Array of Independent Disks (RAID) technology.

In preferred embodiments of this invention, the data relate to automobiles.

In some preferred embodiments of this invention, a client accessing the data warehouse server via the web server is presented with a login screen and is required to provide a valid user identifier and password in order to access the system, and wherein, upon authentication of the user identifier and password, a new browser window is opened at the client and the client is presented with an interface tailored to the client's preferences and security privileges.

The user interface (UI) may comprise a task list, buttons/ controls for launching components of the system; and a content area for task related data and output, wherein each item listed in the task list has supporting screens that populate the content area.

The UI may provide access to performance indicators through home pages made up of one to four reports or graphs displayed on the content area.

In preferred embodiments of this invention, home pages can be customized.

Clients may be provided with a set of predefined drill paths or next steps for the user to follow in analyzing their data, wherein the predefined next steps display additional reports with new, more detailed, or related information to a report currently being viewed. The predefined next step buttons may be only provided with the original reports provided with the system.

In another aspect, this invention is a method, in a system for enterprise information management comprising a data warehouse server; a transformation and staging server connected to the data warehouse server for providing transformed and cleansed data to the data warehouse server; a data source application connected to the transformation and staging server to provide data to the transformation and staging server; a financial consolidation application connected to the transformation and staging server for performing consolidation and reporting of financial data; a web server connected to the data warehouse server; and a plurality of clients connectable to the web server for accessing data from the data warehouse server via the web server. In some preferred embodiments, the method includes, by the transformation and staging server: retrieving operational data from the data source application using a data flow plan; validating and cleansing the retrieved operational data; loading the data is loaded into an appropriate temporary staging table; and performing a second phase of validations and cleansing, including referential integrity validations and aggregate processing validations.

The method may also include writing data with an error to an error table along with an error message describing a reason for rejection. The method of some embodiments also includes correcting errors and reprocessing the data.

In some preferred embodiments, the validations and transformations performed include at least one of: checking for absence of data; checking data typing; checking free form text fields; checking multipurpose fields; checking dummy values entered in a mandatory field; checking for contradicting data; checking violation of business rules; checking data anomalies; restructuring operational keys; checking data integrity; supplying default values; renaming data elements moved from the operational environment to the data warehouse; data format conversion; and aggregating data values.

The method may also include loading information from the transformation and staging server on the data Warehouse server.

Sometimes the loading of information comprises one of: a round-robin approach used for refresh processing and extracting information from permanent tables; and a see-saw approach used for non-refresh processing and extracting information from temporary tables.

In some embodiments, the round-robin approach is used if the system requires minimal down time.

Preferably the round-robin approach comprises: (a) exporting information to flat files on the transformation and staging server, selecting rows from normalized, denormalized, and summary tables; (b) loading information into the normalized, denormalized, and summary load tables; (c) for each table: (c1) updating load statistics metadata on the data warehouse server, indicating that the information is in a "loading" state; (c2) renaming the current table to a temporary table as a temporary holding area; (c3) renaming the load table to the actual table, making the latest information available to the users; (c4) renaming the temporary table to the load table to prepare for the next period's processing batch; (c5) updating the load statistics metadata on the data warehouse server indicating that the information is in a "updated" state and updating the date, time, number of records loaded; (d) deleting all of the information from the normalized, denormalized, and summary load tables to prepare for the next period's processing batch.

Preferably the see-saw approach comprises: (a) exporting information to flat files on the transformation and staging server, selecting rows from the normalized, denormalized, and summary temporary tables; (b) for each table of the normalized, denormalized, and summary temporary tables: (b1) updating the load statistics metadata on the data warehouse server indicating that the information is in a "loading" state; (b2) renaming the current table load table; (b3) loading information into the load table; (b4) renaming the load table to the permanent table; (b5) updating the load statistics metadata on the data warehouse server indicating that the information is in a "updated" state and updating the date, time, number of records loaded.

The method may include storing historic information on the transformation and staging server. Sometimes the method includes storing historical information on both the data warehouse server and the transformation and staging server, and using the non-refresh processing approach on the transformation and staging server and the see-saw approach on the data warehouse server.

In another aspect, this invention is a computerized record-keeping system that tracks and records transactions of a method in a system for enterprise information management comprising a data warehouse server; a transformation and staging server connected to the data warehouse server for providing transformed and cleansed data to the data warehouse server; a data source application connected to the transformation and staging server to provide data to the transformation and staging server; a financial consolidation application connected to the transformation and staging server for performing consolidation and reporting of financial data; a web server connected to the data warehouse server; and a plurality of clients connectable to the web server for accessing data from the data warehouse server via the web server. The method includes, by the transformation and staging server: retrieving operational data from the data source application using a data flow plan; validating and cleansing the retrieved operational data; loading the data is loaded into an appropriate temporary staging table; and performing a second phase of validations and cleansing, including referential integrity validations and aggregate processing validations.

In some embodiments, the method of the system may include writing data with an error to an error table along with an error message describing a reason for rejection. In some embodiments, the method of the system may include correcting errors and reprocessing the data.

The validations and transformations performed may include at least one of: checking for absence of data; checking data typing; checking free form text fields; checking multipurpose fields; checking dummy values entered in a mandatory field; checking for contradicting data; checking violation of business rules; checking data anomalies; restructuring operational keys; checking data integrity; supplying default values; renaming data elements moved from the operational environment to the data warehouse; data format conversion; and aggregating data values.

The method may include loading information from the transformation and staging server on the data warehouse server. The loading of information may include a round-robin approach used for refresh processing and extracting information from permanent tables; and a see-saw approach used for non-refresh processing and extracting information from temporary tables.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein:

FIG. 3 shows an example of an EIM application view according to embodiments of this invention;

FIG. 4 shows an example of a full-screen mode with exception test view according to embodiments of this invention;

FIG. 5 shows an example of auto-prompting for report parameters according to embodiments of this invention;

FIG. 6 shows an example of right-click drilling according to embodiments of this invention;

FIGS. 27(A)–27(Q) depict tables summarizing data mappings according to embodiments of this invention.

DETAILED DESCRIPTION OF THE PRESENTLY PREFERRED EMBODIMENTS OF THE INVENTION

EIM Application Features Overview

This invention, EIM, provides a web-based information solution that serves the business monitoring, reporting, and analysis needs of automobile dealerships and enterprises. EIM provides access to both consolidated and detailed data from the current dealership operational systems. EIM has flexible reporting capabilities and provides a user with the ability to drill up or down upon data on a report to view varying levels of aggregation or summarization. In one preferred embodiment, EIM addresses the Vehicle Sales, Vehicle Inventory, and Financial data sets. EIM also provides the capability to consolidate financial information according to generally accepted accounting principles (GAAP).

EIM's reporting and analysis capabilities provide the ability to identify relationships among data and to compare and contrast data sets (store to store, time period to time period). EIM provides user-definable report parameters for easy access to the exact information needed. Flexible presentation allows users to view reports in chart, graph, or tabular format with the click of a button in order to facilitate the ease of use and understanding of data on the report.

The EIM serves two main user groups. To aid non-technical associates, EIM provides an "Executive Interface" which allows easy access to key performance indicators about the business. The major features of EIM that address this need are:

Home pages—Multiple reports or graphs displayed on one screen. This provides the user with the ability to cluster high-focus items onto one screen of information, which greatly increases the ability to monitor the business' key performance indicators. The reports presented to the user are determined by the role of the individual, or may be customized on an individual basis. A tool, the EIM Configuration Manager, incorporated within the System Administration function allows for the customization and/or selection of the particular reports.

Predefined drill paths to aid the user in analyzing the information presented in EIM.

Exception reporting using visual performance indicators.

EIM also addresses the needs of so-called "power users" who need access to detailed information and the capability to analyze that information in an ad hoc fashion. The major features of EIM that address this need are:

Drill anywhere capability provides the user with unlimited flexibility in analyzing information Wizard-driven ad hoc report creation Calculation capabilities for trend analysis (current month, CYTD, prior year same month, and LYTD), conducting comparisons, summing and aggregating information, and identifying potential profitable customer relationships Each of these features can be combined in any combination so that EIM can address many levels of information access or technical sophistication.

System Access

Figure 1:
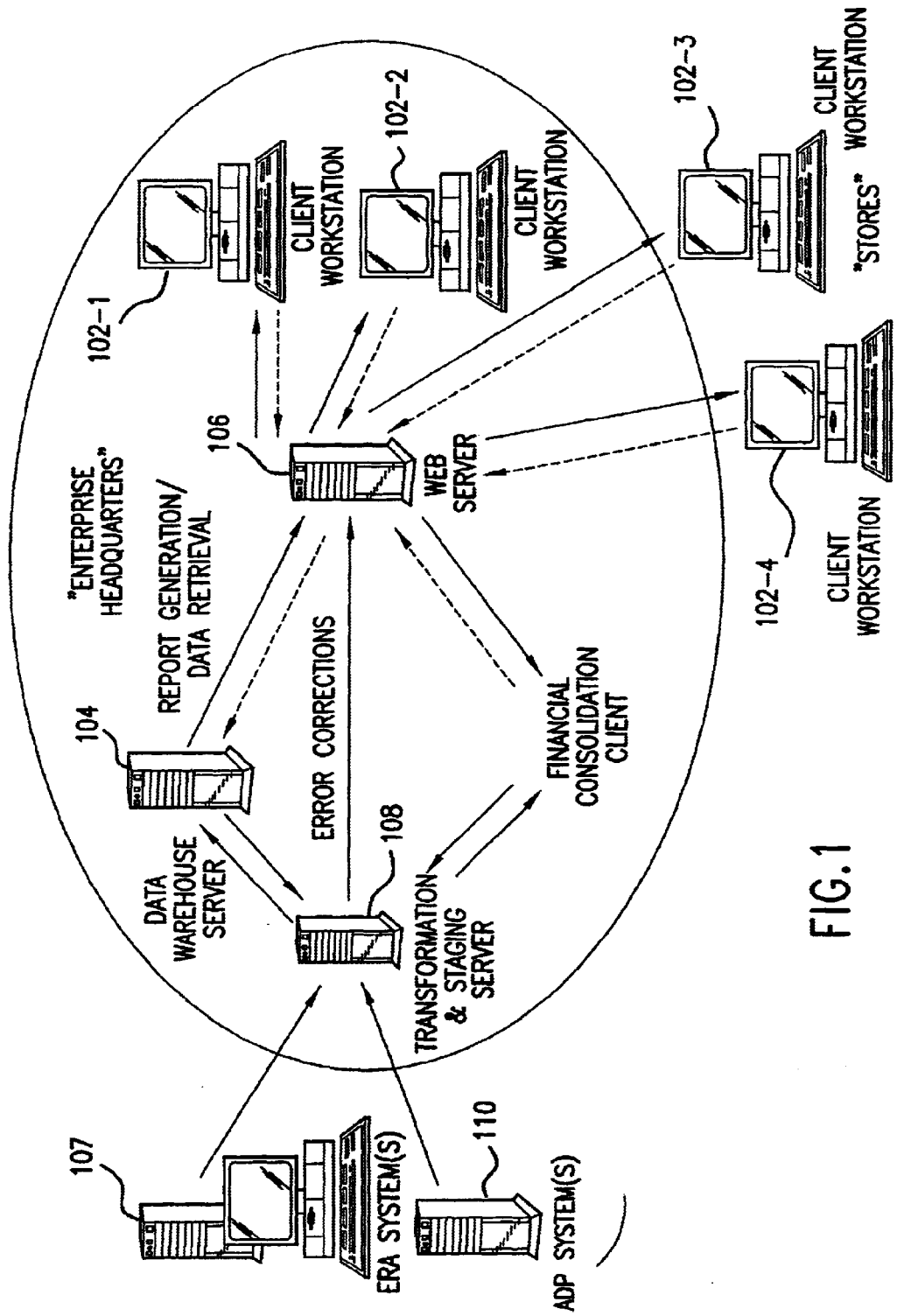
FIG. 1 shows an overview of the EIM architecture according to embodiments of this invention.

FIG. 1 depicts an overview of the EIM architecture 100 according to embodiments of this invention. As shown in FIG. 1, client workstations 102-1, . . . 102-4 connect to a Data Warehouse server 104 via a web server 106. Thus, access to the EIM system is through the client's web browser at the client's workstation 102. There is typically only one web address (URL) known to the user, and this will preferably be stored either in the browser's "Favorites" list or as an icon on the user's desktop. The first screen that the user will see is the login screen. Every user is typically required to provide a valid userid and password that is known to EIM. Once this userid has been authenticated by EIM, a new browser window is opened in kiosk or full screen mode and the original window is preferably closed. The new browser window presents the user with an interface tailored to his or her preferences and security privileges.

User Interface Layout

Figure 2:
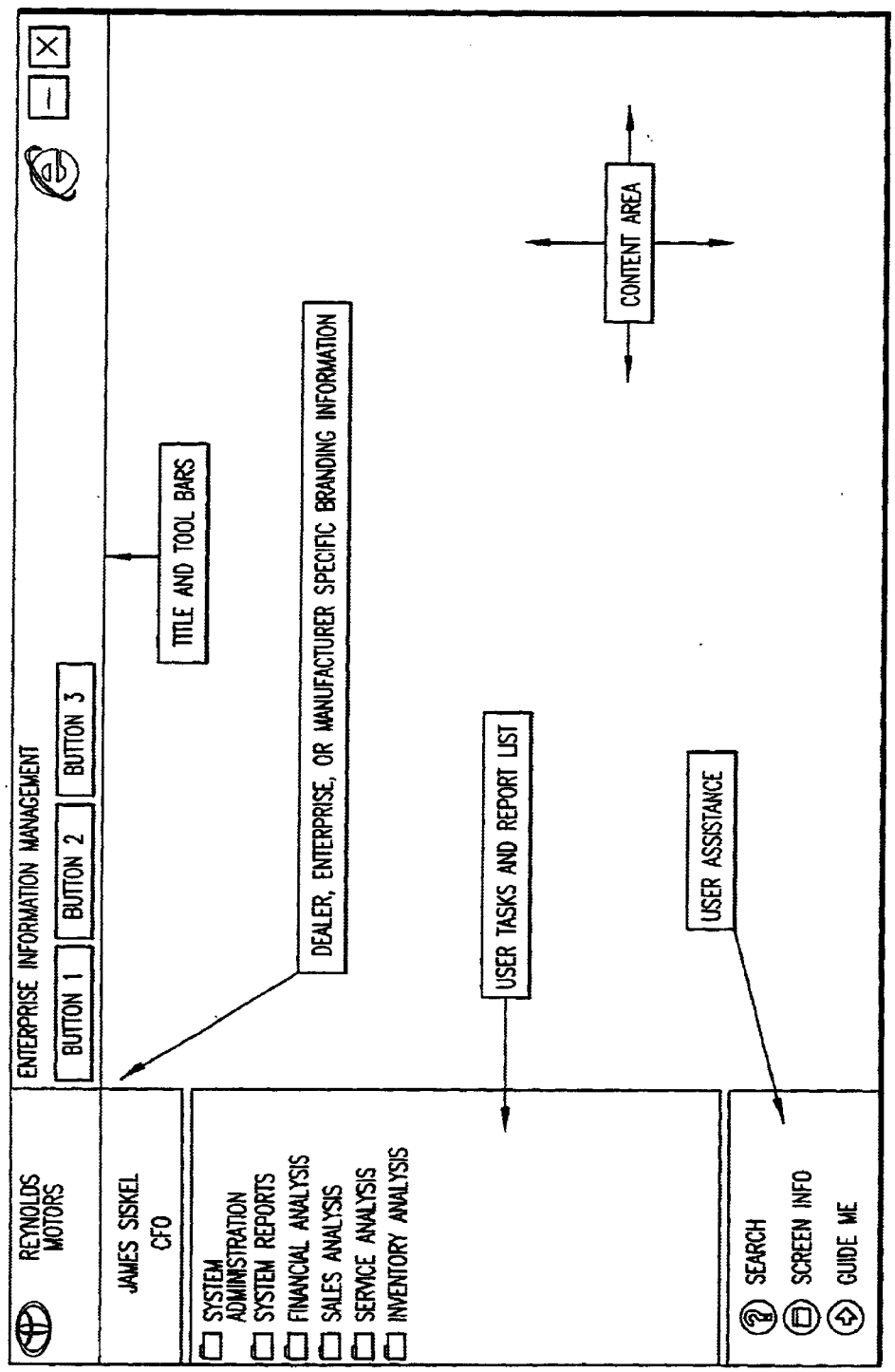
FIG. 2 shows the structure of the EIM user interface ("UI") layout according to embodiments of this invention.

In some preferred embodiments, the EIM user interface ("UI") layout follows the structure shown in FIG. 2. The upper left quadrant of the EIM UI contains application owner and user/employee specific information. This information includes dealer or enterprise branding information, identification of the user, and the user's role. Potentially, the dealer/enterprise branding area may contain various items, customized by the customer. A few of these items include the name of the dealer/enterprise, the manufacturer's badge, a vehicle, and background supporting imagery.

The majority of the left side of the EIM UI consists of the task list. The user's task selection items are preferably listed in a group/subgroup, expandable format. This region is scaleable and a scroll bar is preferably shown if the number of tasks dictates it. For most users this area contains the data subject areas and the reports and analyses in those areas. The lower left of the screen contains all of the buttons/controls that launch user assistance components.

Task related data and output will reside in the "content" area. Each of the items listed in the task bar will have supporting screens that will populate in the "content" region. For most users, this area is preferably populated with the output from reports and graphs. In addition, any system administration screens requiring user input also appear here.

In some circumstances, EIM will prompt the user for additional input such as parameter values for report generation or fields to place on a report. Because EIM integrates third party software packages to accomplish some of the report generation and execution, the interface will make use of the products already provided. Any prompts of this nature appear in separate so-called "pop-up" windows.

Home Page

Figure 3:
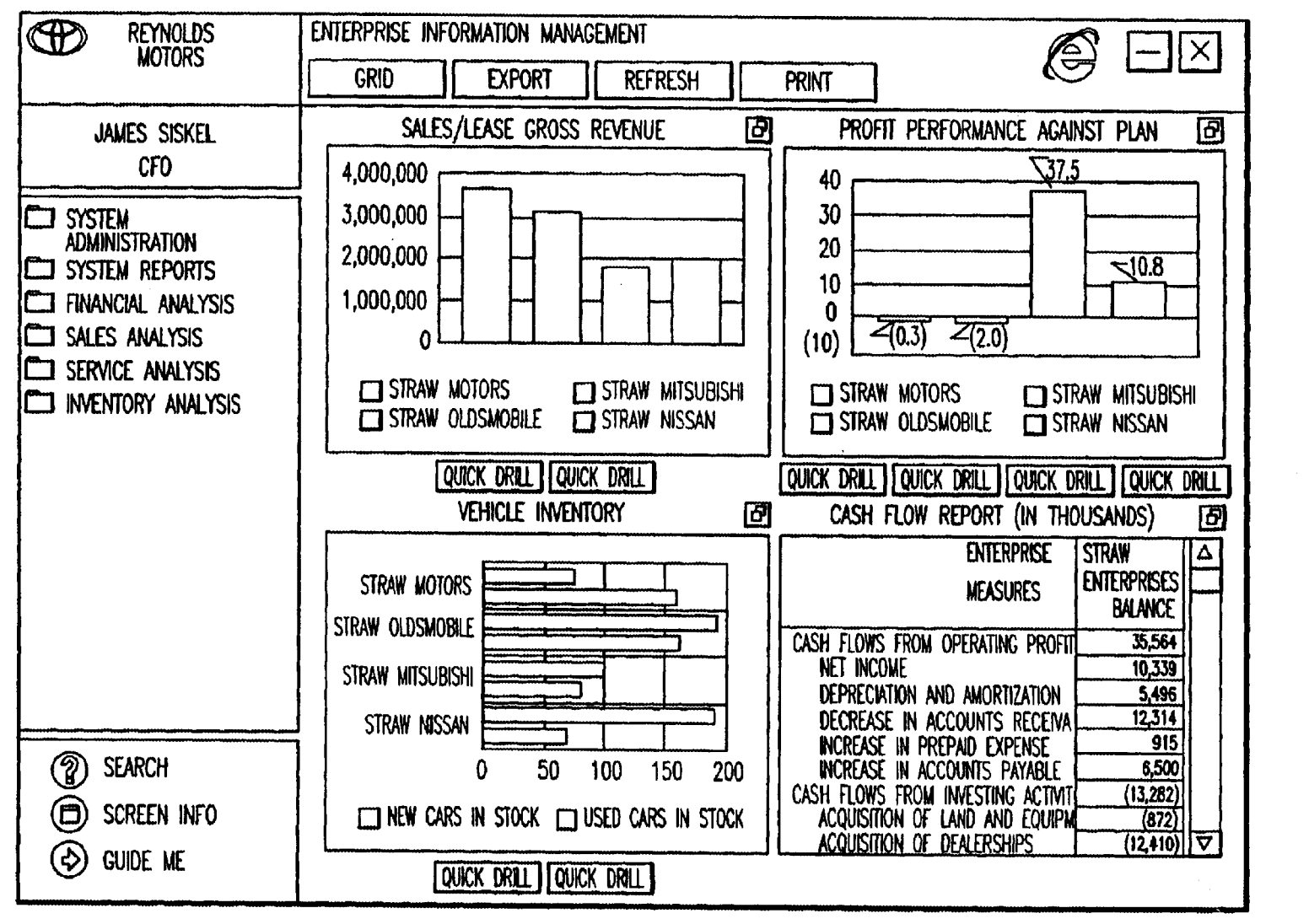

To aid the non-technical associate or executive, EIM provides easy access to key performance indicators about the business through so-called "quick views" or "home pages" (see FIG. 3 which shows an example of an EIM application view according to embodiments of this invention). Home Page provides one to four reports or graphs displayed on one screen. This provides the user with the ability to cluster high-focus items onto one screen of information, which greatly increases the ability to monitor the business' key performance indicators.

A customized home page can be displayed as the users initial application view. This provides executives with an easy way to view/digest large amounts of data.

While the home page is a set of predefined so-called "canned" reports, they can be customized (e.g., by the enterprise) so that they provide the information to meet the business needs.

Next Steps (Pre-defined Drill Paths)

Because one report usually cannot answer every question, EIM provides a set of predefined drill paths or next steps for the user to follow in analyzing their data. These predefined next steps display additional reports with new, more detailed, or related information to the report currently being viewed. An analysis path is thus established which gives the user quick insight into high-level summary and detailed information through simply pressing a button.

In one preferred embodiment, these predefined next step buttons may only be provided with the original "canned" reports provided with EIM and not for user created reports. In other embodiments, this functionality includes end-user created reports or for enterprises to create their own next step buttons.

Flexable Presentation

In some preferred embodiments, EIM provides multiple ways in which a user can access and view information. In addition to the Home Page defined above, reports and graphs can also be displayed in full screen mode (see FIG. 4 which shows an example of a full-screen mode with exception test view according to embodiments of this invention). This is the default representation for any report not displayed on a Home page.

While viewing a Home page, a user can choose to take any of the reports to full screen mode by clicking the window expansion icon located in the right corner of the reports title. Results can be viewed in either "Grid" or "Graph" mode. Users can switch from one to the other format simply by clicking the appropriate button on the toolbar.

Reports can be printed as they appear on the screen. The reports will print to the users default printer as identified by Windows™. Additionally, any reports results can be exported to a number of formats including Microsoft Excel™.

The properties of a report can be changed dynamically by the user by right clicking on the report element to be changed. Updating fonts, colors, titles, and legends is achieved through standard Windows dialog boxes. The reports can then be saved so that changes will not be lost (see Saving New or Modified Reports). Reports can also be sorted dynamically in this fashion as well. Right-clicking on a data column and selecting the sorting option will sort the data on the report, maintaining any formatting previously established for the report.

Reporting Capabilities

Report Formats

Reports can be created in either cross-tab or detail listing format. The cross-tab report format provides the user with a two-dimensional spreadsheet representation of their data. This format creates a natural framework for data analysis by allowing the user to identify relationships among data elements and to compare and contrast time periods, organizations, or any other data set. The standard display of the cross-tab report can be seen in FIG. 4. An extension of the cross-tab format, a so-called "outline mode" provides the ability to view data hierarchically showing subtotals at chosen levels of detail.

Detail listing format displays the data just as it is returned from the data warehouse. This format is very useful for displaying the details of what is in inventory or customer mailing lists. As noted above, the format of a report can be changed dynamically by the user. Right clicking on a report element provides the capability to change properties like font, color, format and alignment.

Graphing Report data can also be displayed graphically for easier recognition. EIM provides the user with an assortment of chart types (bar, line, pie, scatter, etc.) to best present the information in reports. Users can change graph types dynamically by right clicking on a graph. Just like reports, graphs can be printed just as they are displayed on the screen. Note: This feature is dependent upon the capabilities of the target printer. EIM will print the report to the best of the printers capabilities. For example, if a printer does not support color printing then a bar graph is preferably printed in black and white with each bar represented by a different pattern rather than color. Also, as with reports, graph formats can be changed dynamically by right clicking on a graph element. The user can change almost every characteristic of a graph including colors, fonts, legends, and titles.

Auto Prompting

Figure 5:
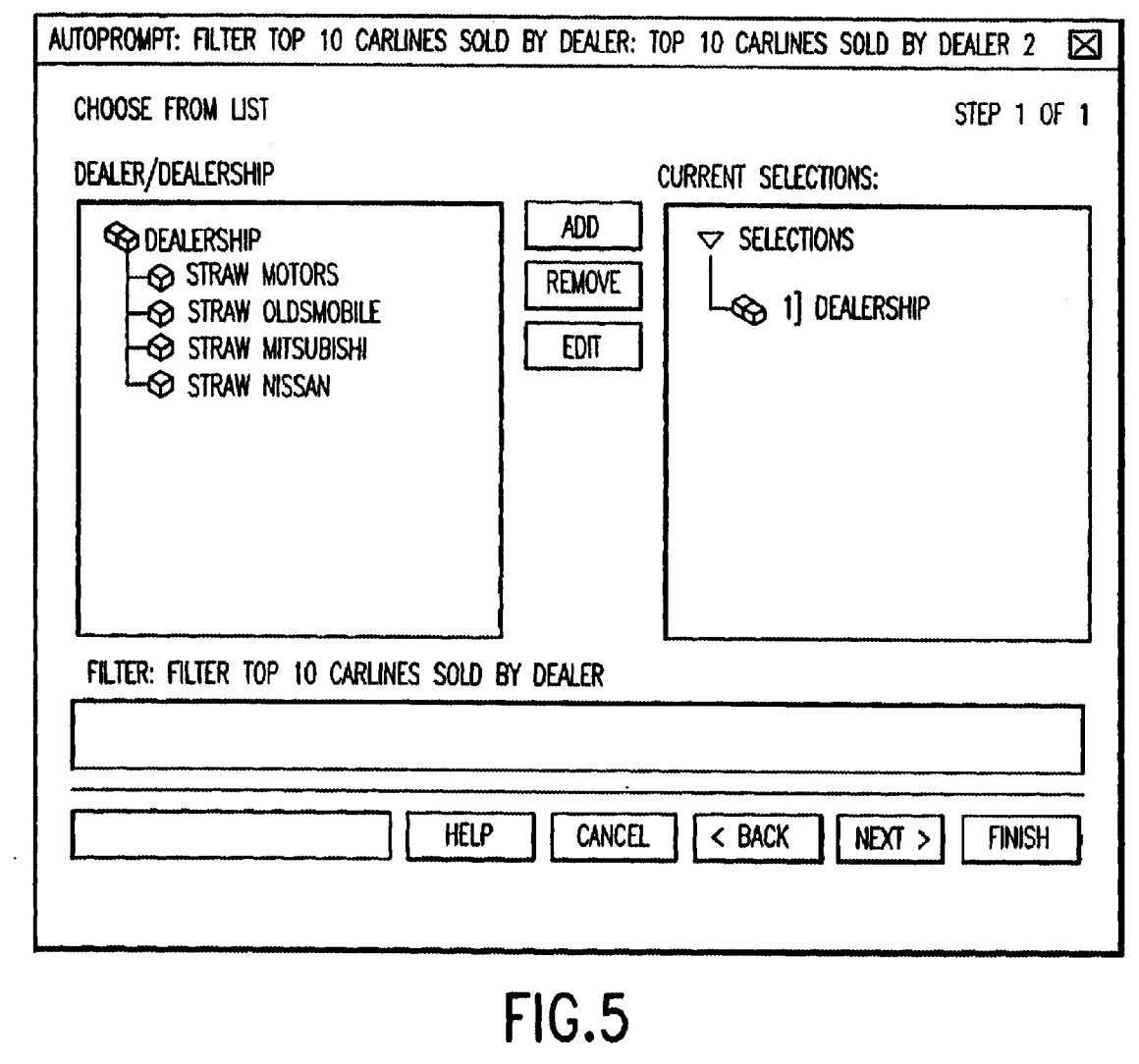

EIM provides the ability to create user definable parameters for querying the data warehouse and filtering information. These filters provide the report with parameters to narrow the selection of data displayed. The user can be automatically prompted to provide values for these parameters or the filter can have pre-defined values established. If the parameter is a hierarchy, the filter provides the capability to select one or more values at any level within the hierarchy. Filter selection takes place in a pop-up dialog window. Standard windows actions provide either double-click or drag-and-drop selection of values. For more complex parameters, the dialog provides a wizard and online user assistance to aid the user in making a selection. FIG. 5 shows an example of auto-prompting for report parameters according to embodiments of this invention.

Exception Management

Figure 4:
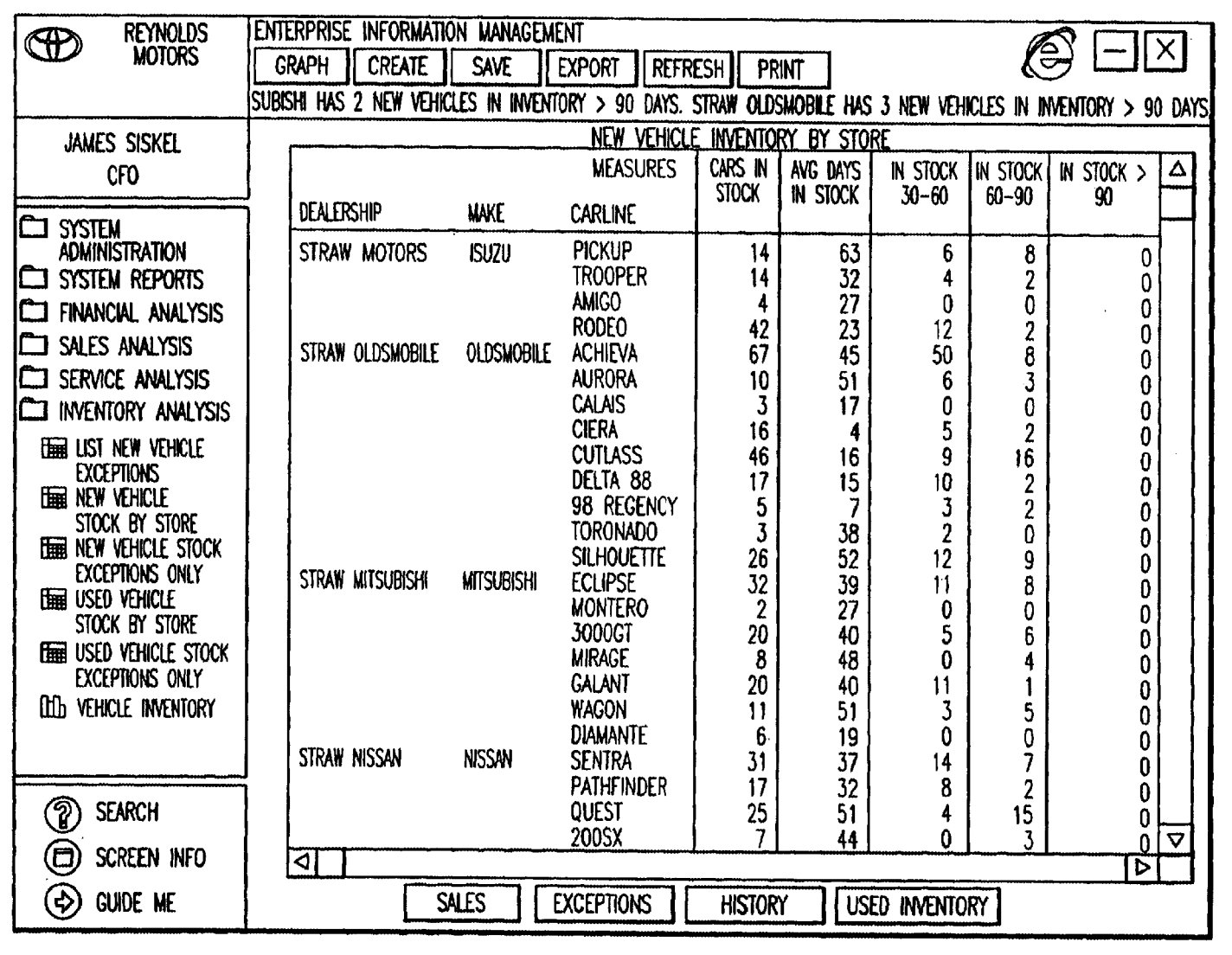

EIM facilitates exception management through several features aimed at identifying exception conditions that exist and reporting those to the user. The focus of these features is to eliminate the need for users to scan long reports or peruse through several printed pages "looking" for something that catches their eye. EIM provides the capability to highlight exception conditions that occur on reports. Exceptions can be defined by the user when the report is created and identified using color. Several data ranges can be established, each with its own distinctive color identifier and different conditions can be established for each element on a report. These exception conditions cannot be changed when the report is run, thus ensuring consistency across the dealership or enterprise. In addition to color identifiers, EIM also provides textual descriptions of exception or other conditions on a report. The text, identified at report creation time, can be generated based upon any data condition that could exist on the report. The text for these conditions is preferably displayed as shown in FIG. 4 and only available when the report is viewed in full screen mode (see the section titled Flexible Presentation).

To speed the exception identification process, EIM provides an exception "folder" into which users can place exception reports. These reports, whose output is only data that meets some exception criteria, are preferably automatically processed each night (or other timeframe defined by the warehouse update process). The reports are preferably checked to determine which ones actually have output and those that do are preferably identified in the exception Home page. If fewer than four reports have output then they are preferably displayed as in FIG. 2. If more than four have exception information then the user can choose to see the reports four at a time or a list of all reports and the number of exceptions occurring on each.

Drill Anywhere

EIM provides the user with the ability to analyze the data on a report in almost any fashion through ability to drill anywhere. By simply right-clicking on a set of data elements, the user has the option of drilling up (to aggregate data), down (to a lower level of detail), within (to characteristic information), or across (to data in a new dimension). This drill capability is available on either reports or graphs, although it is probably more intuitive if used while viewing a report. FIG. 6 shows an example of right-click drilling according to embodiments of this invention.

Ad Hoc Report Creation

Figure 7:
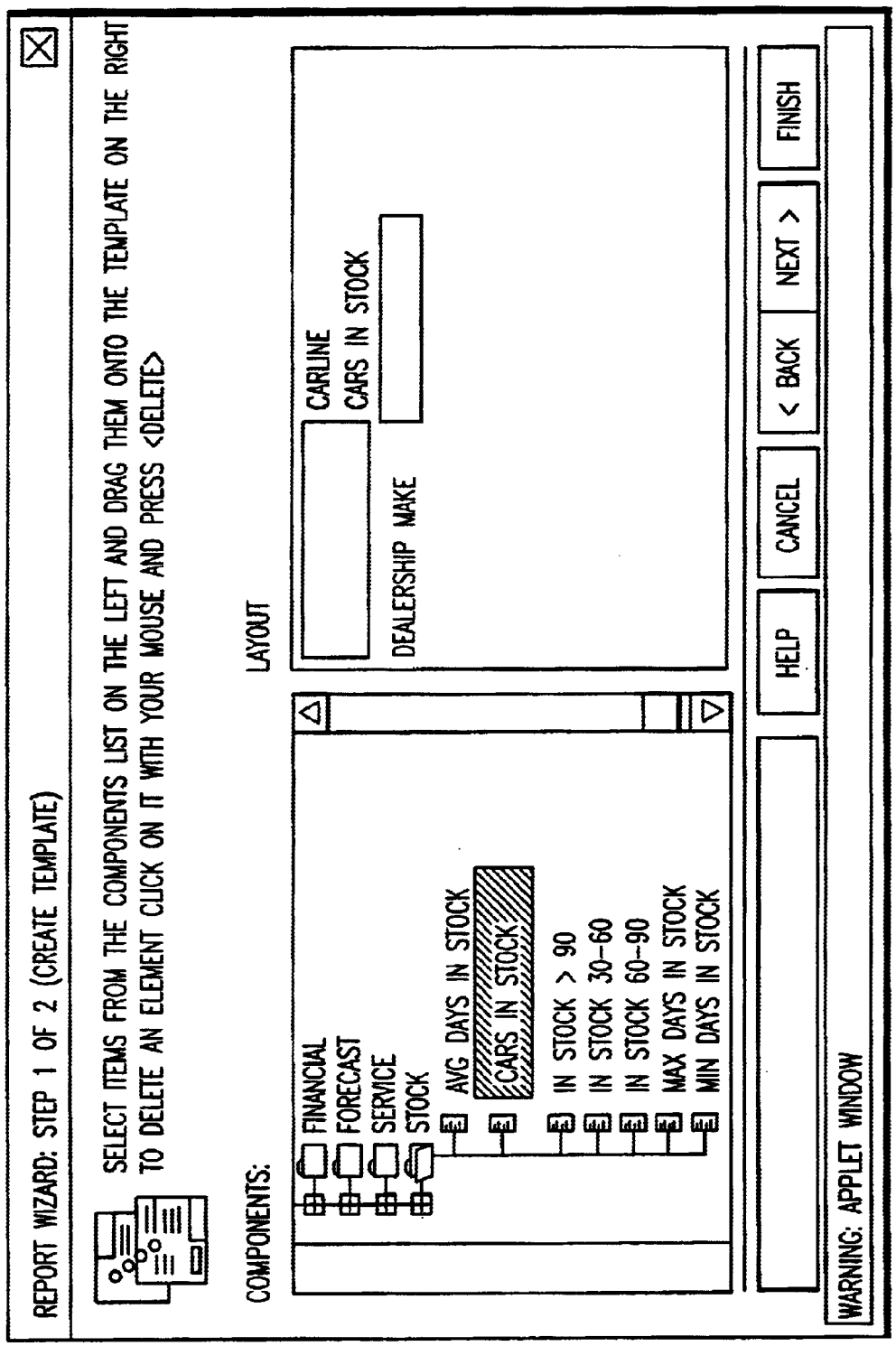
FIG. 7 shows an example of application of a report wizard according to embodiments of this invention.

Users are preferably able to create ad hoc reports on the fly by clicking the "° Create" button on the toolbar. (More steps are involved to create ad hoc reports) This launches an easy to use Report Creation wizard that guides the user through all the steps needed to create a report. The user has the option of basing a new report on existing components or developing an entirely new report from scratch. As shown in FIG. 7, the Report Creation wizard enables the user to drag-and-drop data elements and dimension levels onto the report. The elements can be arranged in any order on the report, and the user can decide from two popular report formats: cross-tab for easy data analysis, and detail listing for informational display. Once the report template has been determined and the elements placed on the template, the user can select from a list of pre-defined query "filters" (see Report Capabilities above) to limit the data shown on the report. After the user clicks the "Finish" button on the wizard dialog, the report is preferably executed and the results displayed in full screen mode.

Saving New or Modified Reports

After a new report has been created or the format of an existing report has been modified, the changes can be saved by pressing the "Save" button on the toolbar(in some preferred embodiments there are buttons instead of a toolbar). The report can be saved with a new name or overwrite an existing one if changes have been made. Because this step requires careful consideration on the user's part, Report Creation wizard dialog is preferably displayed to help the user select the "folder" into which to save the report. The user's security privileges determine which folders he can save reports into, as well as protect existing reports from potentially being overwritten by mistake.

Financial Consolidation

Financial statements report the results of performance and the financial position of an automotive retail enterprise. The financial consolidation process supports flexible report generation, report format flexibility for the various external users of the information and report distribution flexibility. The financial consolidation application interfaces with the EIM data warehouse applications to allow for further analysis of financial data. The system provides for a means of explaining or reconciling differences between consolidated information with sales information.

Application Administration

EIM system administration functions include the following.

User and Role Administration

A system administrator is able to add and delete users, assign roles to users, and assign access privileges for both reports and home pages. The home page is set up for each login. There is no central place for the administrator to set up the home page for other users. The administrator would have to log in as that user. EIM does not assign a dealership or store along with the role given to a user. This is because the EIM solution spans all dealerships within an enterprise.

Administrators are also able to assign security privileges to roles that have been predefined in the EIM system. The administrator generally can create or delete roles (at least in some embodiments of the system) in order to tailor the available roles to meet the businesses needs.

A report can be published to a user, organization, class, or user group and not to a role (profile).

Organization Hierarchy

EIM provides the ability to add new organizations to the structure and, in some embodiments, the ability to delete them. In some embodiments, organization deletions are dealt with during the system purge mechanism because of the relationship to historical data. EIM provides one hierarchical reporting structure for the organizations within the enterprise. Any changes to this structure are tracked within the data warehouse to facilitate correct historical reporting. EIM provides the capability to drill up or down on this hierarchy to view higher or lower levels of detail on reports. EIM also provides unlimited additional "classifications" which the enterprise can use to group organizations for various reporting purposes. These classifications are identified by the enterprise and maintained by the system administrator. The classifications can be used to group organizations together for sorting or summarization purposes.

Warehouse Data Load Error Correction Information loaded into the warehouse from the operational system(s) will occasionally contain circumstances that require user intervention. This will most likely occur with data elements for which the operational system allows free form textual input but the warehouse requires some form of validation. Examples of this in EIM include customer names and vehicle colors.

EIM provides an auditing mechanism that will notify an administrator when errors have occurred during the warehouse update process. An audit report is produced which identifies if any errors have occurred during the warehouse update process. The distribution of this report will take many forms depending upon the capabilities and desires of the enterprise. The system can send the audit to the administrator(s) directly if the enterprise has email capability. It can also print the report directly to any laser printer available on the network. At a minimum, the report will always be available online and accessible through the EIM application itself.

Once the administrator has been notified, he can access the EIM application to view the errors that have been generated. Error correction takes place on the same screen on which the errors are displayed. Depending upon the type of error, EIM allows the user to type in a correction, select from a lookup table, or choose from a pre-selected set of possible values. To speed in the correction of errors, they can be viewed all at once or in sets filtered by error type, data set, and date. This provides not only a shorter list to work from but also facilitate the enterprise assigning more than one person to correct the errors that have occurred. In some preferred embodiments, any corrections that are made to the data records are fed back into the system during the next warehouse update cycle. The "Warehouse Update" section of this document provides more information on the type of errors that might be generated or on the warehouse update process in general.

MicroStrategy™ DSS Web administration

A third party tool from MicroStrategy, Inc. which is integrated with the EIM solution also provides a set of administration screens for administering its web solution. There is no link to this administration application within the EIM, and a separate URL is used so that system administrators will have easy access to the information and capabilities that it provides. The capabilities provided with the MicroStrategy administration application include configuration and tuning parameters for the product, setting global security and interface properties, and definition of system report caching. All of these parameters are established either during product development or product installation and system administrators are encouraged not to modify any of them.

However, this mechanism also provides valuable status information in the event an error occurs within the system. In this case, it is likely that many fixes can be accomplished through this administration interface rather than requiring a support call. In the event that a support call is needed, this mechanism provides the current status and other diagnostic information that allows remote support personnel to more readily identify the problem.

Site User Interface Settings

As shown in the "Application Layout" section, EIM provides the enterprise with the ability to select its own color scheme (background color, foreground color, font and highlight colors) and logo. The system administrator is given the ability to select or change these options. Initially, EIM provides a standard set of colors, fonts, etc. from which the selection can be made. Dealer logos may be provided with EIM or obtained from the enterprise during the engagement and installation procedures.

EIM Home Page Configuration Manager

Figure 8:
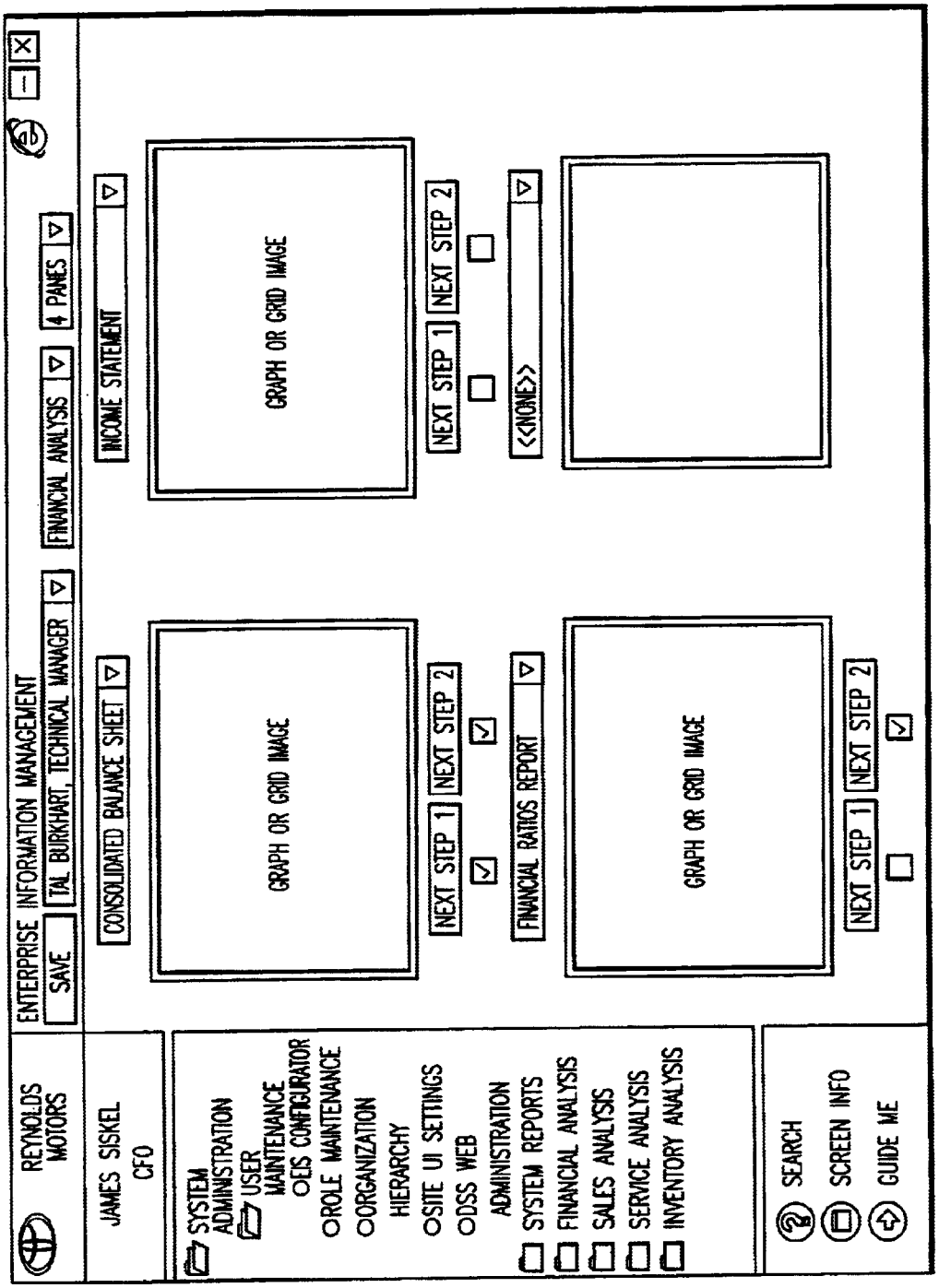
FIG. 8 shows a prototype of an EIM home page configuration manager according to embodiments of this invention.

EIM provides the capability to customize the system's Home pages to provide specific reports for roles or users. This customization process allows each individual to obtain the information pertinent to their function or area of responsibility. In preferred embodiments of this invention, each home page can contain up to four reports or graphs. Each report or graph, in turn, may be associated with one or more predefined next step buttons that will automatically launch a related report or graph. FIG. 8 provides an prototype view of the configuration manager according to embodiments of this invention.

The Home Page is preferably configured per login. Once this has been selected, the administrator must then decide how many reports or graphs are shown on the home page and select accordingly. If a previous home page had been established for this role or user, the system will display its definition. The system will default to four panes for new home pages. If only two panes are chosen for display, the reports will appear side by side or one above the other, at the users direction. Next, the administrator can choose the desired report, but not more than four (4) reports, by selecting it/them from the drop down list provided in the desire pane. The administrator does not have to make a selection in every pane. The drop down list contains only reports available to select on the user's home page. Those specific reports in the system that the user does not have access rights/privileges to are not identified in the list. Should the administrator select a report for which the user does not have access privileges, the administrator is prompted to update the privileges at the time the home page is saved. Once a report has been selected, the next step buttons for that report are displayed (if there are any defined). The default allows the user access to each next step button as long as the user has access privileges to the report associated with the button. In the event that the user does not have access privileges to the report, the administrator can choose to update the privileges when saving the home page. The administrator will also be given the ability to remove a next step button from appearing simply by deselecting the check box below the button. This provides the enterprise with the ability to tailor the analysis paths of its users should they desire to do so.

Installation Settings

Figure 9:
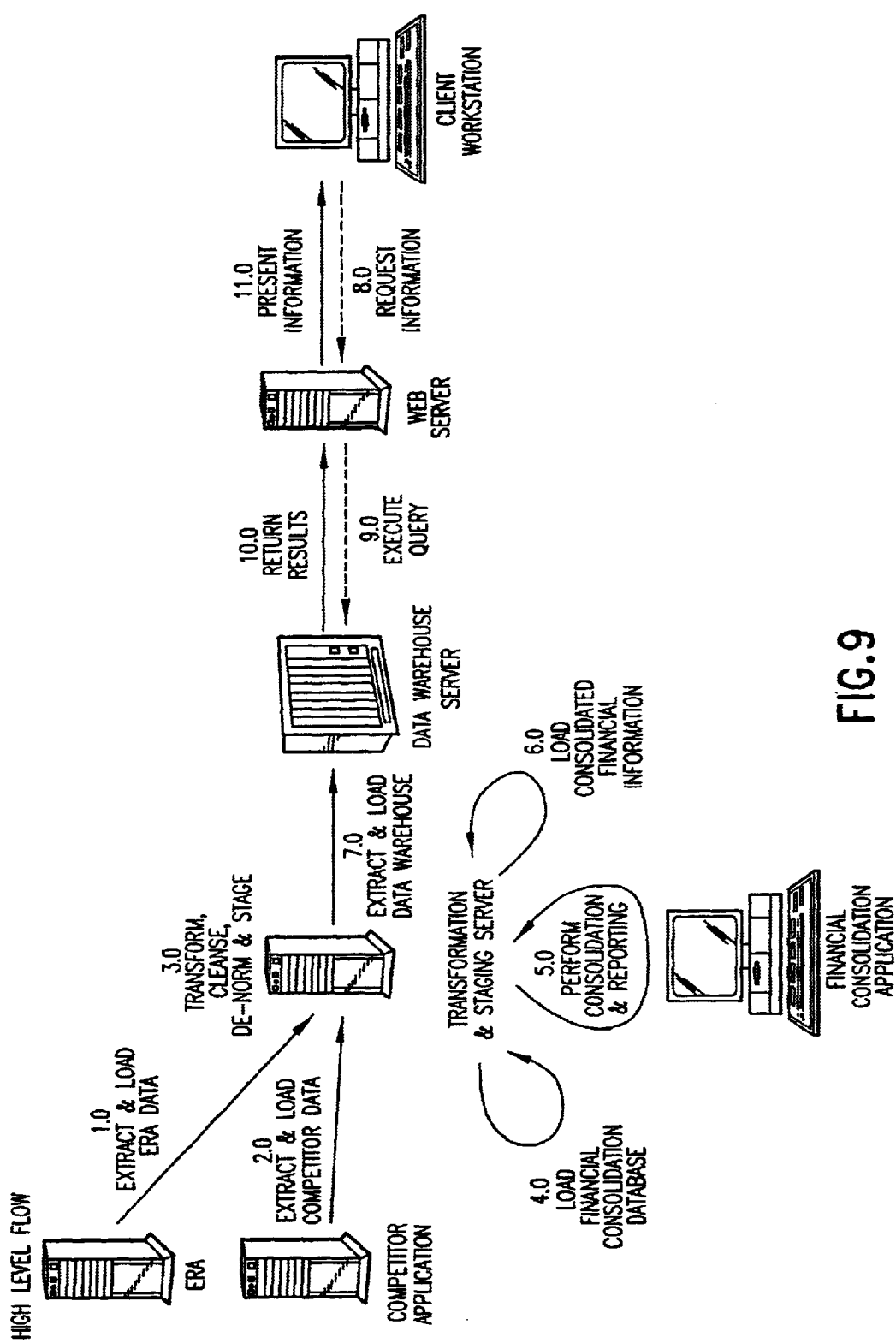
FIG. 9 depicts a high-level flow diagram of aspects of operation of embodiments of the present invention.

There are additional system administrator functions associated with the EIM installation process. Some examples of these include interfaces for:

Defining the business units within a store structure and how those business units are associated with prefixed accounts and vehicle makes for the purpose of segmentation Mapping vehicle colors found in the operational system, interior and exterior, to a common color category Scheduling of the warehouse update and backup processes EIM Architecture of Presently Preferred Embodiments The architecture of embodiments this invention will now be described with reference to FIGS. 9 to 27(Q). As shown in FIG. 9, which depicts a high-level flow diagram of aspects of operation of embodiments of the present invention, client workstation 102 connects to Data Warehouse server 104 via web server 106. A transformation and staging server 108 connects ERA 107 and other (competitor) applications (e.g., ADP System(s) 110), 112 to the Data Warehouse server 104.

ERA

ERA 107, is a proprietary (Reynolds & Reynolds) operational system with a customized extraction process whereby the uniVerse 5.3 file system is exposed via an Open Database Connectivity (ODBC) driver that allows for SQL-based queries to retrieve data. ERA data is pulled to the transformation and staging server 108 (via the SQL requests imbedded within data flow plans and placed directly into temporary) staging tables to prepare for the transformation and cleansing process prior to its movement to the data warehouse.

ADP

Data from ADP 110 is to be captured via the current Data Collection Services that support the CarPoint, CMS, and other initiatives. ADP data is pulled locally at the store via dial-up connection. Once the data has been extracted, the local client transfers (preferably via FTP) the flat files to specified directories on the transformation and staging server 108. When ADP data arrives at the transformation and staging server 108, data flow plans move the flat files into the temporary staging area.

System and Database Architecture

Figure 10:
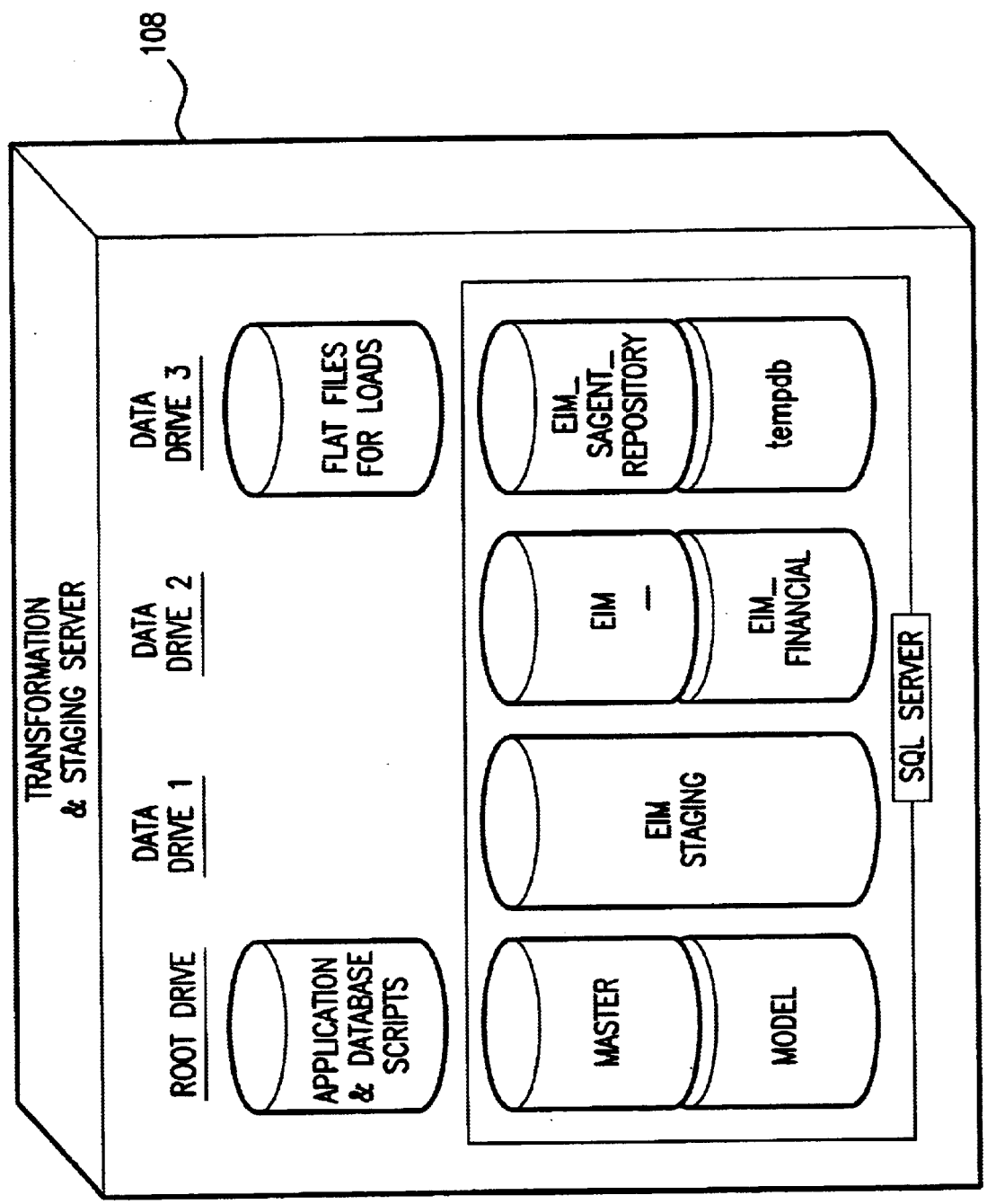
FIGS. 10–11 show various databases and files of embodiments of the present invention.

As shown in FIG. 10, the transformation and staging server 108 includes the following databases and files:

1. On root drive:
   Master
   Model
   EIM Staging
2. On Data Drive 1:
   EIM Staging
3. On Data Drive 2:
   EIM Error
   EIM Financial
4. On Data Drive 3:
   Flat file for loads
   EIM Sagent Repository
   Tempdb The various databases are described below.

| Master | |
|---|---|
| Description | The Master database is a standard MS SQL Server database that contains all of the system tables. |
| Placement | Master Device - \MSSQL\DATA\MASTER.DAT |
| Size | 50 MB |
| Updates | System only - most information created at setup time only |
| Volatility | Low - Important information, but most information changes infrequently |
| Backup Frequency & Procedures | Daily - As part of a Full System backup using the full FGIS backup solution. On-request - Prior to and following any system upgrade using the FGIS manual backup procedures. |

| | Model |
|---|---|
| Description | The Model database is a database template for the creation of all new databases. |
| Placement | Master Device - \MSSQL\DATA\MASTER.DAT (may change with SQL Server 7.0) |
| Size | 1 MB |
| Updates | No regular - created at setup time only. |
| Volatility | Low - Very infrequent changes, only possible with an upgrade of EIM |
| Backup Frequency & Procedures | Daily - As part of a Full System backup using the full FGIS backup solution. On-request - Prior to and following any system upgrade using the FGIS manual backup procedures. |

| | tempdb |
|---|---|
| Description | The tempdb database is used as a temporary work area for the creation of temporary tables and information. |
| Placement | Temporary Device - \datadrive3\DATA\TEMP_DATA.DAT |
| Size | 100 MB |
| Updates | Updated by queries as needed and procedures specifically when requested |
| Volatility | Low - Important for the queries of only at the time of execution, changes frequently |
| Backup Frequency & Procedures Monthly to Daily change on my own. | Daily - As part of a Full System backup using the full FGIS backup solution. On-request - Prior to and following any system upgrade using the FGIS manual backup procedures. Transaction Log - can be dumped daily |

| | EIM_Staging |
|---|---|
| Description | The EIM_Staging database contains all of the data from ERA and the competitor systems that is being or has been cleansed, transformed, denormalized, summarized, etc.. |
| Placement | EIM Staging Device - \datadrive1\DATA\EIM_STAGE.DAT |
| Size | Large - 8 GB Medium - 8 GB Small - 4 GB |
| Updates | Updated daily with information from source systems |
| Volatility | High - Important information, updated frequently |
| Backup Frequency & Procedures | Daily - As part of a Full Database backup, using as many FGIS procedures as possible |

| | EIM_Error |
|---|---|
| Description | The EIM_Error database contains source information that could not automatically be cleansed or transformed and requires review by Enterprise personnel to be re-loaded into EIM. |
| Placement | EIM Staging Device - \datadrive2\DATA\EIM_ERROR.DAT |
| Size | Large - 2 GB Medium - 2 GB Small-1 GB |

-continued

| | EIM_Error |
|---|---|
| Updates | Updated daily with invalid information from source systems |
| Volatility | High - Important information, updated frequently |
| Backup Frequency & Procedures | Daily - As part of a Full Database backup, using as many FGIS procedures as possible (My own change) |

| | EIM_Financial |
|---|---|
| Description | The EIM_Financial database is used by the EIM Financial Consolidation tool and contains consolidated and summarized Financial information |
| Placement | EIM Financial Device - \datadrive2\DATA\EIM_FIN.DAT |
| Size | Large - 6 GB Medium - 6 GB Small-3 GB |
| Updates | Consolidated monthly with Financial information from source systems and updated possibly daily for adjustments, allocations, and table maintenance. |
| Volatility | High - Important information, updated possibly frequently |
| Backup Frequency & Procedures | Daily - As part of a Full Database backup, using as many FGIS procedures as possible |

| | EIM_Sagent_Repository |
|---|---|
| Description | The EIM_Sagent_Repository database is used by the Sagent transformation tool and contains information regarding the transformation procedures and automation plans. |
| Placement | Sagent Repository Device - \datadrive3\DATA\EIM_SAGENT.DAT |
| Size | 50 MB |
| Updates | Sagent transformation tool only - most information loaded as part of EIM installation only |
| Volatility | Medium - Important information, updated infrequently |
| Backup Frequency & Procedures | Daily - As part of a Full Database backup, using as many FGIS procedures as possible (my own change) |

Database Tables

The following are the various types of tables that is used in the databases on the Transformation and staging server 108 and their usage or purpose.

| Table Type | Table Sub-Type | Database | Usage/Purpose |
|---|---|---|---|
| Normalized | Temporary | EIM_Staging | Table(s) used for periodic transaction data loads of a normalized permanent table; refreshed data may or may not use normalized temporary tables. |

-continued

| Table Type | Table Sub-Type | Database | Usage/Purpose |
|---|---|---|---|
| | Permanent | EIM_Staging | A table that contains data in a normalized form, generally, the physical version of a table identified in the logical model. |
| De-normalized | Temporary | EIM_Staging | Table(s) used to source a denormalized permanent tables with the data from the normalized temporary tables (periodic transaction updates). |
| | Permanent | EIM_Staging | A table that contains data from multiple normalized permanent tables created to improve query performance. |
| Summary | Temporary | EIM_Staging | Table(s) used to source a permanent summary table that contains information that is not completely refreshed each time its updated (usually containing history information in a periodic form). |
| | Permanent | EIM_Staging | A table that contains aggregated information from a normalized or denormalized permanent table created to improve query performance. Summary tables can either be completely refreshed each time or contain data aggregated by period (in history form) or some other dimension. |
| Error | Data Format | EIM_Error | Rows of information from the source files with data format errors. |
| | Data Integrity | EIM_Error | Rows of information from the source files with data integrity issues. |

File Systems/Structures

For the EIM Transformation and staging server 108, the physical disk drives are separated by individual logical drives. These drives serve separate purposes and an effort has been made to separate functionality by drive. This was done to minimize disk contention during the various process that run on this machine. For example, the transformation and load process will read the flat files from one disk, load them to another disk, and write any rows in error or other error information to a third disk (i.e., one process, multiple disks).

Root Drive (C:)—contains all of the NT Operating System software.
    (d:) FTP drive for code releales
    (e:) A series of RAID disks
        SQL server
        Sagent
        SQL DB's (for EIM)
        EIM procedural code
        Data load and Batch log directories
    Logins/Database Users Application and user logins to SQL Server preferably use individual SQL server logins and passwords.

Application—Most logins on the Transformation and staging server 108 are of this type. These logins is used for the loading and processing of information from the source systems. These are the only logins allowed in the EIM_Staging, and EIM_Sagent_Repository databases. There are also application logins for the EIM_Error and EIM_Financial databases for the purpose of loading data.

User—There are user logins for the EIM_Error and EIM_Financial databases only. The user logins for the EIM_Error database are limited to those individuals responsible for reviewing and correcting data that did not load correctly and was dumped to this database by the transformation and cleansing process. The user logins for the EIM_Financial database are limited to those individuals responsible for the maintenance of the financial consolidation process or the review and analysis of the consolidated financial information.

Data Warehouse Server 104

Figure 11:
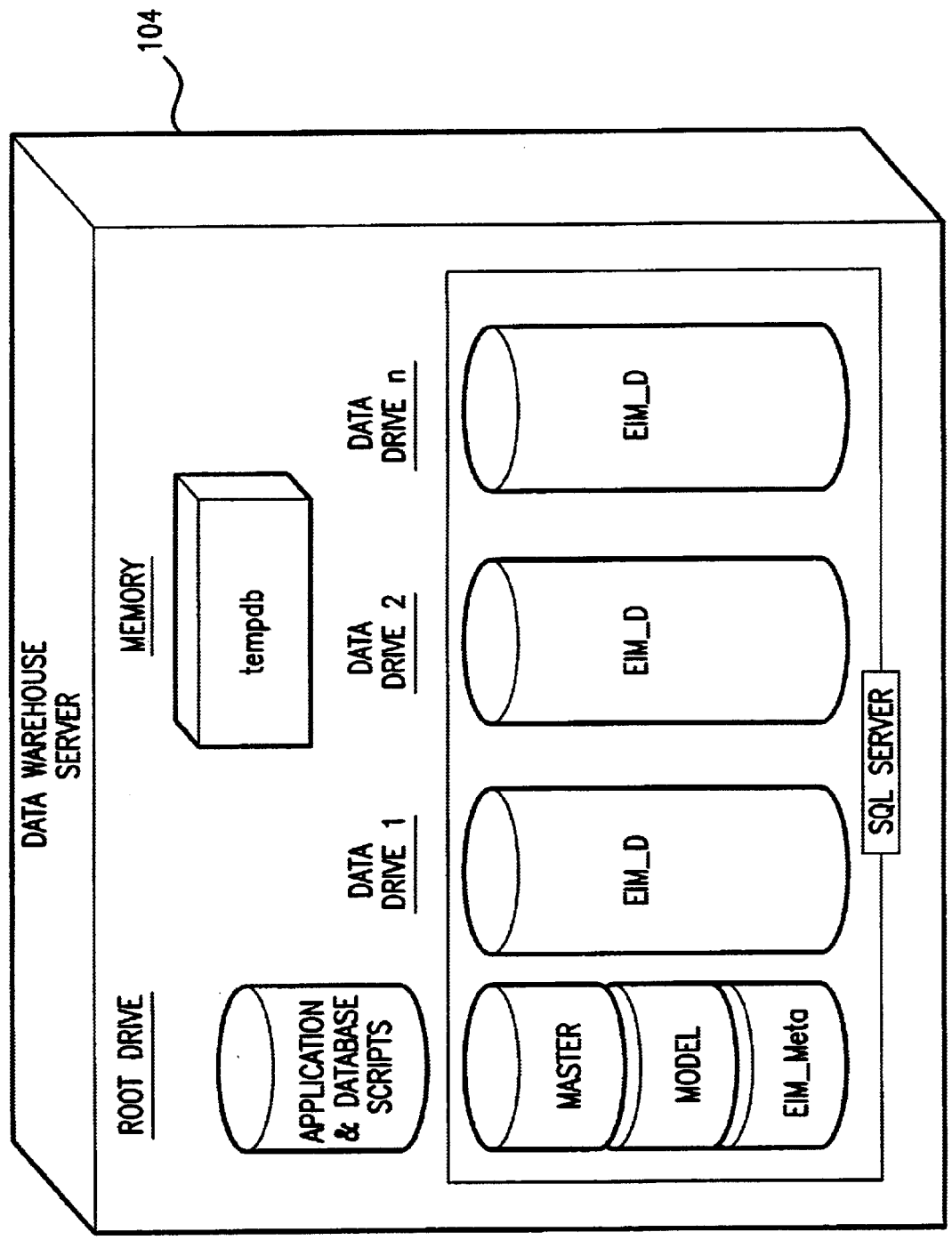
Figure 12:
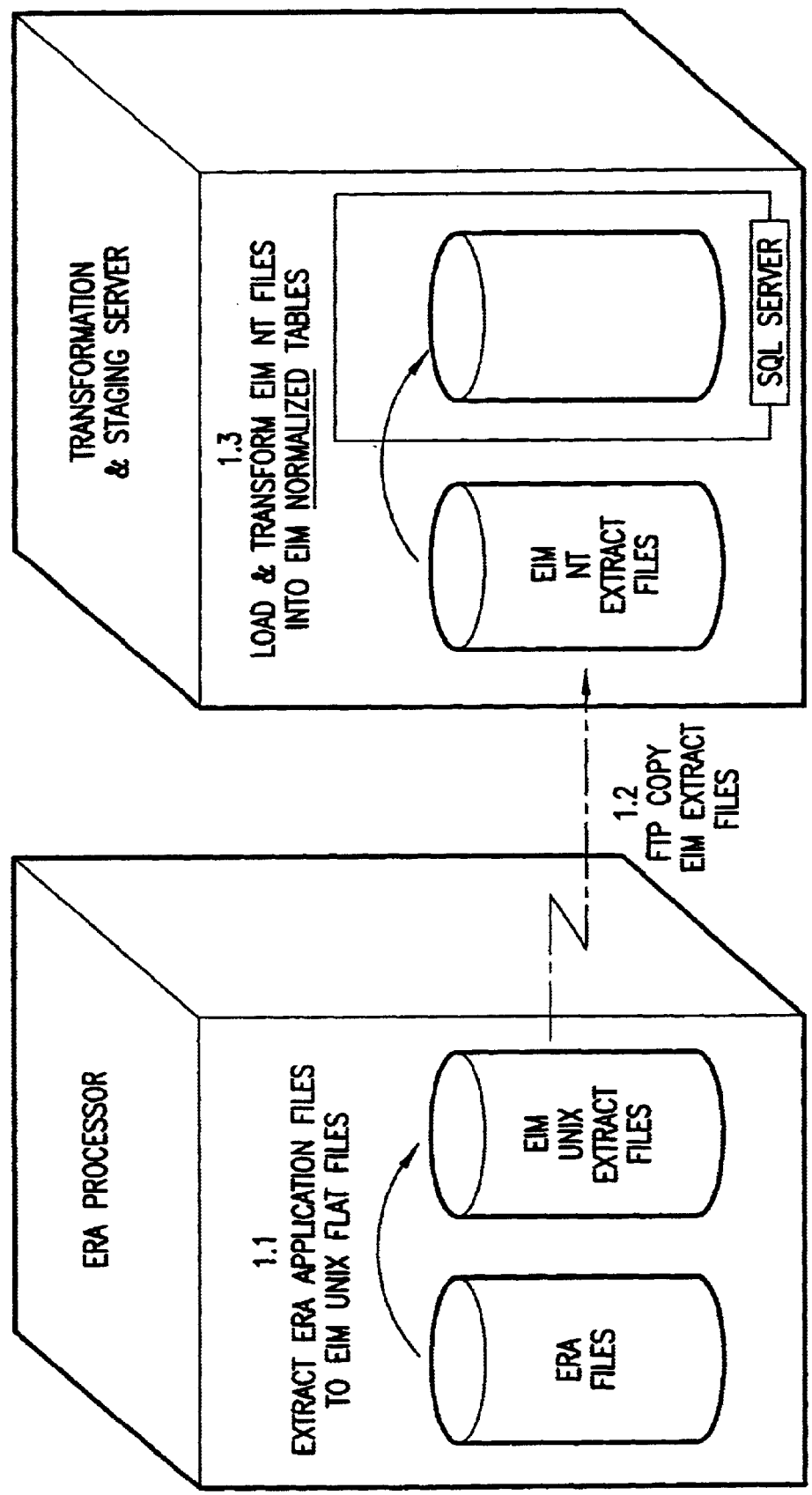
FIGS. 12–21 depict various operations of embodiments of this invention.
Figure 13:
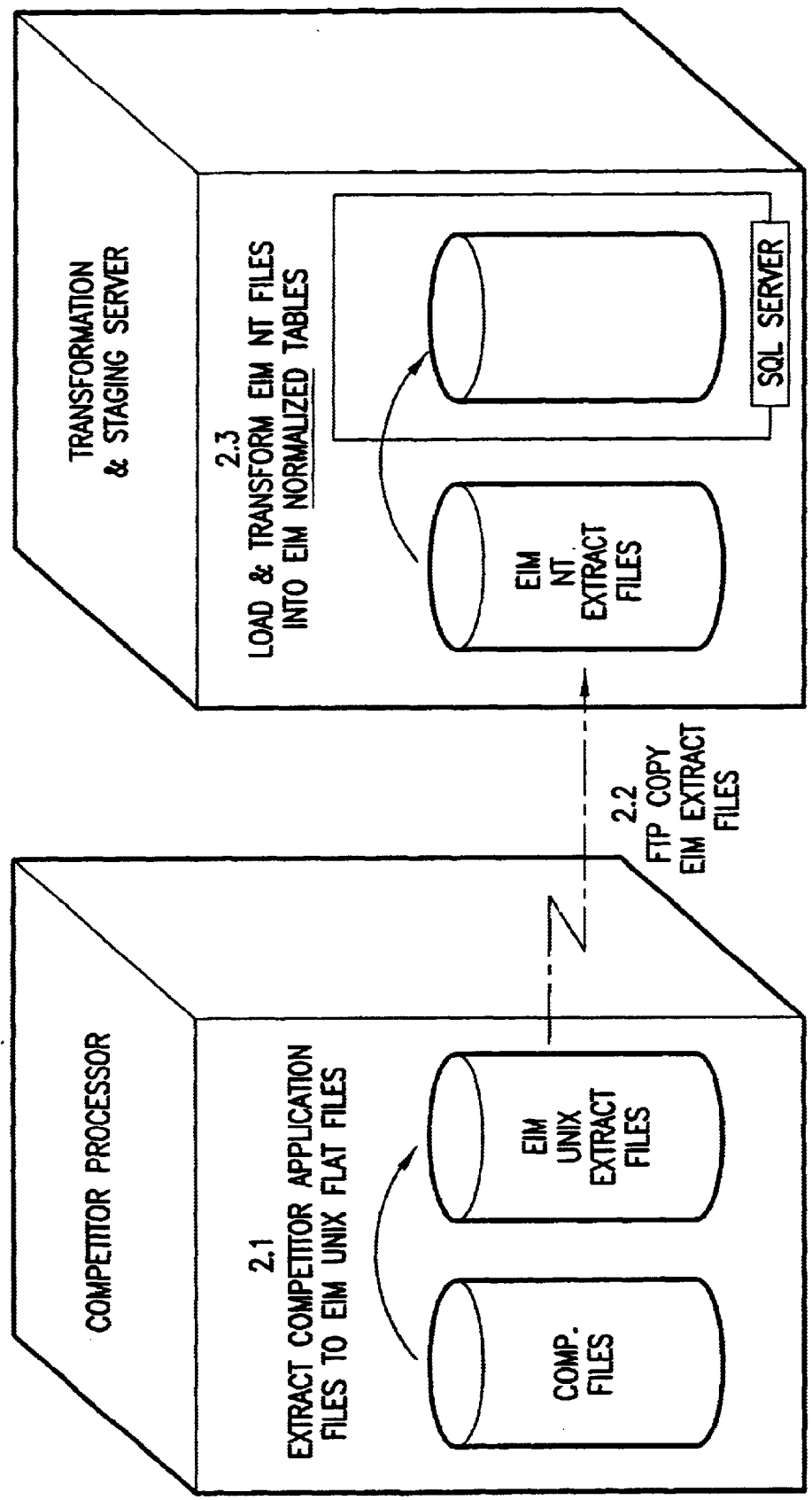
Figure 14:
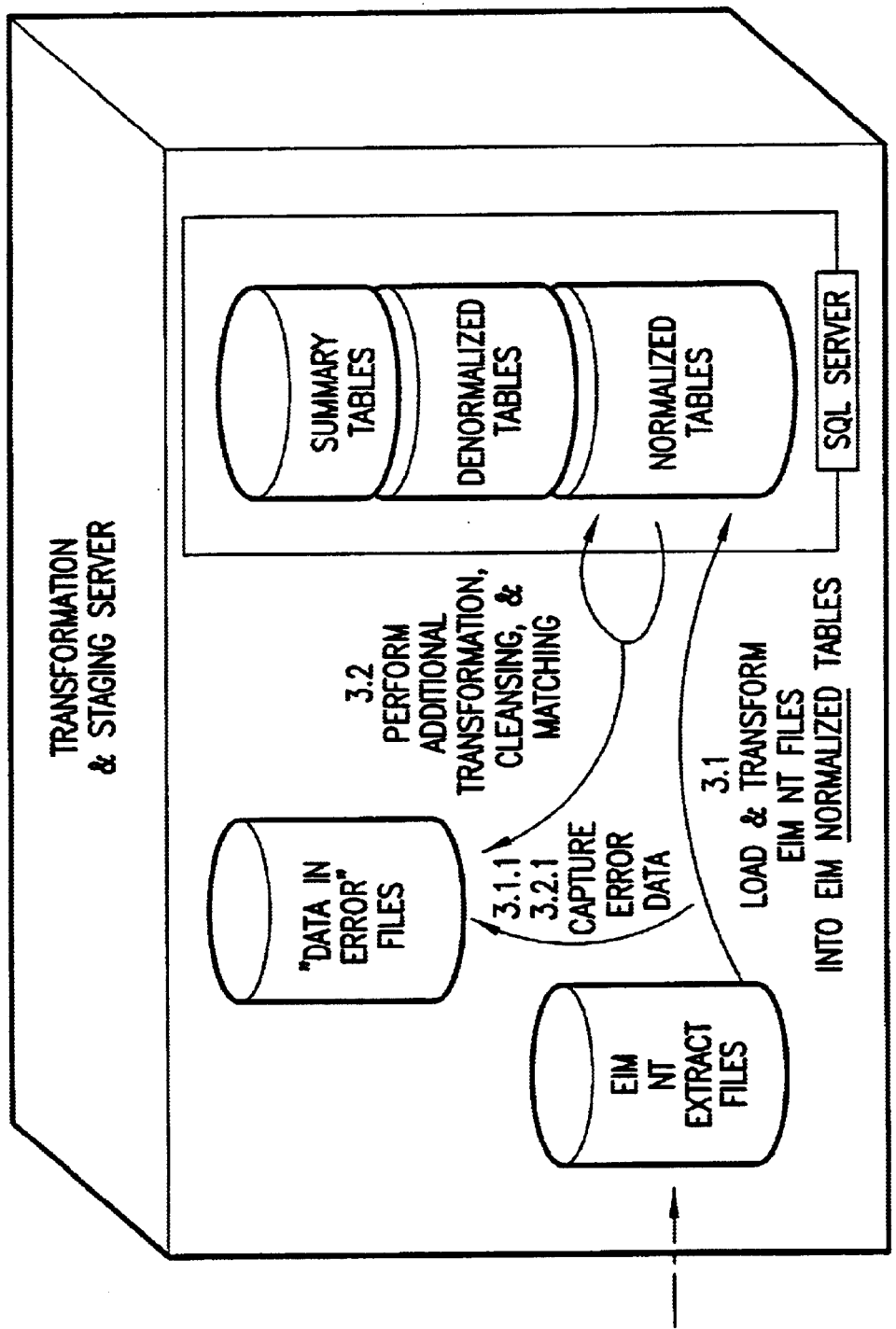
Figure 15:
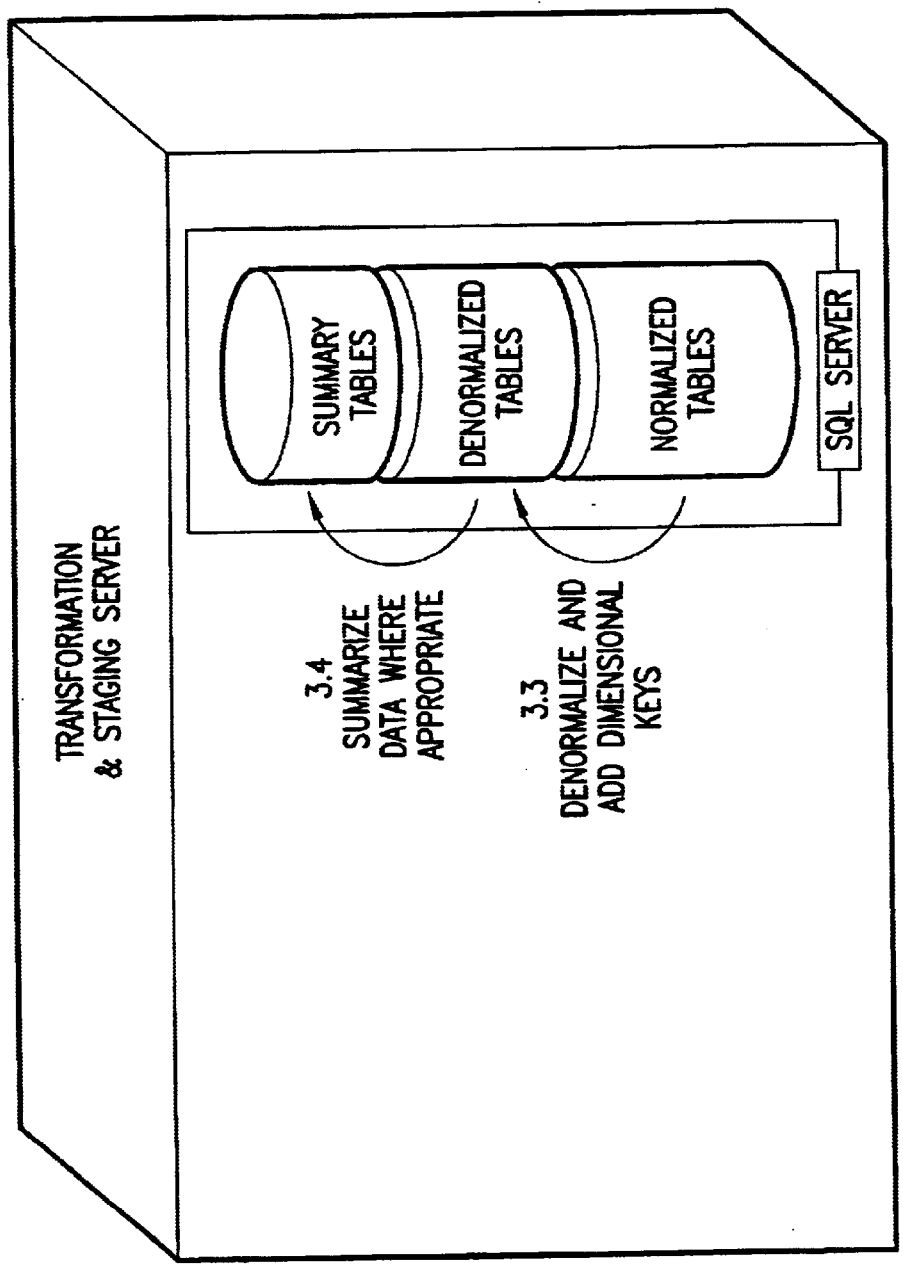
Figure 16:
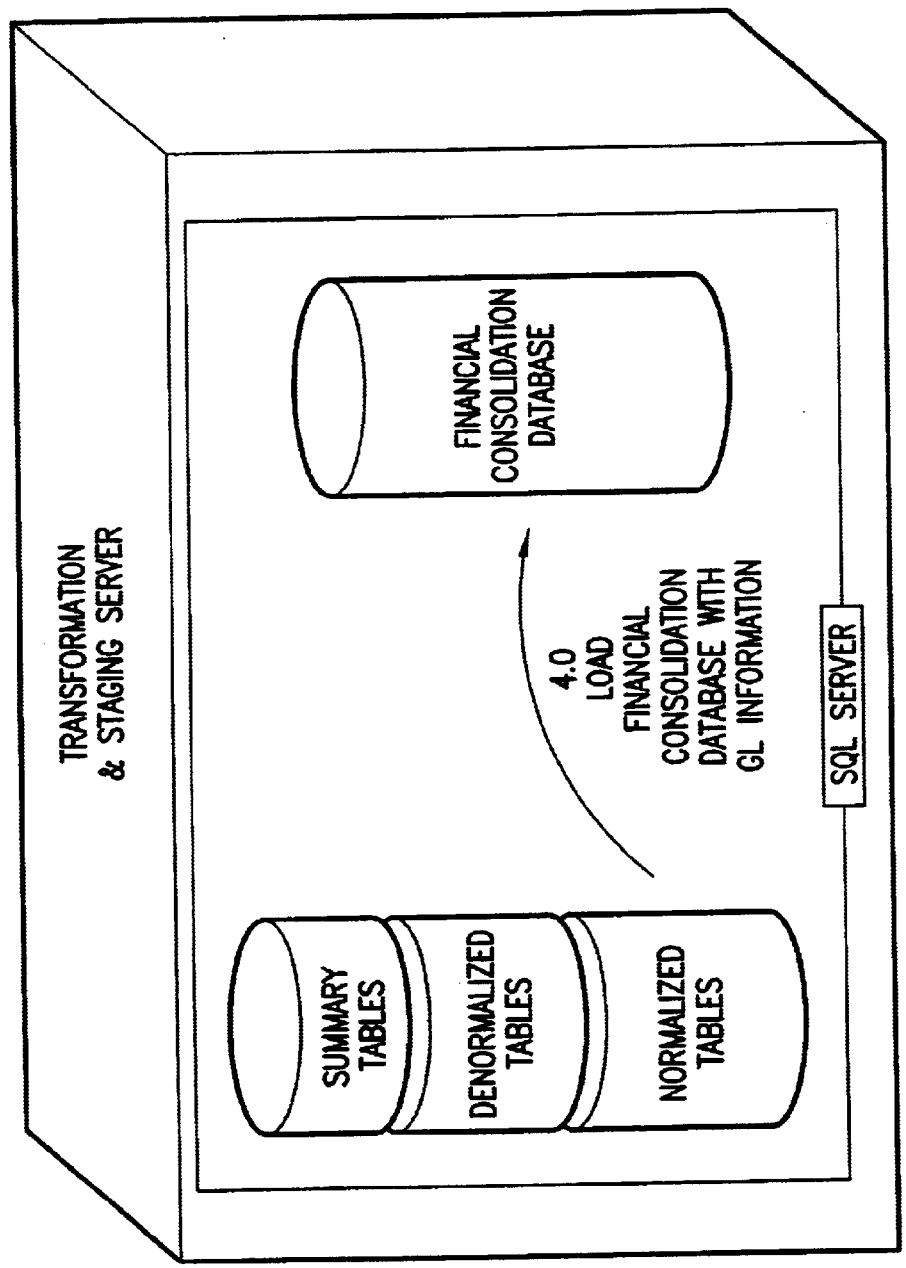
Figure 17:
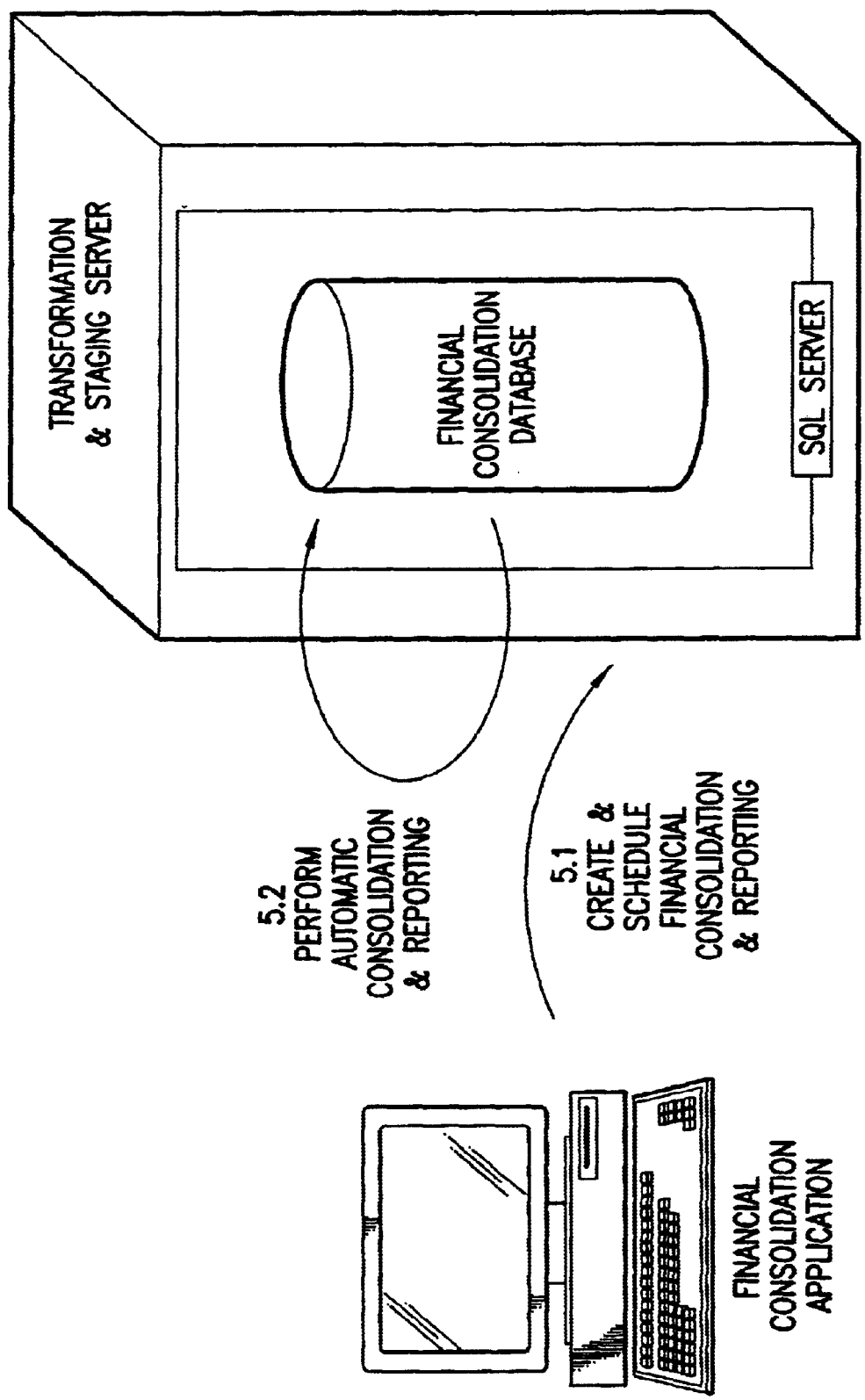
Figure 18:
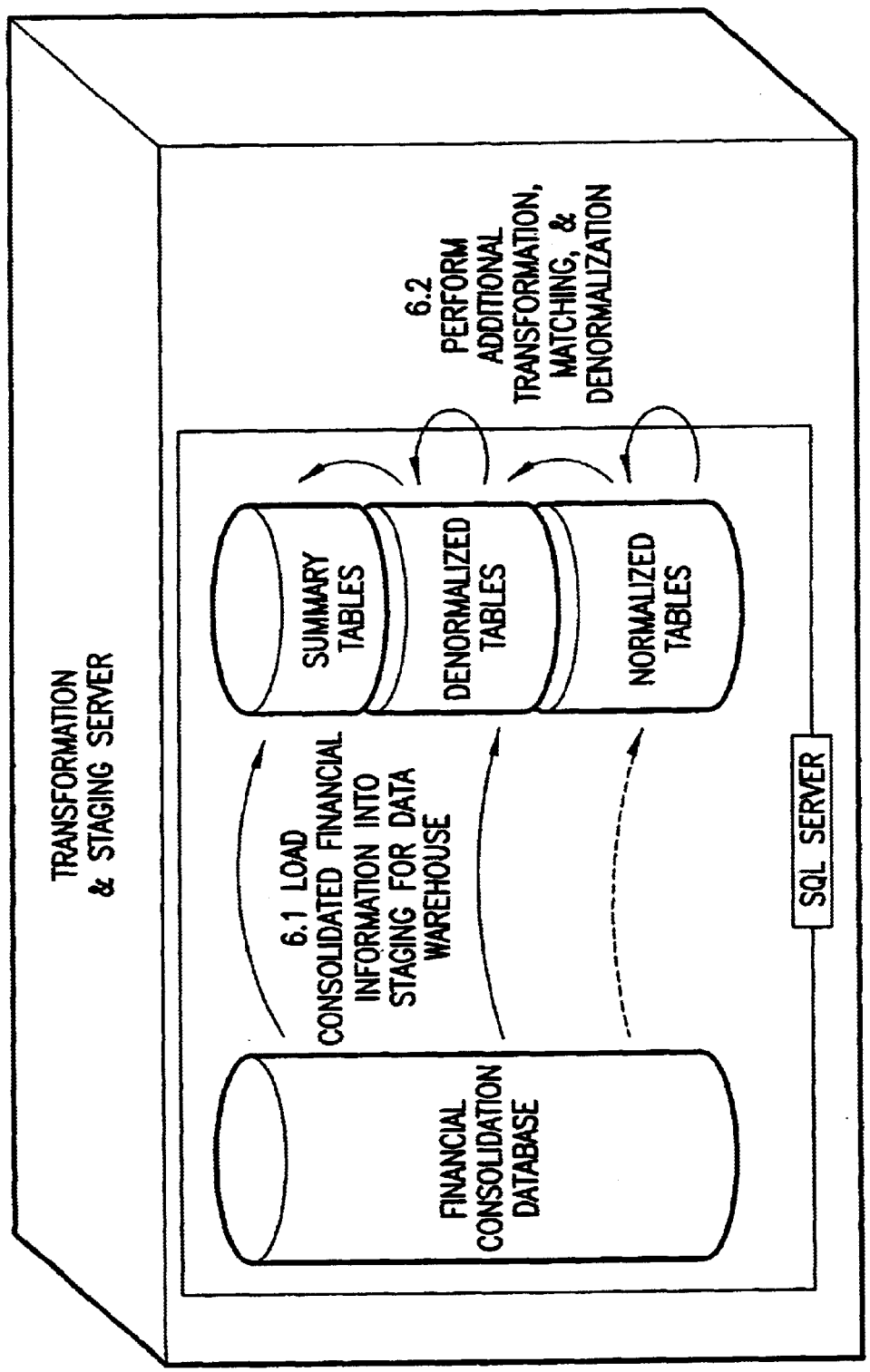
Figure 19:
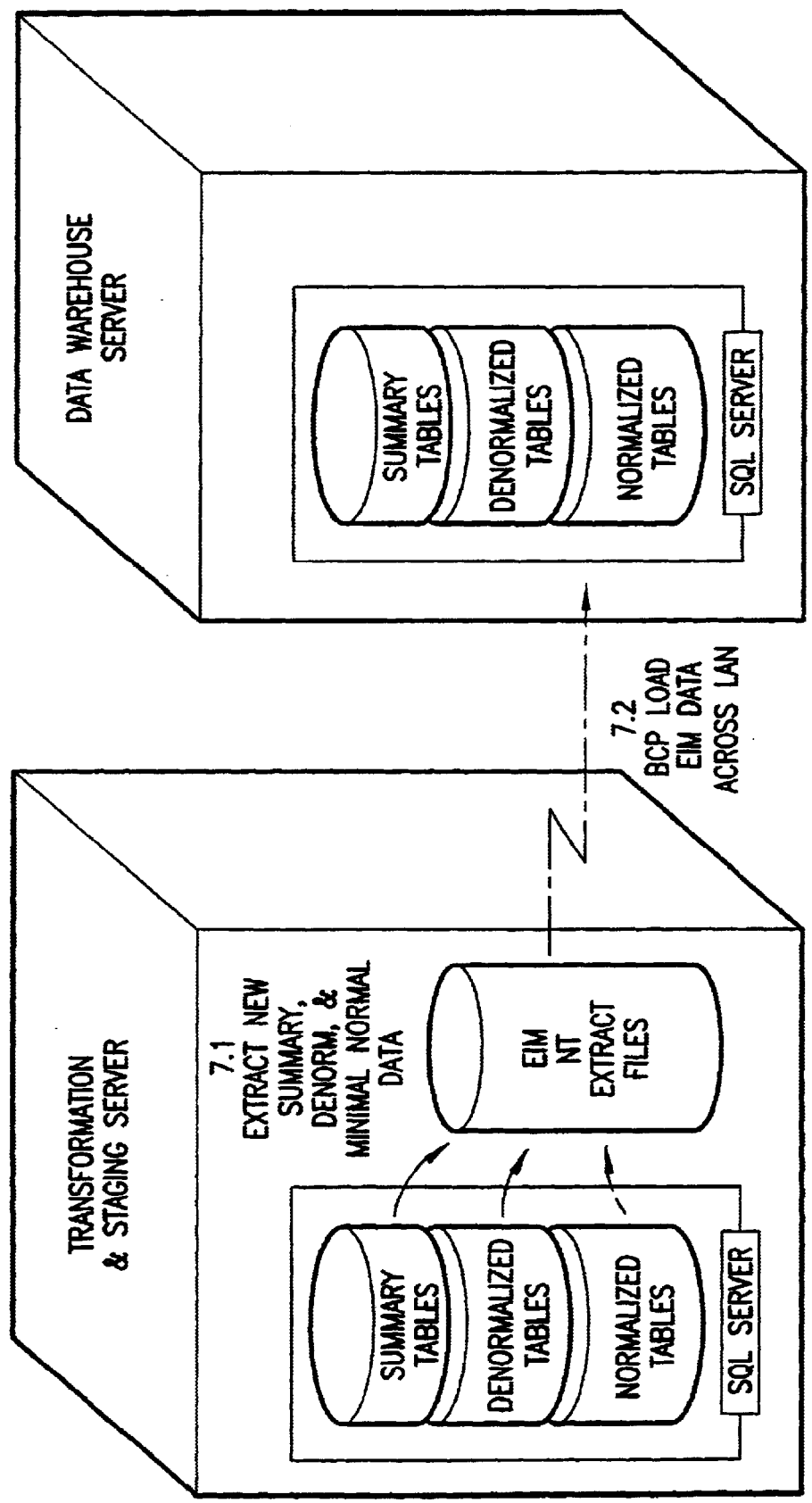
Figure 20:
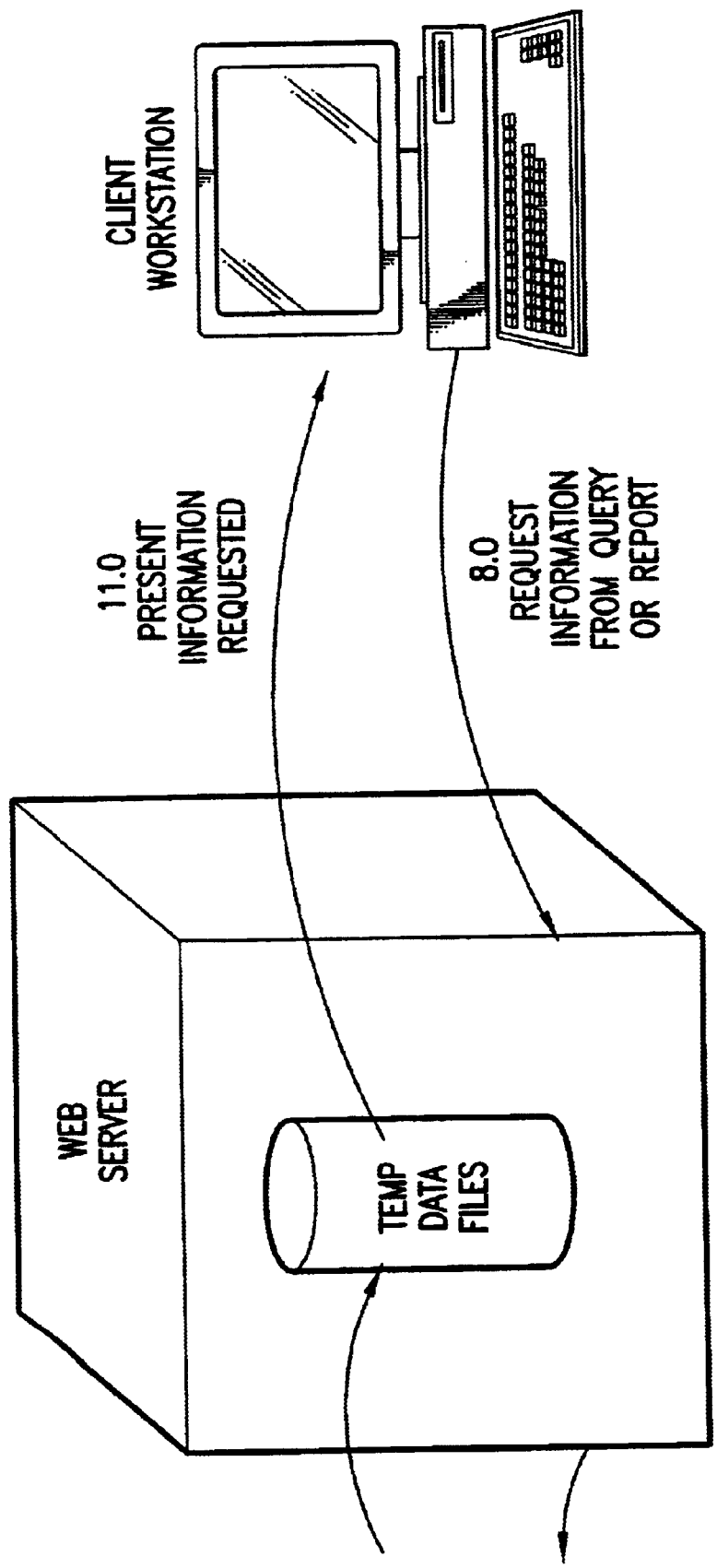
Figure 21:
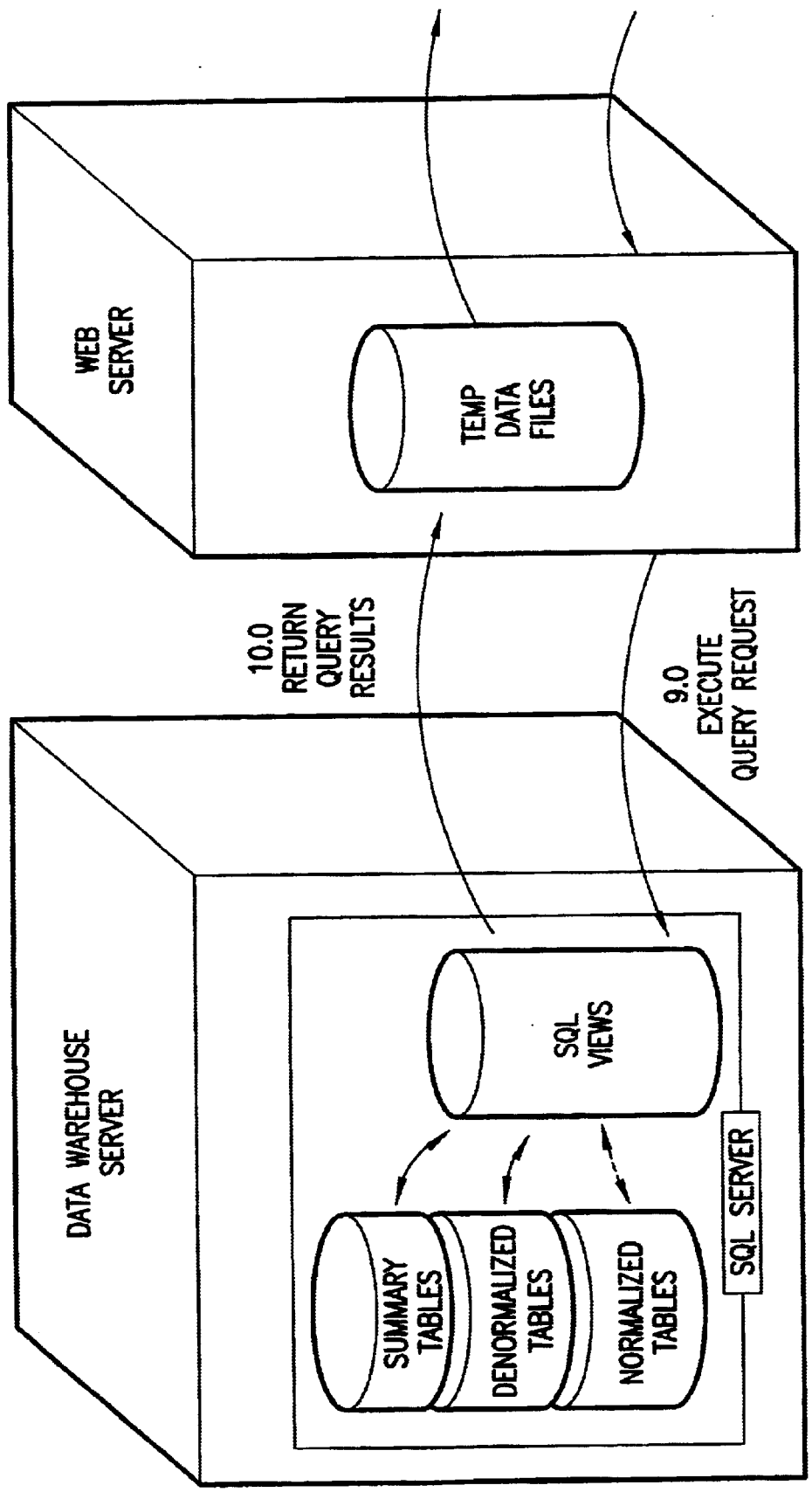
Figure 22A:
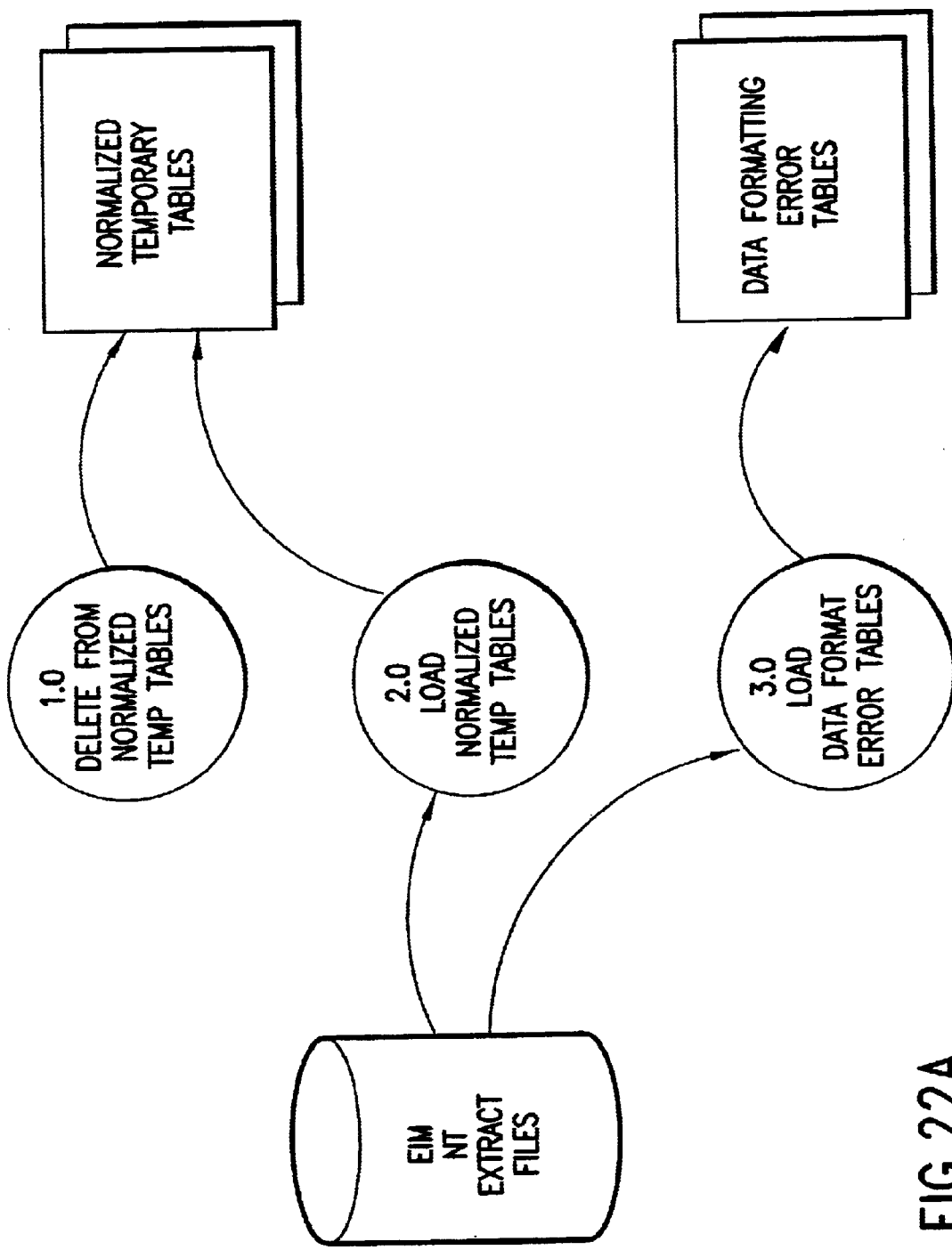
FIGS. 22-A to 22-L depict the flow of various operations according to the present invention.
Figure 22B:
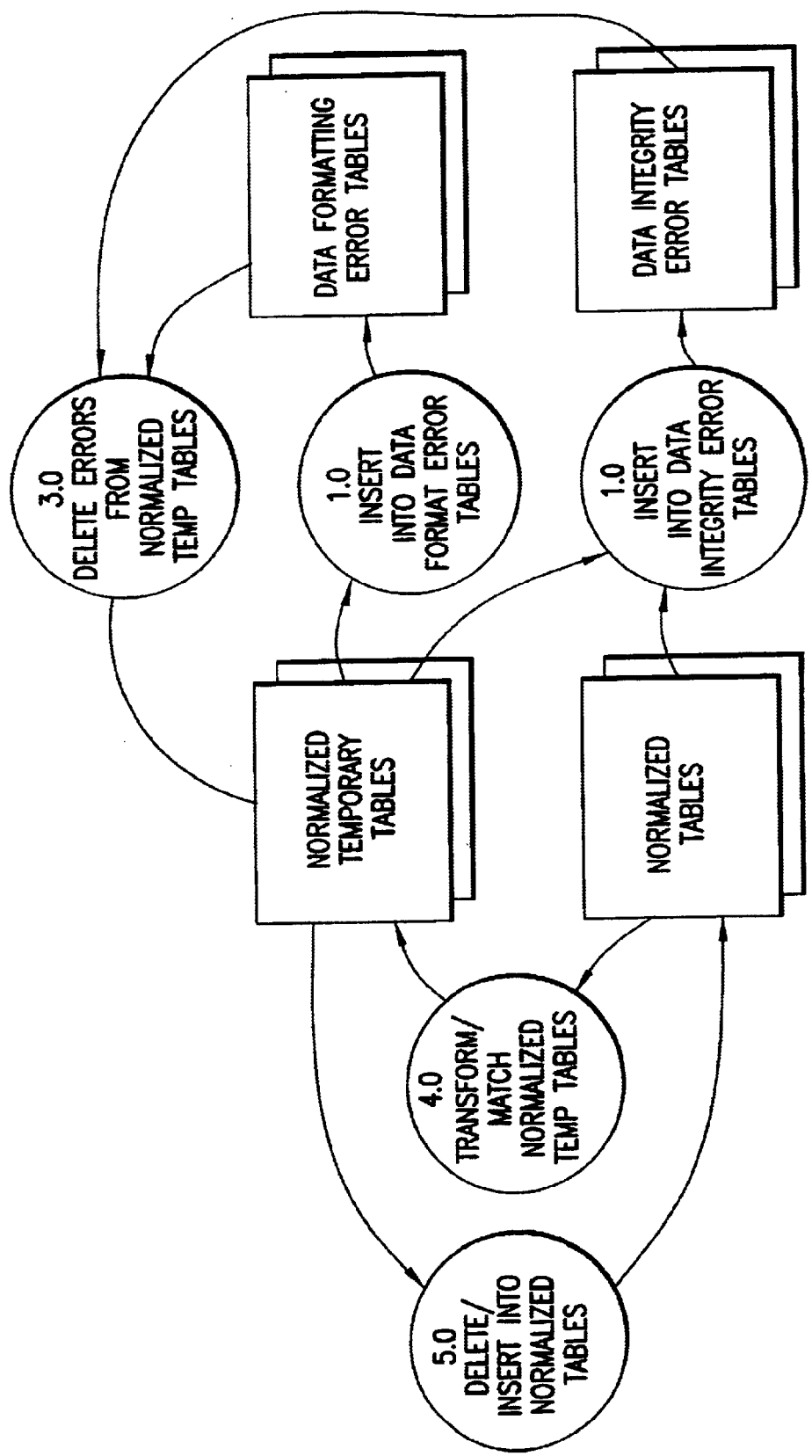
Figure 22C:
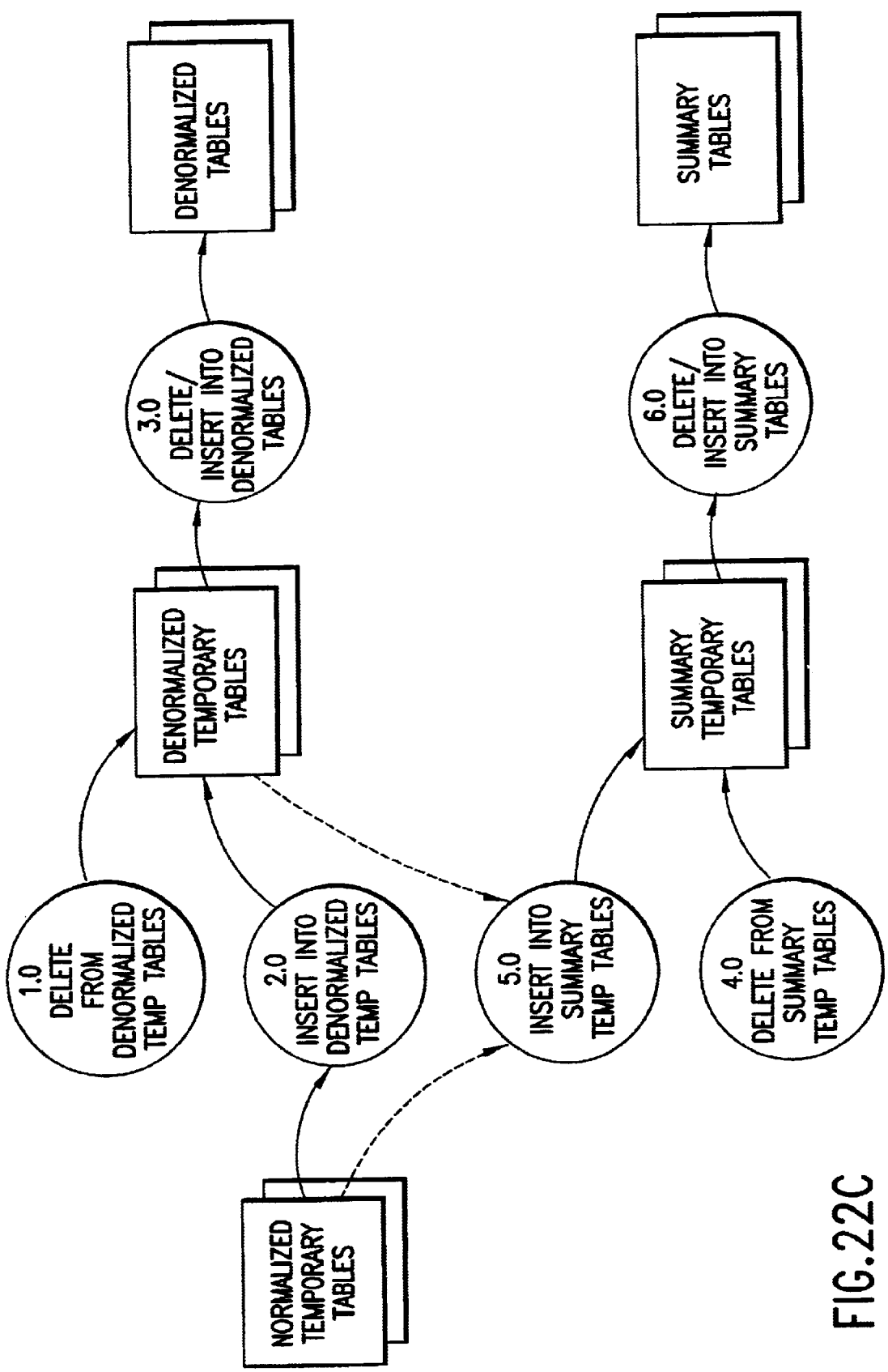
Figure 22D:
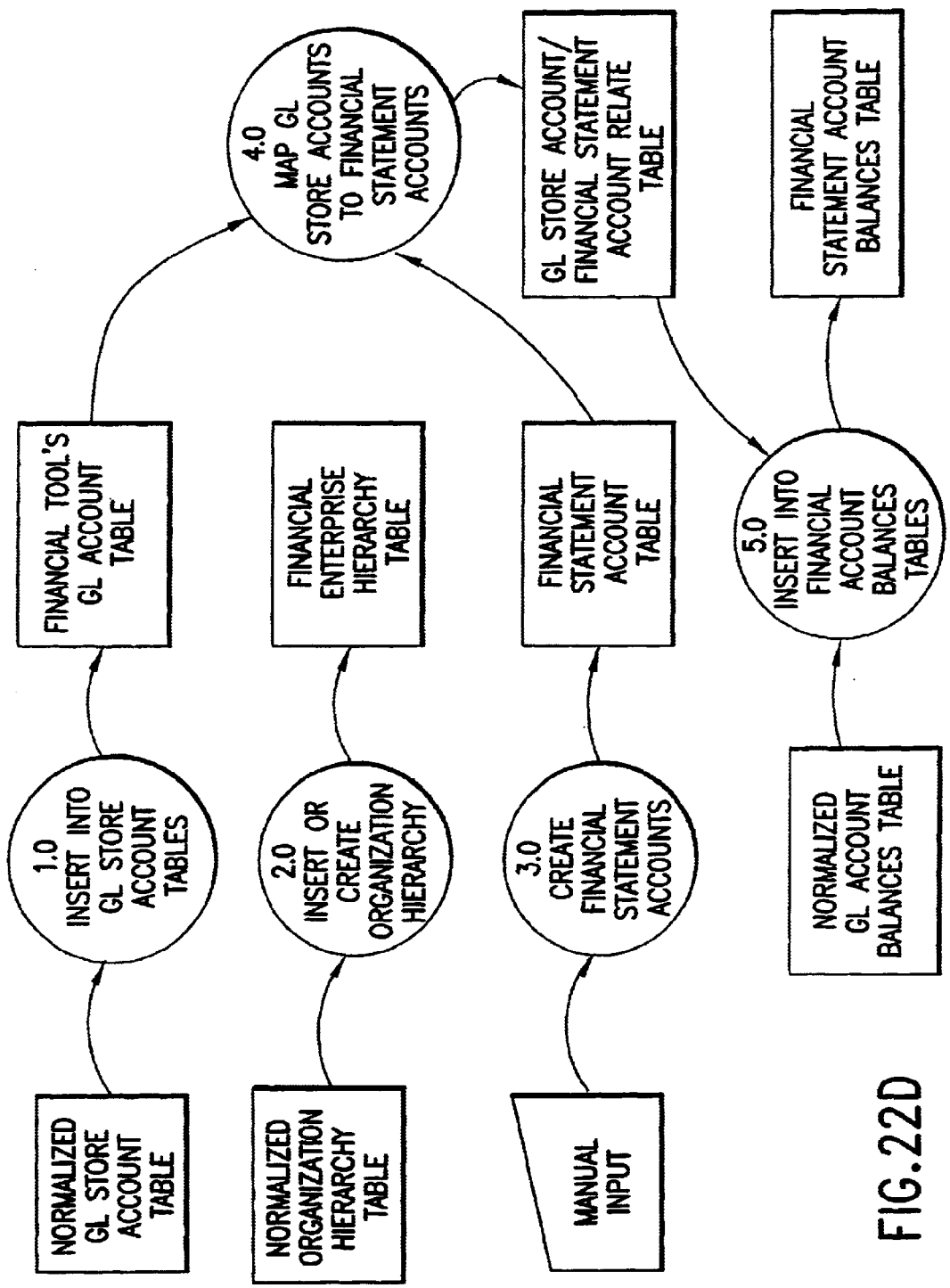
Figure 22E:
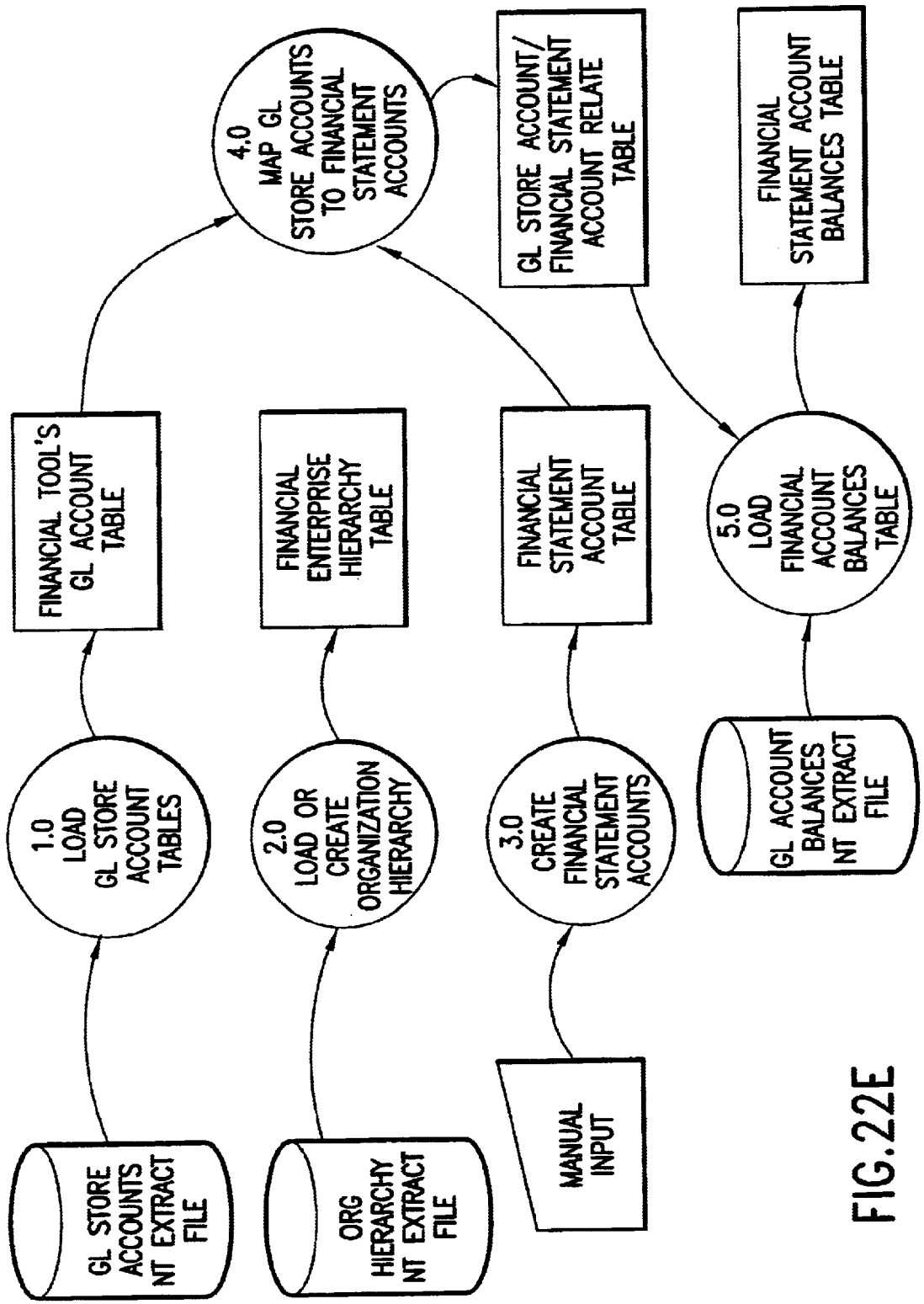
Figure 22F:
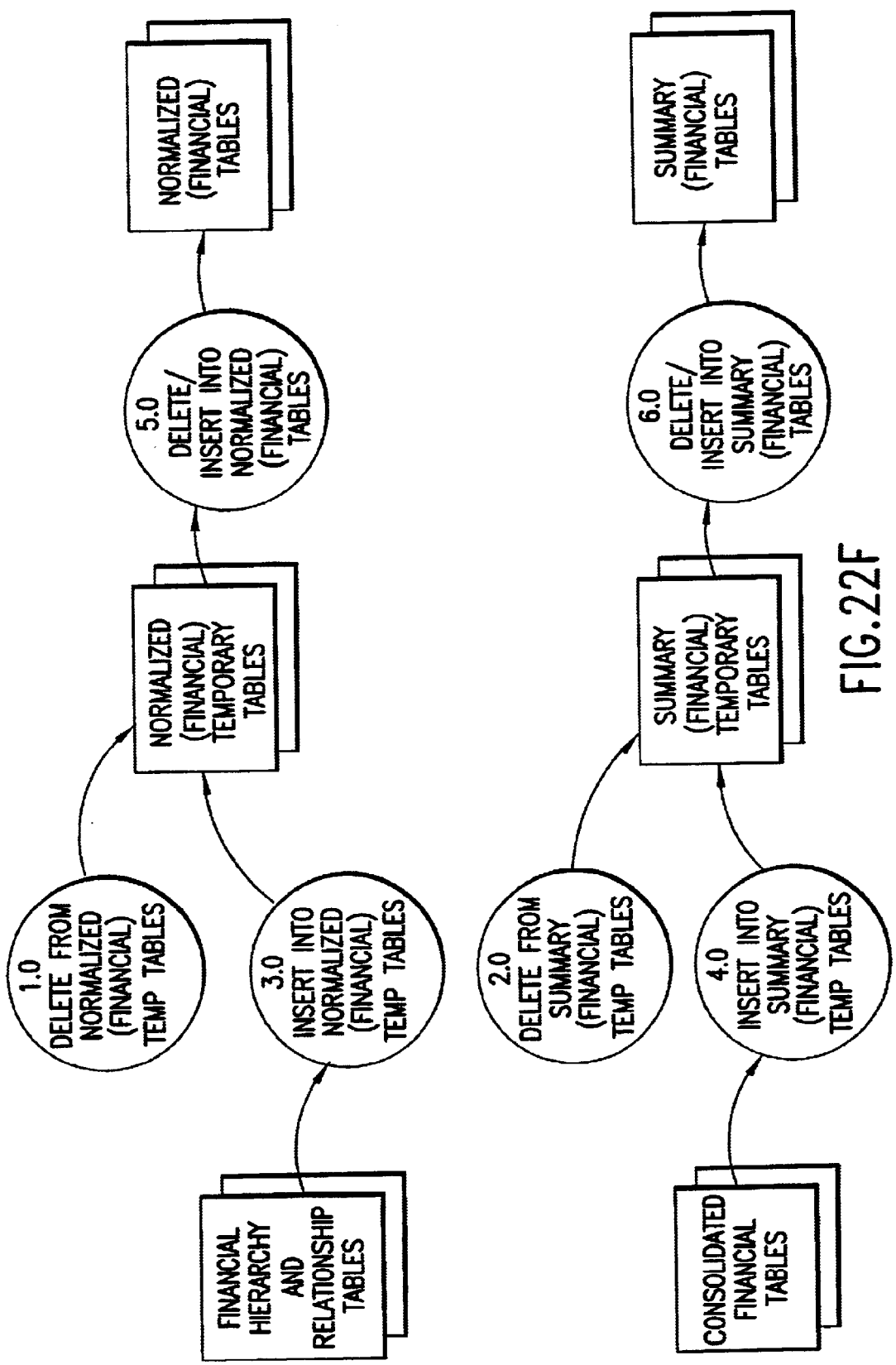
Figure 22G:
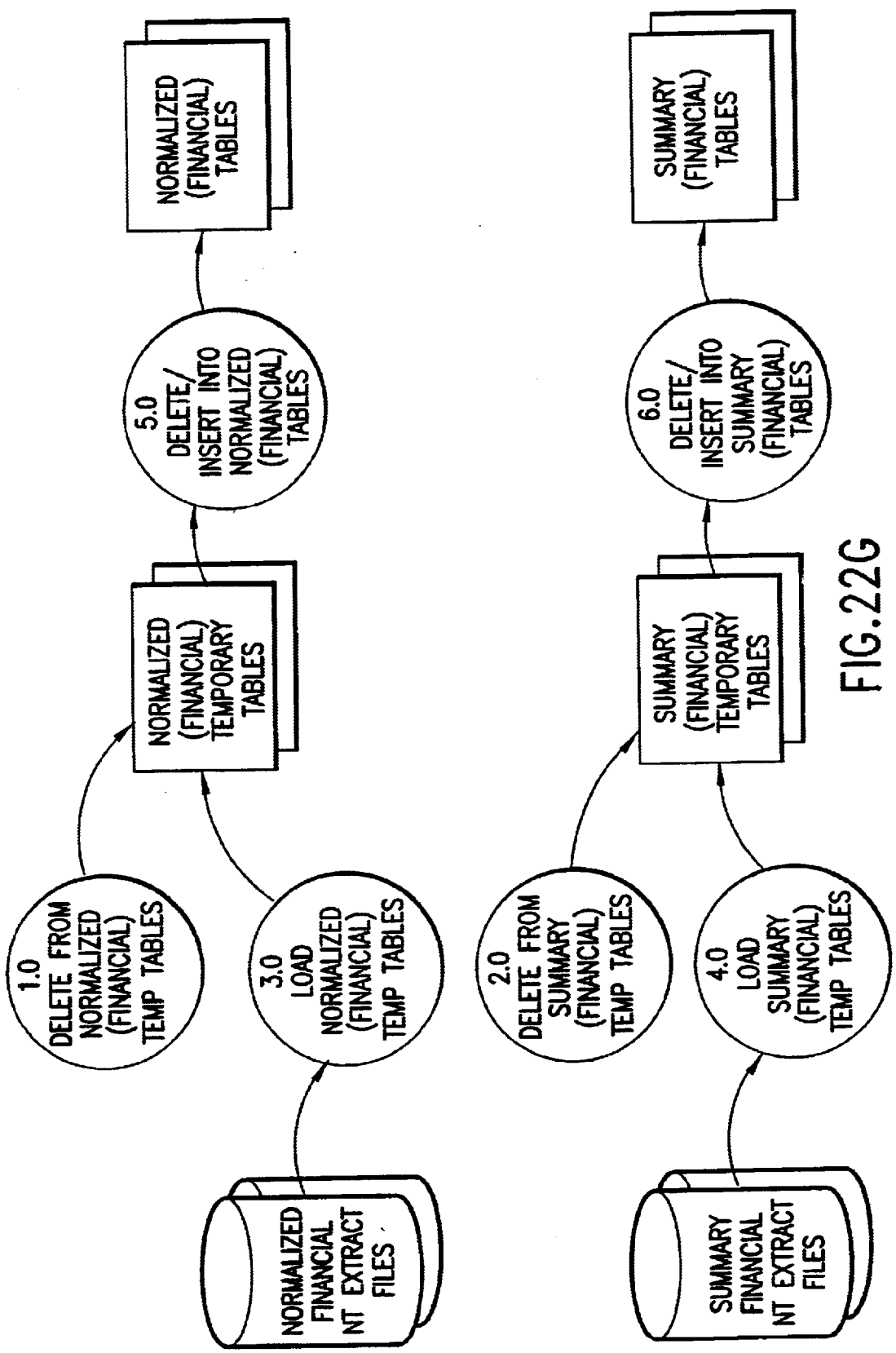
Figure 22H:
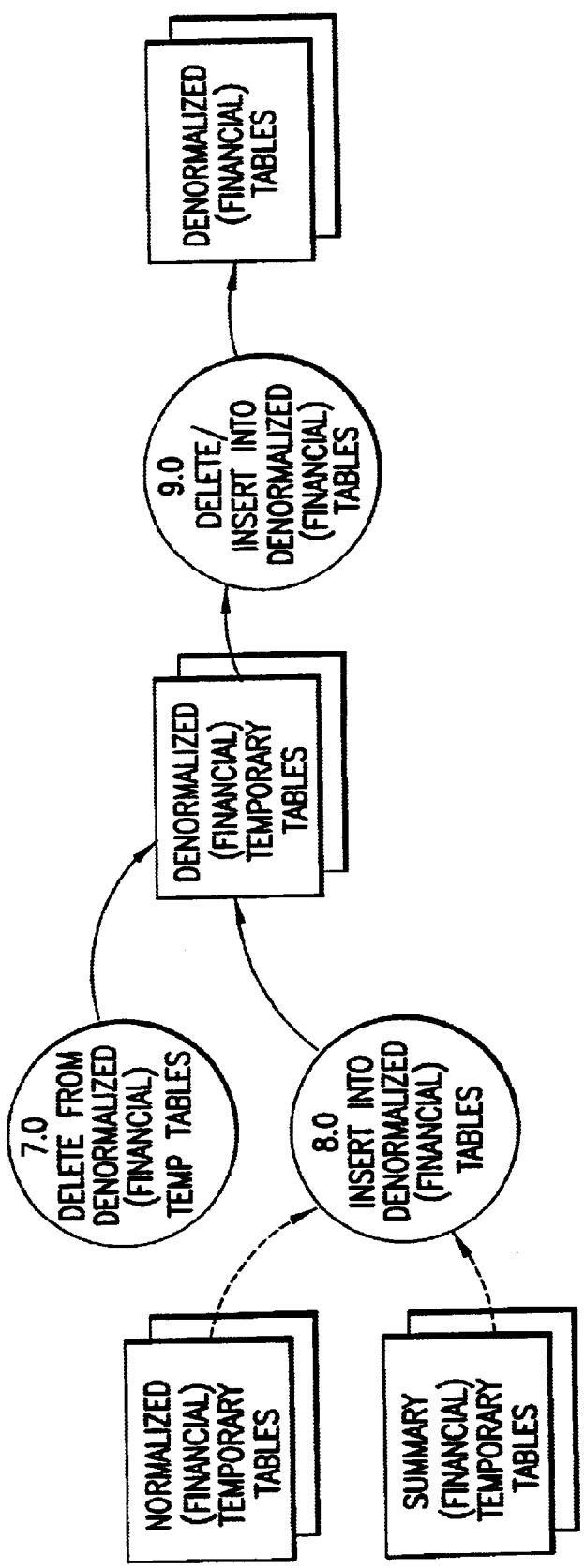
Figure 221:
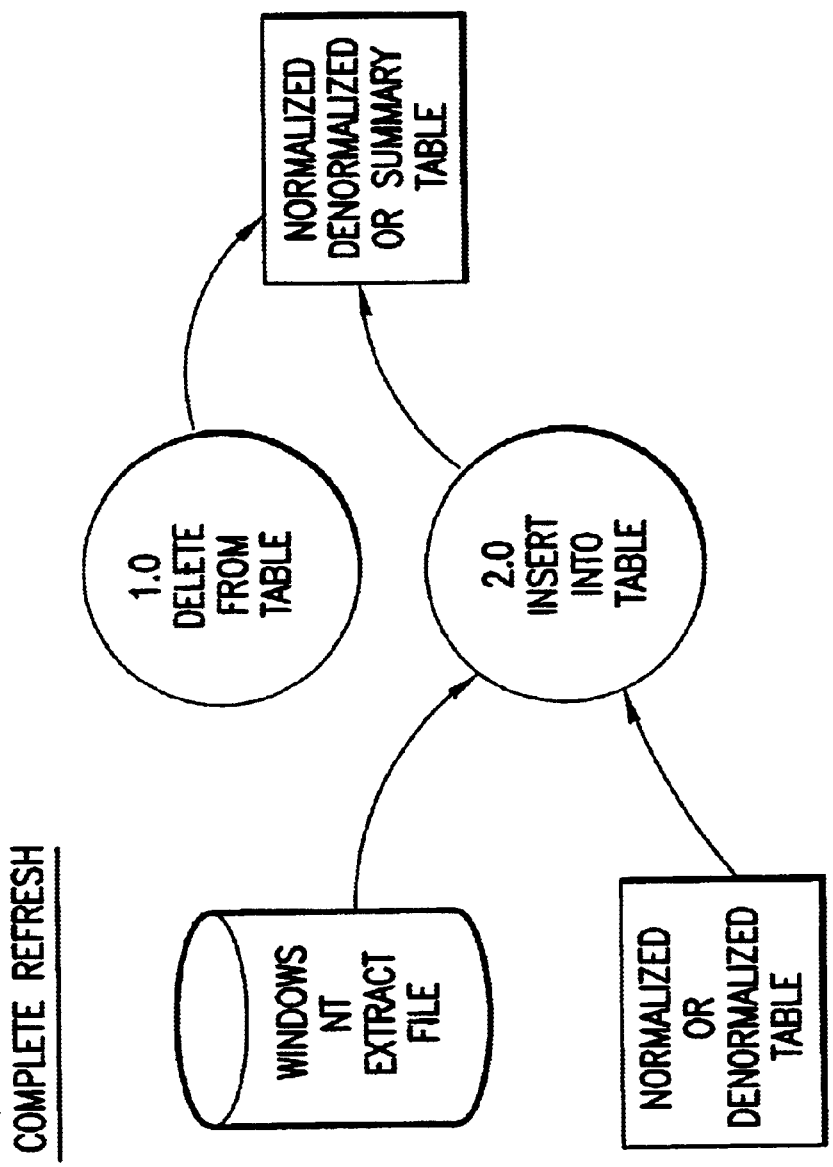
Figure 22J:
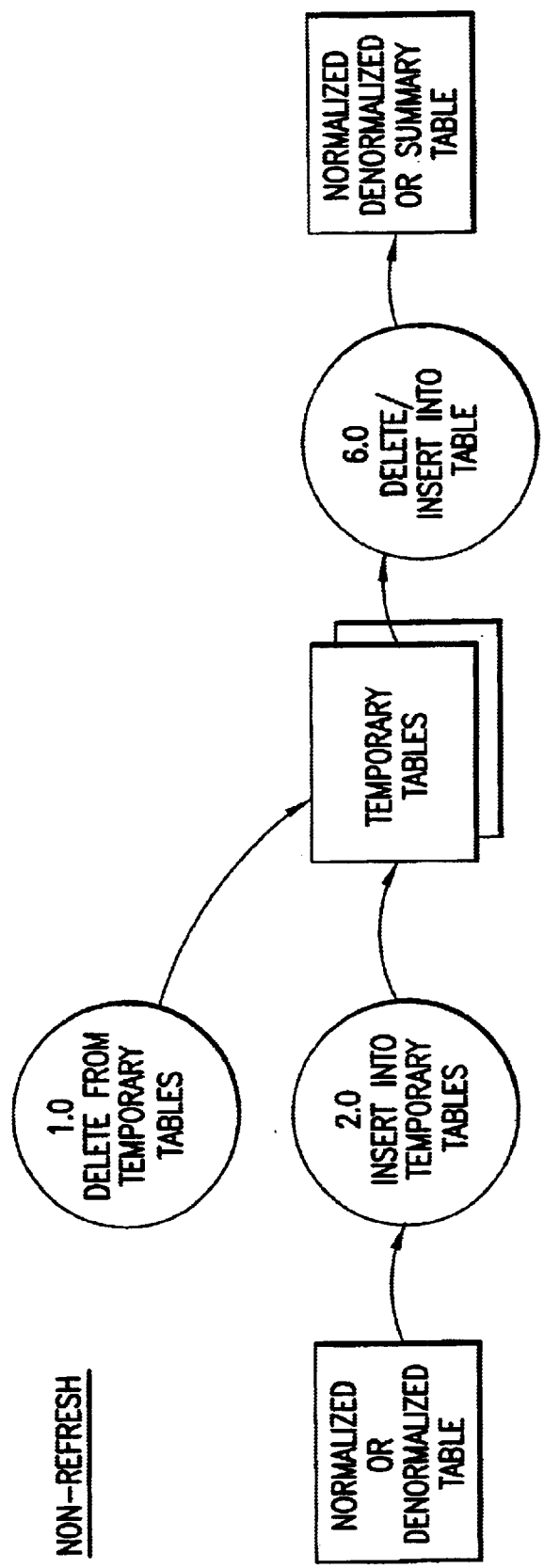
Figure 22L:
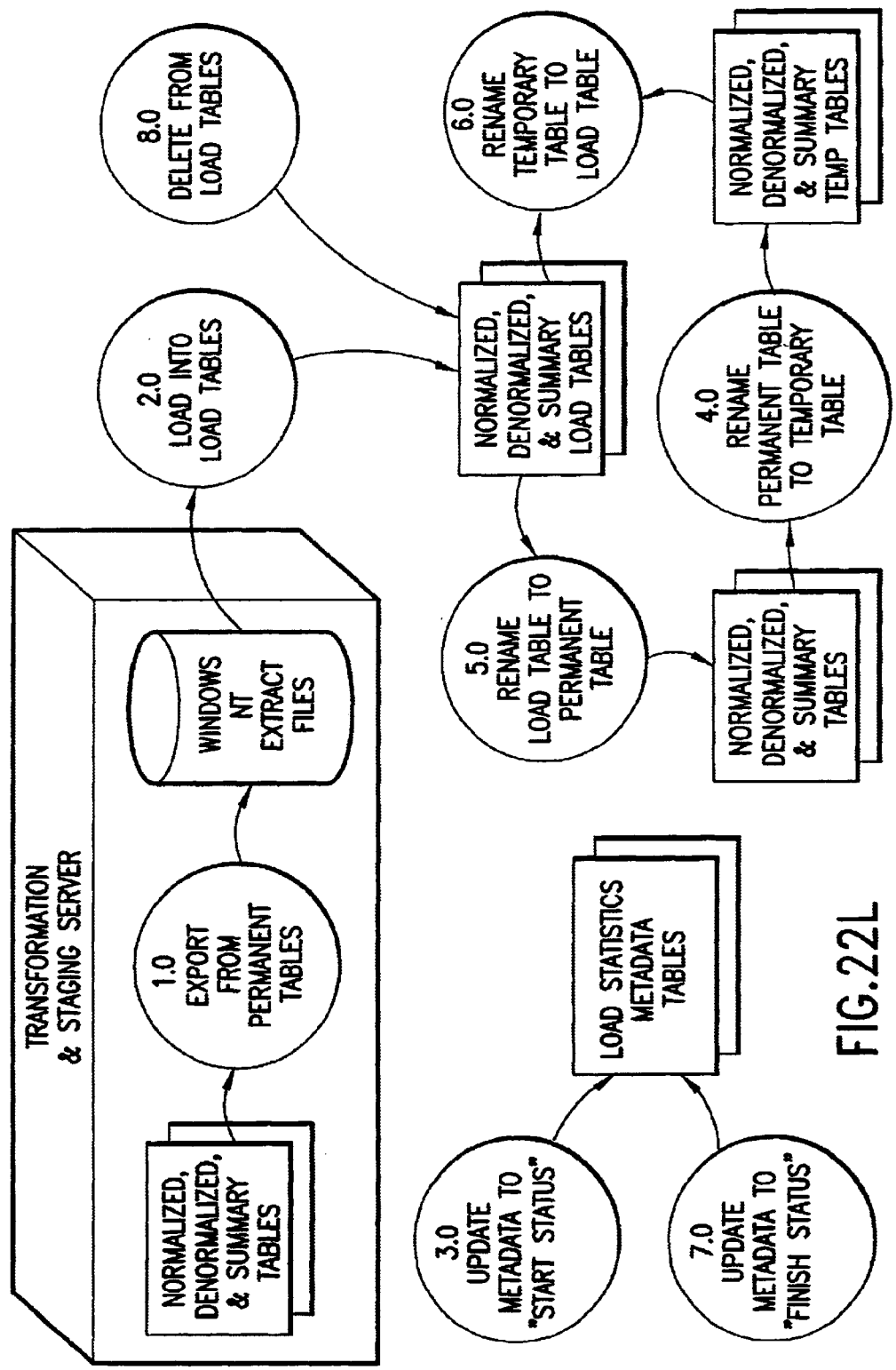

As shown in FIG. 11, the Data Warehouse server 104 includes the following databases and files:

Databases

| Master | |
|---|---|
| Description | The Master database is a standard MS SQL Server database that contains all of the system tables. |
| Placement | Master Device - \MSSQL\DATA\MASTER.DAT |
| Size | 50 MB |
| Updates | System only - most information created at setup time only |
| Volatility | Low - Important information, but most information changes infrequently |
| Backup Frequency & Procedures | Daily - As part of a Full System backup using the full FGIS backup solution. On-request - Prior to and following any system upgrade using the FGIS manual backup procedures. |

| Model | |
|---|---|
| Description | The Model database is a database template for the creation of all new databases. |
| Placement | Master Device - \MSSQL\DATA\MASTER.DAT (may change with SQL Server 7.0) |
| Size | 1 MB |
| Updates | No regular - created at setup time only. |
| Volatility | Low - Very infrequent changes, only possible with an upgrade of EIM |
| Backup Frequency & Procedures | Daily - As part of a Full System backup using the full FGIS backup solution. On-request - Prior to and following any system upgrade using the FGIS manual backup procedures. |
| Monthly to daily is my own change | |

| Tempdb | |
|---|---|
| Description | The tempdb database is a database used as a temporary work area for the creation of temporary tables and information. |
| Placement | Temporary Device - In Memory |
| Size | 100 MB |
| Updates | Updated by queries as needed and procedures specifically when requested |
| Volatility | Low - Important for the queries only at the time of execution, changes frequently |
| Backup Frequency & Procedures | Daily - As part of a Full System backup using the full FGIS backup solution On-request - Prior to and following any system upgrade using the FGIS manual backup procedures Transaction Log - can be dumped daily (Check this) |

| | EIM_Meta_Views |
|---|---|
| Description | The EIM_Meta_Views database contains all of the Metadata, views, and stored procedures that are to be used by the users of EIM. This database is the sole access method for the EIM users to the information in the EIM_DW database. |
| Placement | Views Device - \MSSQL \DATA\EIM_METAVIEWS.DAT |
| Size | 20 MB |
| Updates | SQL Views only - views loaded as part of EIM installation only<br>Technical Metadata - updated daily with statistics from loading of source system information. |
| Volatility | Business Metadata - Low - Very infrequent changes, only possible with an upgrade of EIM<br>Technical Metadata - Medium - Medium importance, updated frequently. |
| Backup Frequency & Procedures | Daily - As part of a Full Database backup, using as many FGIS procedures as possible |

| | EIM_DW |
|---|---|
| Description | The EIM_DW database contains some normalized data, but mostly denormalized and summarized data from ERA 107 and the competitor systems 110, 112 that has been cleansed, transformed on the Transformation and staging server 108 and loaded from the EIM_Staging database. |
| Placement | EIM DW Device - \datadrive1 to n\DATA\EIM_DW1 to n.DAT |
| Size | Large - 250 GB<br>Medium - 100 GB<br>Small - 20 GB |
| Updates | Updated daily with information from source systems via the Transformation and staging server 108 |
| Volatility | High - Important information, updated frequently |
| Backup Frequency & Procedures | Daily - As part of a Full Database backup, using as many FGIS procedures as possible (my own change) |

Database Tables

The following are the various types of tables that are used in the databases on the Data Warehouse server 104 and their usage or purpose.

| Table Type | Table Sub-Type | Database | Usage/Purpose |
|---|---|---|---|
| Normalized | Load | EIM_DW | A table used to load a normalized permanent table with data from the Transformation and staging server 108; may be an empty table or a renamed version of the normalized permanent table on the Data Warehouse server 104. |
| | Temporary | EIM_DW | A table that is the renamed version of the normalized permanent table used in a Refresh load process ("Round Robin"). |
| | Permanent | EIM_DW | A table that contains data in a normalized form, generally, the physical version of a table identified in the logical model. |
| De-normalized | Load | EIM_DW | A table used to load a denormalized permanent table with data from the Transformation and staging server 108; may be an empty table or a renamed version of the denormalized permanent table on the Data Warehouse server 104. |
| | Temporary | EIM_DW | A table that is the renamed version of the denormalized permanent table used in a Refresh load process ("Round Robin"). |
| | Permanent | EIM_DW | A table that contains data from multiple normalized permanent tables created to improve query performance. |
| Summary | Load | EIM_DW | A table used to load a permanent summary table with data from the Transformation and staging server 108; may be an empty table or a renamed version of the summary permanent table on the Data Warehouse server 104. |
| | Temporary | EIM_DW | A table that is the renamed version of the summary permanent table used in a Refresh load process ("Round Robin"). |
| | Permanent | EIM_DW | A table that contains aggregated information from a normalized or denormalized permanent table created to improve query performance. Summary tables can either be completely refreshed each time or contain data aggregated by period (in history form) or some other dimension. |

File Systems/Structures

For the EIM Data Warehouse (Database) server 104 most of the physical disk drives are combined into one logical drive to take full advantage of RAID (Redundant Array of Independent Disks) technology. This was done to ensure a high service level by minimizing system down time due to disk failure.

Root Drive—contains all of the application (stored procedure) and database object scripts (may be for the development environment only) and the SQL Server Master and Model databases. In addition, the Views database resides on this drive.

Data Drives 1 to n—Data drives/file system that contain the EIM DW database only due to the size needed and the requirement for minimal system down time by using RAID.

Logins

Application and user logins to SQL Server use the NT login ("trusted connections").

Application—These logins are used for the loading of information from the Transformation and staging server 108. These logins are only in the EIM_DW database for the purpose of loading data and they is the only logins allowed in the EIM_DW database.

User—Most logins on the Data Warehouse (Database) server are of this type. These logins are only in the EIM_DW database.

The user logins for the EIM_DW database are primarily, but not limited to those individuals responsible for accessing Enterprise wide information. These are generally managerial and administrative individuals at the enterprise level. However, it is not assumed that individual dealership personnel are restricted from access.

Data Extraction and Movement

Overview

A Data Warehouse, by definition, is a very large data store that consists of data generated from multiple source systems. The data contained within must be cleansed and transformed to properly represent the business at hand and thus produce accurate results based on the queries used to analyze the business environment.

In rare circumstances, where the data volumes and complexity is low, the Data Warehouse can be refreshed on a regular basis. However, most require a massive conversion where data is cleansed and transformed, followed by periodic updates of data modified in the operational source systems. These incremental changes must also be cleansed and transformed prior to updating the Data Warehouse.

The following explain the high-level process and architecture of the system.

Load Process and Sequence

The load process is handled in two phases. The first phase loads data sets that are used to populate the dimension tables in the data warehouse server 104. A dimension table stores descriptive information that qualifies a fact. Examples of typical dimensions are descriptions of customers, vendors, and vehicle models. The second phase loads data sets that is used to populate the fact tables. A fact table contains data columns for the numeric measurements of a business. Examples of typical facts are vehicle deals, repair orders and financial data. In FIGS. 12–21, which describe the load-related operations, each box represents a transform. As steps in the data flow of a plan, transforms perform custom operations on the selected data. The arrows indicate the connection points for the transforms. These connectors dictate the order in which the steps will take place.

Data Transformation and Cleansing

The following section describes the transformation and cleansing process for preferred embodiments of the EIM. The basic concept is to receive multiple sources of data from many dealerships in a variety of formats. These data sources need to be transformed and integrated into standard structures for the repository warehouse. The transformation and cleansing process is performed in two phases.

The first phase retrieves the operational data using a Sagent data flow plan. A data flow plan is a set of complex instructions used to extract, transform and load the data into the warehouse. Several data flow plans may be required for each data set. Each row of data is sent through a series of validation and cleansing steps. Once the row of data has passed specified validations, the data is loaded into the appropriate temporary staging table(s).

Once the data has been loaded into the staging table(s), a second phase of validations and cleansing is performed. This includes validations such as referential integrity and aggregate processing.

At any time during the transformation and cleansing process an error occurs, the row of data with the error is written to an error table along with an error message describing the reason for rejection. Once the errors have been corrected, the data is reprocessed during the next run of the associated data flow plan (See Warehouse Data Load Error Correction for additional information).

Figure 23:
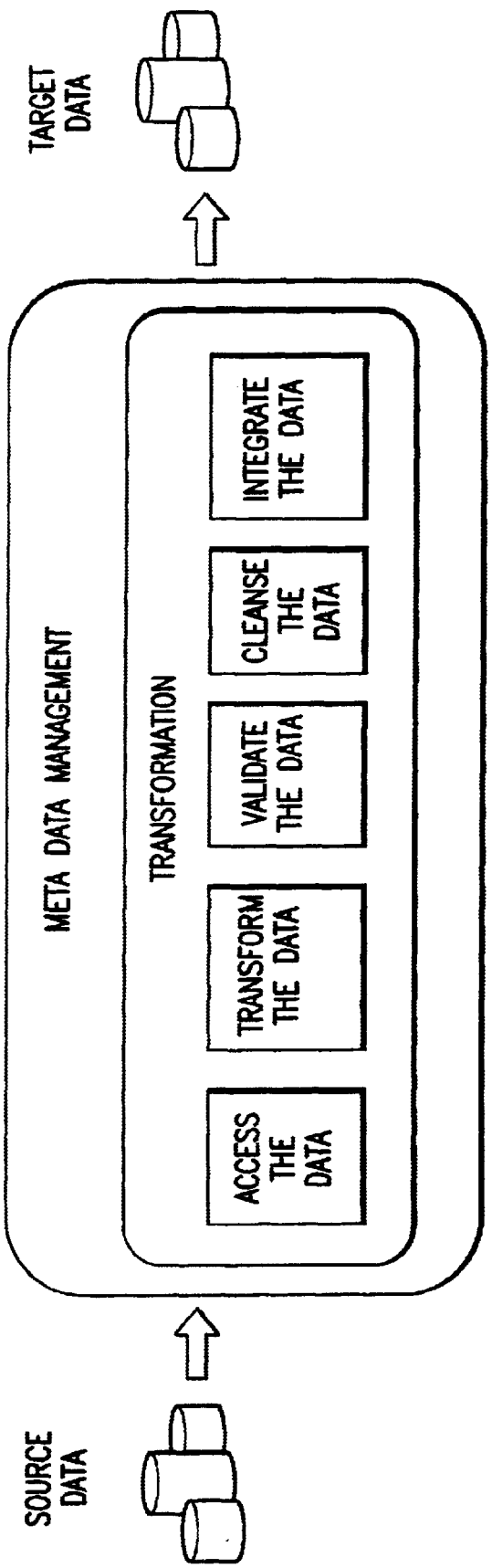
FIG. 23 provides a high-level view of the transformation and cleansing process.
Figure 24:
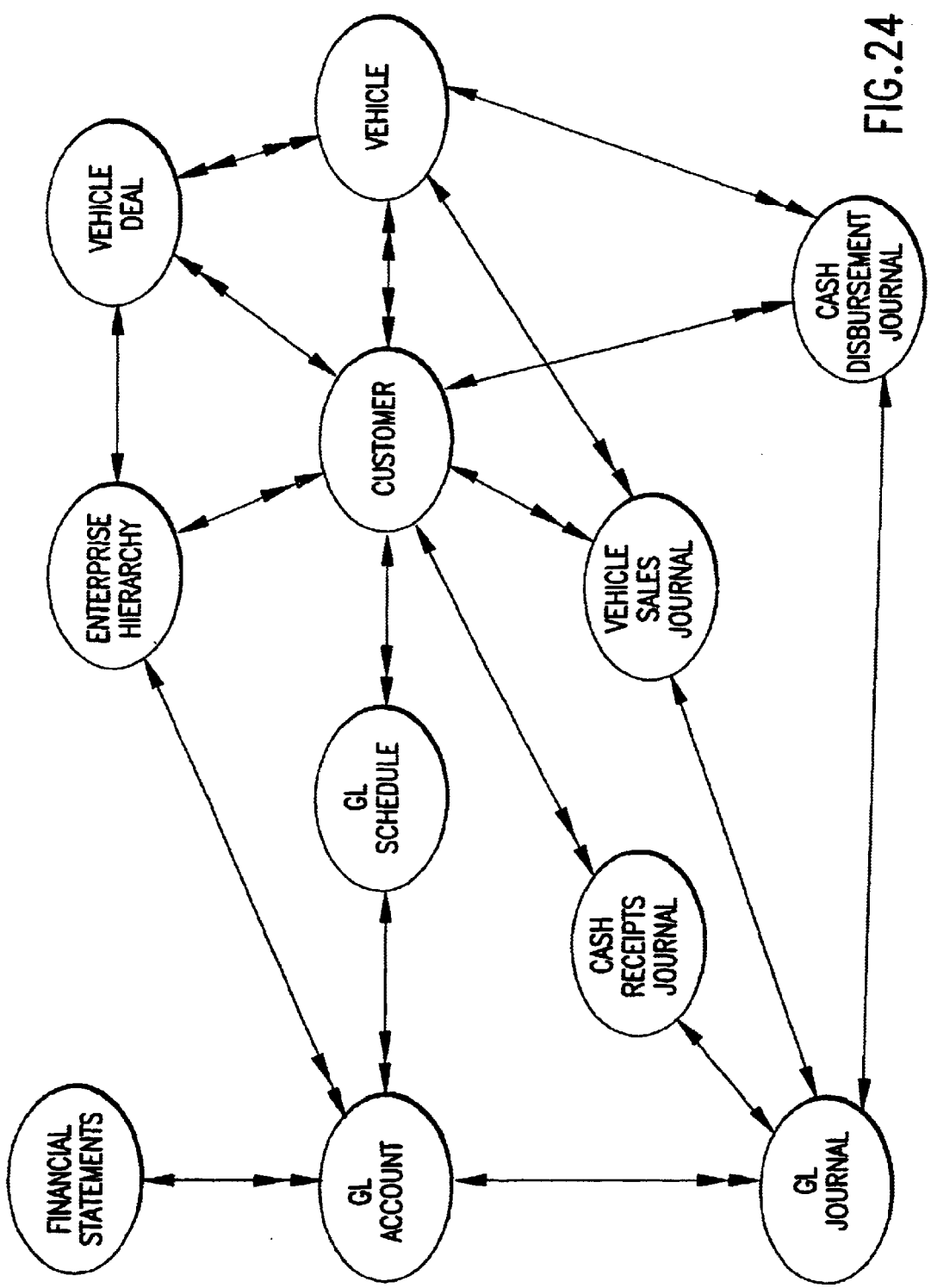
FIG. 24 depicts the Data Warehouse Model according to embodiments of this invention.
Figure 25A:
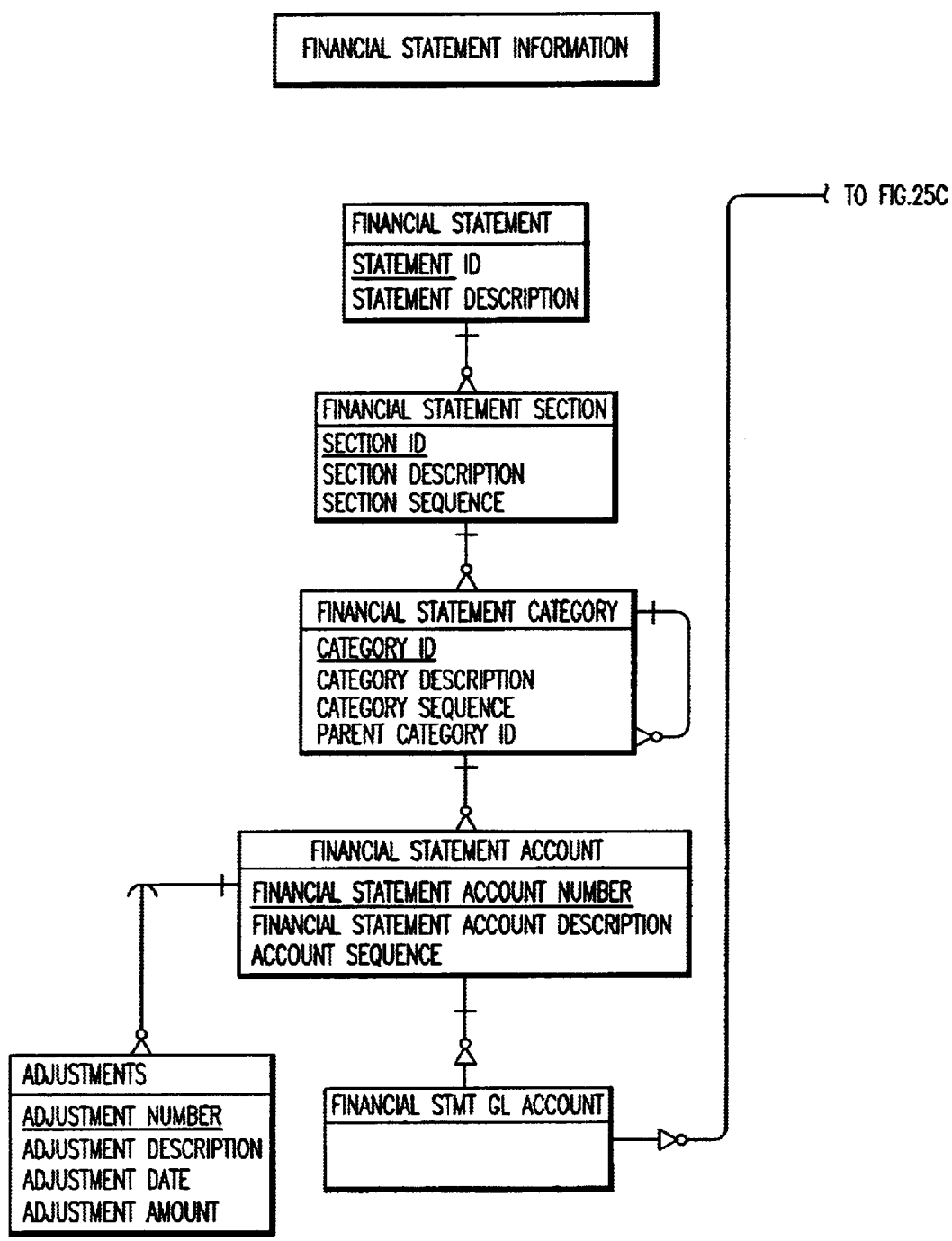
FIG. 25 depicts the logical data model according to embodiments of this invention.
Figure 25B:
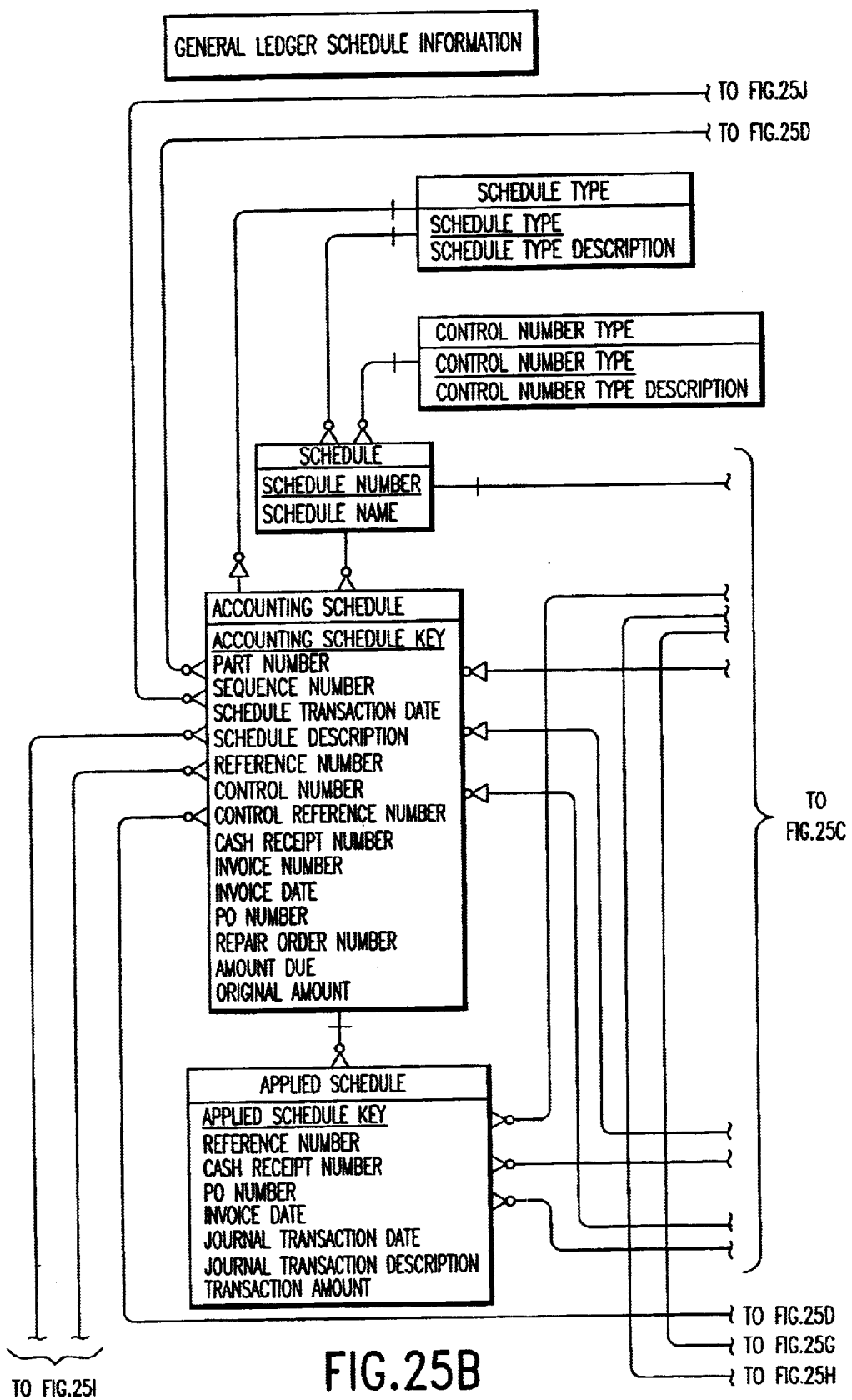
Figure 25C:
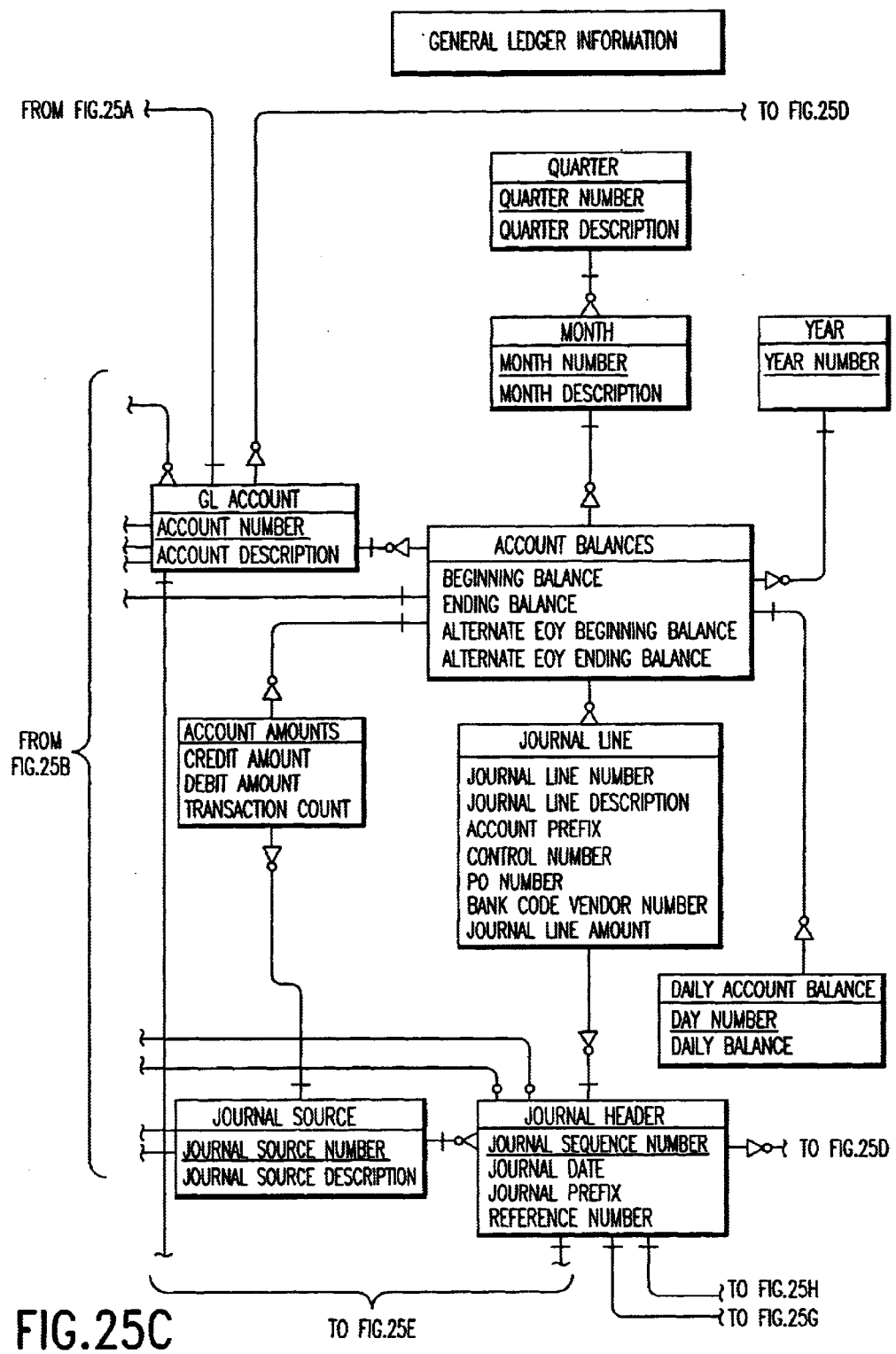
Figure 25D:
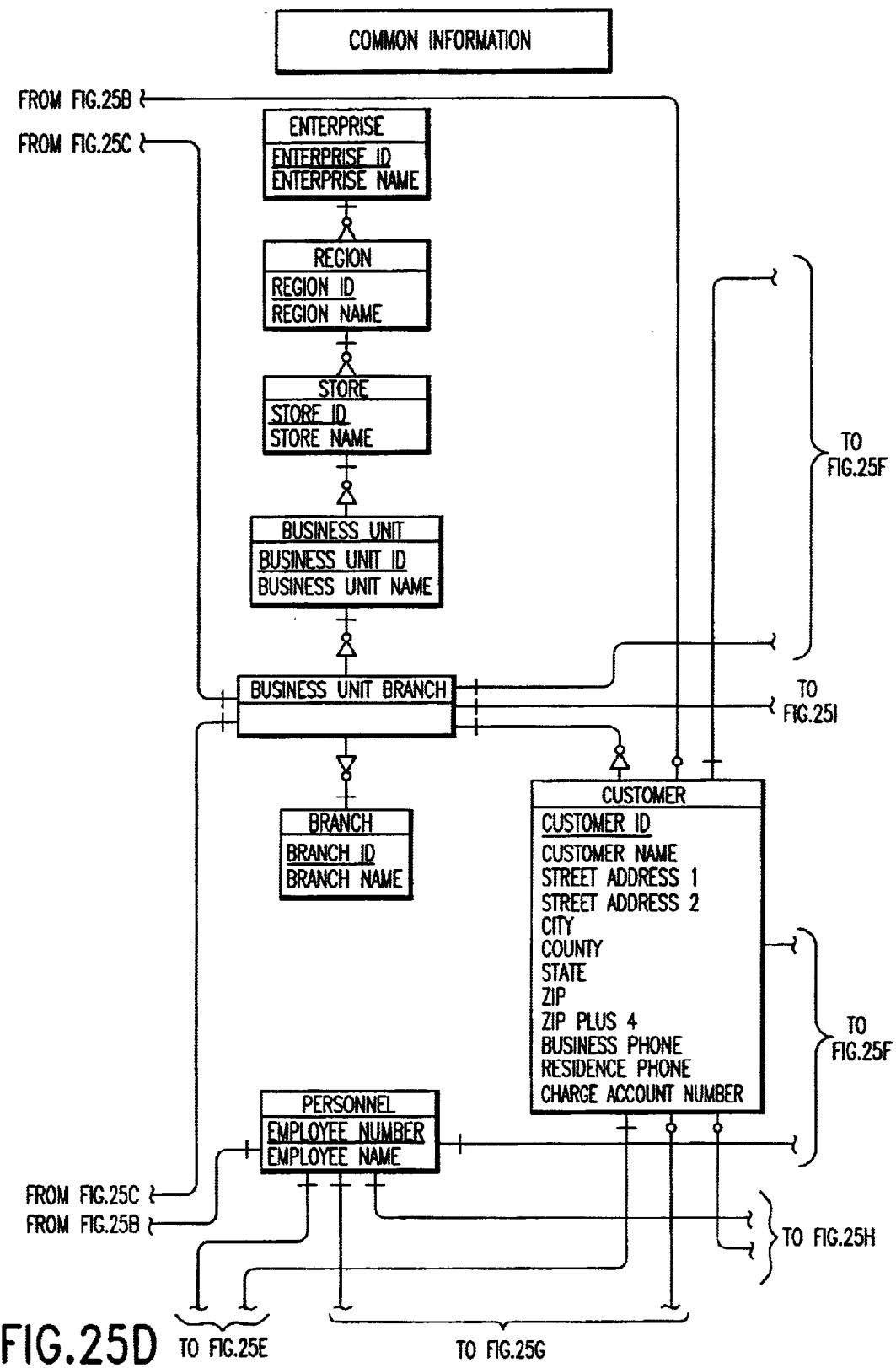
Figure 25E:
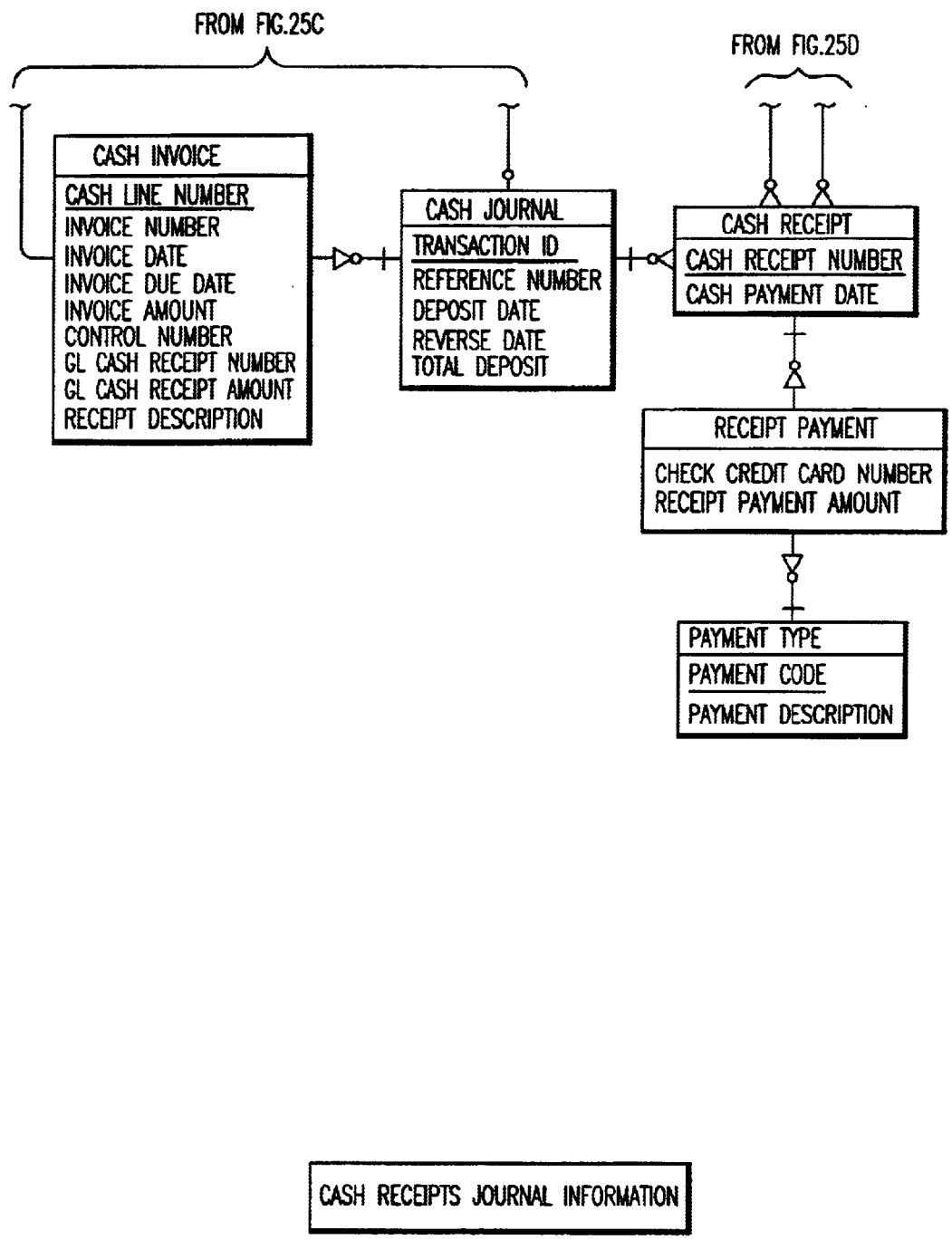
Figure 25F:
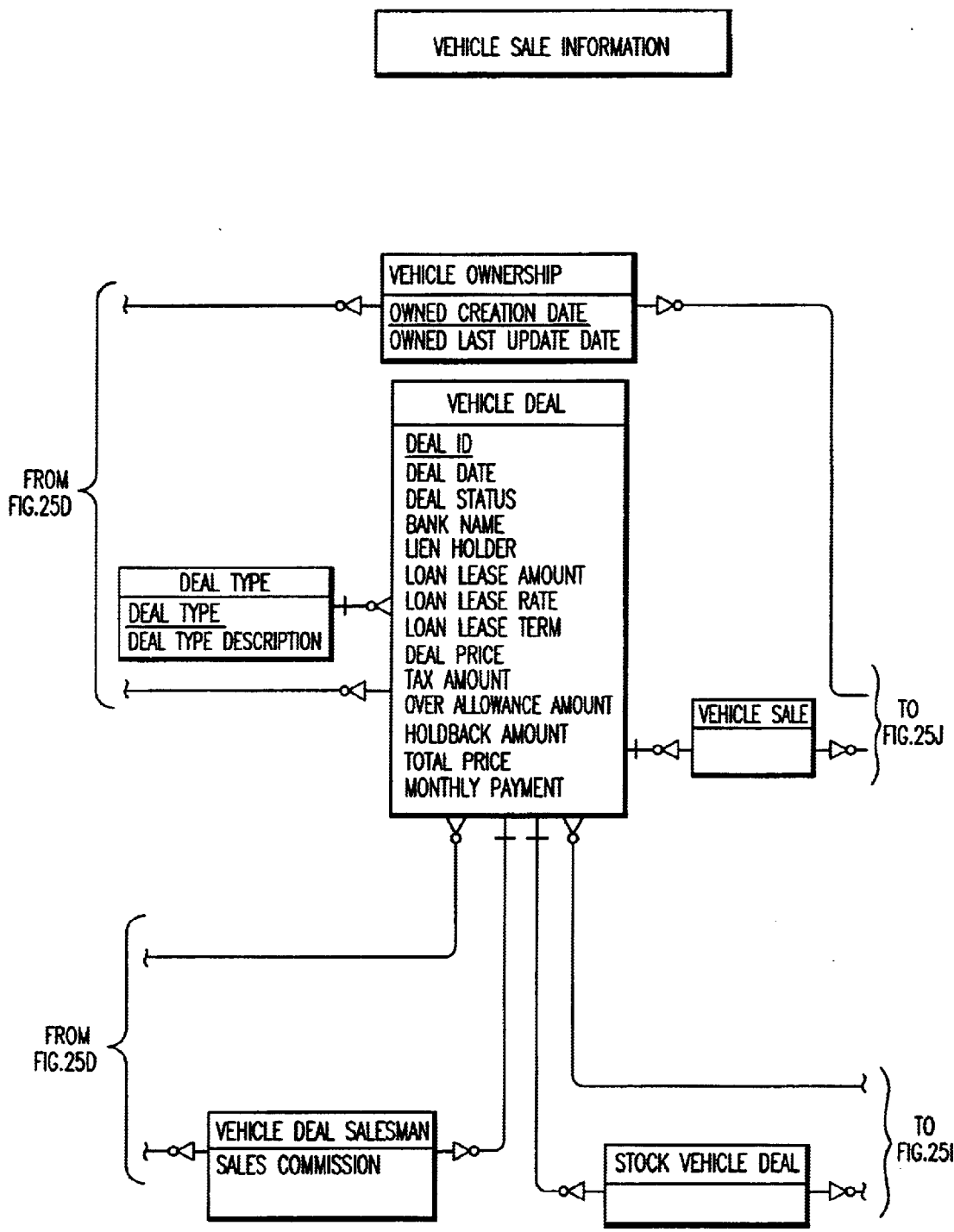
Figure 25G:
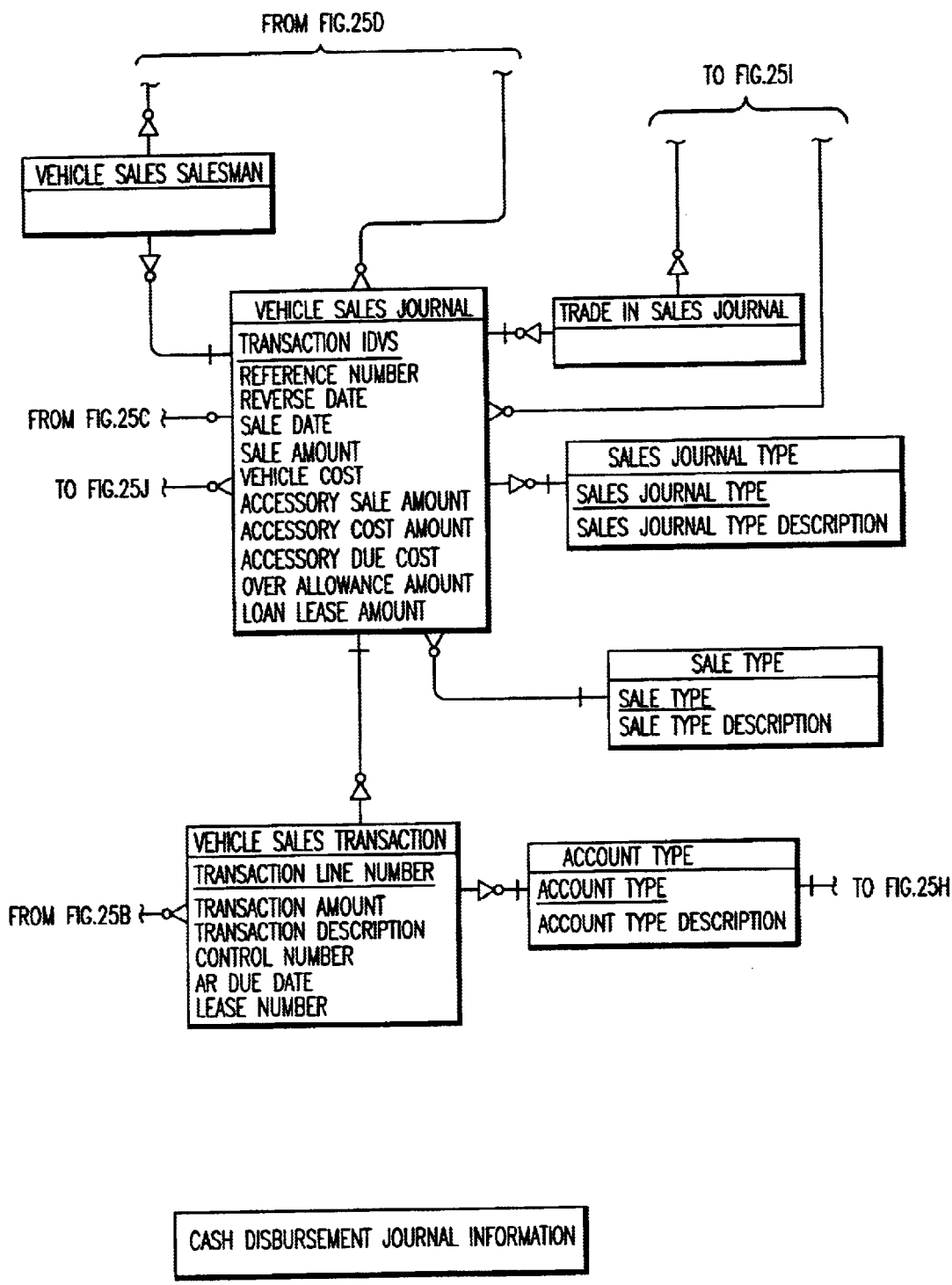
Figure 25H:
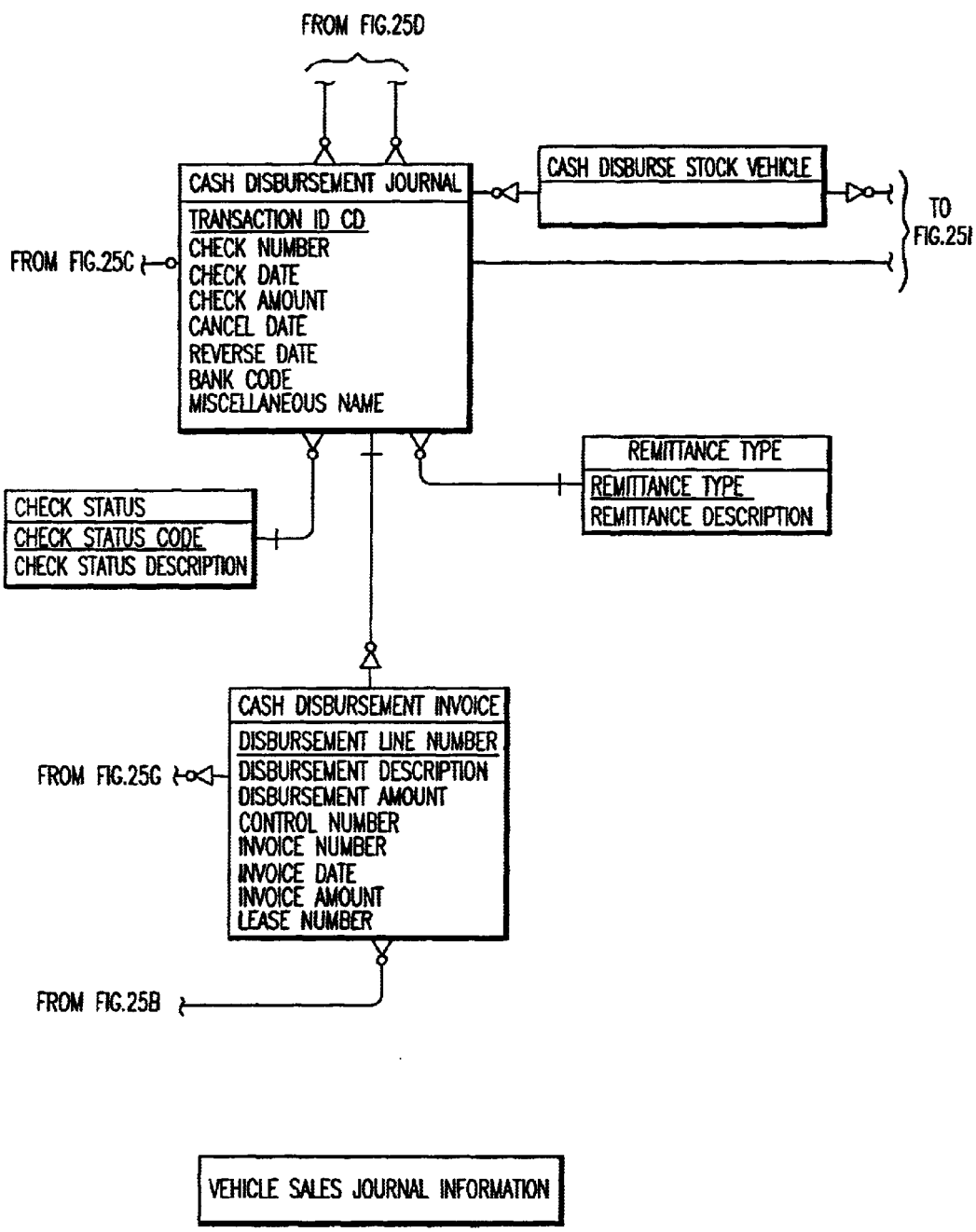
Figure 25I:
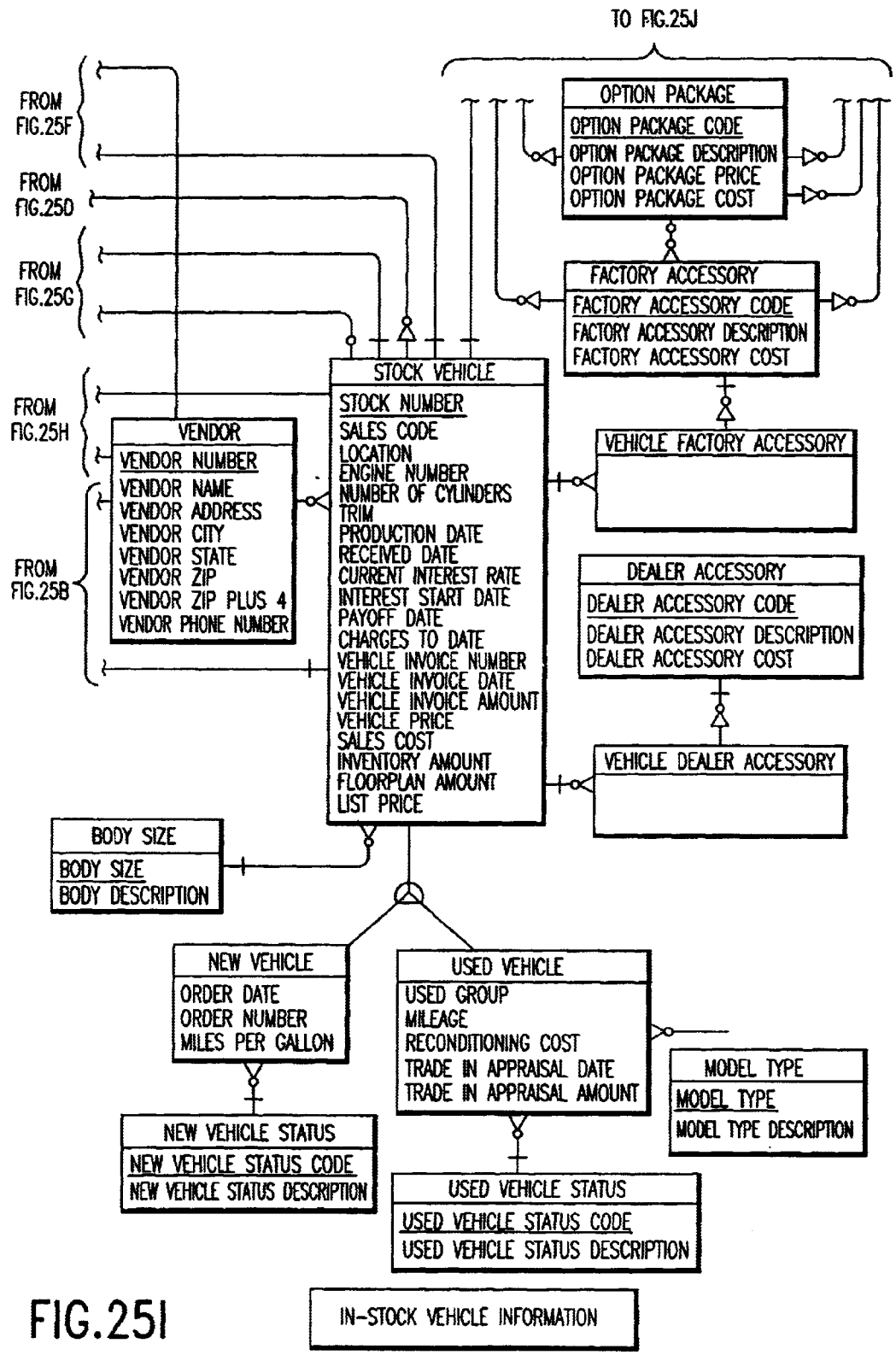
Figure 25J:
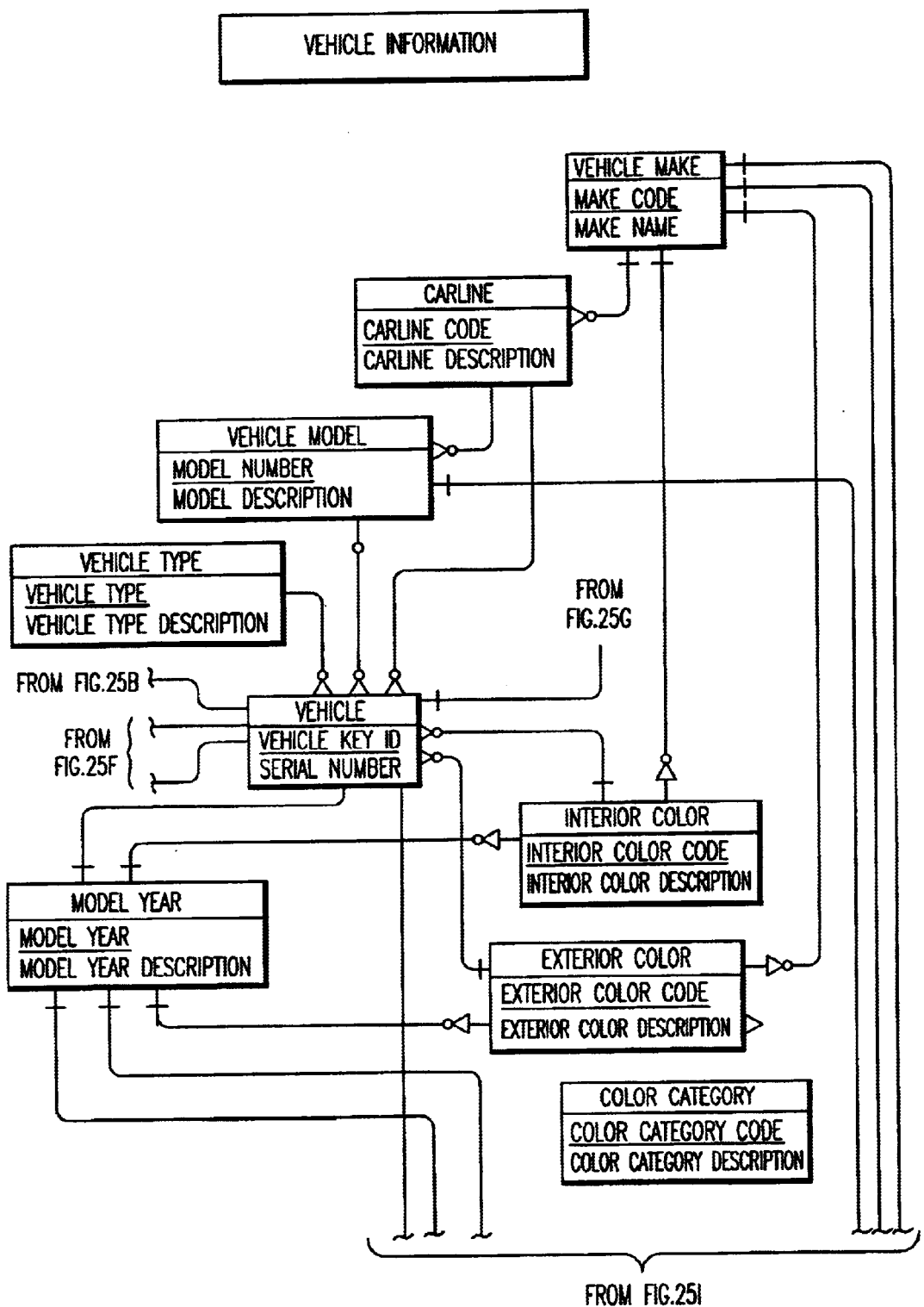

FIG. 23 provides a high-level view of the transformation and cleansing process.

Examples of the types of validations and transformations that is performed are listed below.

Absence of Data

The operational system allows different applications to define what fields are required entries. Therefore this allows inconsistency in the data values.

Examples: Sales requires that the model and carline fields are entered when adding a vehicle to the system but the Service application does not require these fields. Missing customer name in a customer record.

Data Typing

Data Elements are defined to be of a certain data type (i.e., integer).

Example: Customer number defined as numeric containing alpha characters.

Free Form Text Fields

The operational systems do not enforce fields to have a corresponding lookup value. Therefore, it allows entry of free-form text.

Example: When adding a new vehicle into inventory the entry of the exterior color code is validated against the VEHCOLOR table. Therefore, keeping the vehicle colors consistent. But when a used vehicle is entered into the system it allows for the user to enter a color description and not enforce a color code. This permits several variations of a vehicle color, which in fact represent the same meaning. I.e., , Light Blue, Lgt Blue & Light Blue.

Multipurpose Fields

Multiple purpose fields contain data that has several different meanings depending upon which department entered it.

Example: Used Vehicles contains 2 Key Code fields. Since this is a used vehicle, they may not have the original key code numbers, therefore, they will use these fields to store memo information.

Dummy Values

These data elements usually contain information that was entered in a mandatory field where the value was not known at the time of entry.

The following are examples:
  Social Security Number=999-99-9999
  Zip Code=99999

Contradicting Data

These data elements contain information when associated with other data elements do not make sense.

Example: Make=Chevrolet Carline=Grand Prix

Violation of Business Rules

Data values that stray from their field descriptions and business rules.

30 character string within a field defined to be 2 characters long
  Description fields that contains code
  Data Anomalies—Same Data can be represented in a wide variety of ways.

| Customer Number | Name | Address | Sales |
|---|---|---|---|
| 9032574 | Digital Equipment | 187 N. PARK St Salem NH 01456 | $8,427 |
| 9032575 | DEC | 187 N. Pk. St Salem NH 01456 | $6,292 |
| 9032579 | Digital | 187 N. Park St Salem NH 01456 | $7,399 |
| 9023678 | Digital Corp | 187 Park Avenue Salem NH 01456 | $6,549 |

In the above example, responses to important queries would be wrong without entity integrity. Either all instances must be related to a master or all instances must be changed to a single representation. For example, a query seeking customers that have sales greater than $20,000 would omit Digital.

Restructure Operational Keys

Very seldom does an input key remain unaltered as it is being written to a data warehouse. In a simple case, an element of time is added to the output key structure.

Data Integrity

Validate any parent/child relationships.

Supply Default Values

Under some conditions an output value in the data warehouse will have no source of data. In this case, the default value that is used must be specified.

Renaming of data elements as they are moved from the operational environment to the data warehouse Data Format Conversion Under some conditions a value may need to be converted to another format.

Example: Pick Date Vs Calendar Date

Aggregate Data Values

To increase query performance sometimes it is necessary to pre-calculate and pre-store summaries. This might involve SQL statements using SUM, COUNT, MIN, MAX and AVG.

Database Update Process

Each of the processes below reference different type of tables used in the update process.

For simplicity, all processes below assume that the normalized, denormalized, and summary information need to be loaded into temporary tables for further processing, such as denormalization discussed below. If the temporary copies of the information are not necessary, then the Insert or Load of the information would go directly into the permanent table and no temporary tables would be involved (See Complete Refresh vs. Non-Refresh Processing below).

Source System Data Loading

Source System Data Loading encompasses loading data from the identified automotive systems, the ERA 107 and/or ADP systems 110. In some embodiments all information is loaded from NT flat files that were extracted to from the various source systems. However, some other embodiments will extract directly from the ERA (Universe) database into another database via ODBC.

| Associated System Flow Processes (FIG. 22-A) |
|---|
| 1.0 Extract & Load ERA |
| 2.0 Extract & Load Competitor Data |
| 3.1 Load & Transform EIM NT files into EIM Normalized Tables |
| 3.1.1 Capture Error Data |

Steps:
1.0 Delete From Normalized Temporary Tables—Delete all of the previous period's temporary transaction information.
2.0 Load Normalized Temporary Tables—Using Sagent load procedures, insert source data into the normalized temporary tables.
3.0 Load Data Formatting Error Tables—During the Sagent load procedures, insert rows of information into data format error tables with identified format issues.

| Associated System Flow Processes (FIG. 22-B) |
|---|
| 3.2 Perform Additional Transformation, Cleansing & Matching |
| 3.2.1 Capture Error Data |

Steps:
1.0 Insert Into Data Formatting Error Tables—Insert any additional rows of information from the normalized temporary tables into the data format error tables. This process uses SQL Inserts for areas that were unable to be addressed with the Sagent load procedures.
2.0 Insert Into Data Integrity Error Tables—Insert rows of information from the normalized temporary tables into the data integrity error tables that have data integrity issues with other normalized tables.
3.0 Delete Errors From Normalized Temporary Tables—Delete the rows from the normalized temporary tables that were inserted into the data format and data integrity error tables (from steps 1.0 and 2.0).
4.0 Transform/Match Normalized Temporary Tables—Update or Insert the remaining information in the normalized temporary tables to meet any transformation or matching rules.
5.0 Delete/Insert Into Normalized (permanent) Tables—Delete rows from the normalized (permanent) tables where they exist in the normalized temporary tables. Then, insert all rows from the normalized temporary tables into the normalized (permanent) tables.

Denormalization and Summarization is performed on the normalized tables where appropriate. This is determined by the reporting requirements, the frequency that the information is queried, and the size of the normalized table to satisfy each of the requirements.

| Associated System Flow Processes (FIG. 22-C) |
|---|
| 3.3 Denormalize and Add Dimensional Keys |
| 3.4 Summarize Data where appropriate |

Steps:
1.0 Delete From Denormalized Temporary Tables—Delete all of the previous period's denormalized temporary information.

2.0 Insert Into Denormalized Temporary Tables—Insert rows from the normalized temporary tables, that are to be combined and/or have dimensional keys added, into the denormalized temporary tables.

3.0 Delete/Insert Into Denormalized (permanent) Tables—Delete rows from the denormalized (permanent) tables where they exist in the denormalized temporary tables. Then, insert all rows from the denormalized temporary tables into the denormalized (permanent) tables.

4.0 Delete From Summary Temporary Tables—Delete all of the previous period's summarized temporary information.

5.0 Insert Into Summary Temporary Tables—Insert aggregated rows from either the normalized or denormalized temporary tables into the summary temporary tables.

6.0 Delete/Insert Into Summary (permanent) Tables—Delete rows from the summary (permanent) tables where they exist in the summary temporary tables. Then, insert all rows from the summary temporary tables into the summary (permanent) tables.

The Financial tool has a Relational Database as a back-end storage mechanism to support the application. Also, in some embodiments of this invention, the financial tools have Microsoft SQL Server as one of their choices of back-end databases. There is a different methodology for loading and unloading the Financial Consolidation tool's database depending on whether it can use SQL Server or not. Each methodology is described below. The General Ledger information to be loaded includes each of the stores GL accounts and descriptions, and each of the stores account balances by GL account, store, and period.

| Associated System Flow Processes (FIGS. 22-D, 22-E) |
| --- |
| 4.0 Load Financial Consolidation Database |

Steps:

If the Financial Consolidation tool's database resides on the Transformation and staging server 108:

1.0 Insert Into GL Store Account Tables—Using the Financial tool's load procedures, insert all of the stores GL account information into the Financial tool's tables.

2.0 Insert or Create Organization Hierarchy—The Enterprise organizational hierarchy needs to be inserted from the normalized hierarchy table using the Financial tool's load procedures or manually created (Enterprise, Region, Store, Business Unit, Branch).

3.0 Create Financial Statement Accounts—The consolidated enterprise financial statement accounts need to be manually created (or possibly input from a spreadsheet).

4.0 Map GL Store Accounts to Financial Statement Accounts—Map each of the GL store accounts to the Financial tool's financial statement accounts 5.0 Insert Into Financial Account Balance Table—Using the Financial tool's load procedures, insert the combined stores normalized General Ledger account balances into the Financial tool's tables.

If the Financial Consolidation tool's database does not reside on the Transformation and staging server 108:

1.0 Load GL Store Account Tables—Using the Financial tool's load procedures, load all of the stores GL account information from Windows NT flat file extracts into the Financial tool's tables.

2.0 Load or Create Organization Hierarchy—Using the Financial tool's load procedures, load the Enterprise organizational hierarchy from a Windows NT flat file extract or create manually (Enterprise, Region, Store, Business Unit, Branch).

3.0 Create Financial Statement Accounts—The consolidated enterprise financial statement accounts need to be manually created (or possibly input from a spreadsheet).

4.0 Map GL Store Accounts to Financial Statement Accounts—Map each of the GL store accounts to the Financial tool's financial statement accounts 5.0 Load Financial Account Balance Table—Using the Financial tool's load procedures, load the combined stores General Ledger account balances from Windows NT flat file extracts into the Financial tool's tables.

The financial consolidation and reporting is performed by the Financial Consolidation tool

| Associated System Flow Processes |
| --- |
| 5.0 Perform Consolidation & Reporting |

Steps:

1.0 Define Consolidation Methodologies—It is defined in the Financial tool itself or the various financial statements how to add (subtract), combine, etc., the financial information. Preferably the consolidation information is stored in a table that can be extracted from for possible use in the data warehouse.

2.0 Create Financial Reports—The various financial reports that an enterprise will want to view is created in the Financial tool. Preferably the types of financial statements, the ordering of the financial statement accounts by report, and any sign reversing information can be extracted, possibly from tables.

3.0 Schedule Automatic Financial Consolidation and Reporting—Preferably the financial consolidation and reporting processes can be scheduled to execute at a particular time or event. The purpose of this is so that the timing of information that is generated is appropriate for use by the enterprise.

4.0 Perform Consolidation and Reporting—Preferably the consolidated financial information for each report can be extracted, possibly from tables.

Load Consolidated Financial Information

This section also predicates that the financial consolidation information is required to be in the EIM Data Warehouse 104. The purpose of this would be to have one place where the enterprise would retrieve all of their information. This would be done via ad hoc querying or drill-down from the highest level of the financial statements to the journal transactions and through to other related information (like vehicle sales or vehicle inventory). This also assumes that the DSS Tool can perform these types of functions.

| Associated System Flow Processes |
| --- |
| (FIGS. 22-F TO 22-H) |
| 6.0 Load Consolidated Financial Information |

Steps:

1.0 Delete From Normalized (Financial) Temporary Tables—Delete all of the previous period's temporary financial transaction information.

2.0 Delete From Summary (Financial) Temporary Tables—Delete all of the previous period's temporary summary financial information.

If the Financial Consolidation tool's database resides on the Transformation and staging server 108:

3.0 Insert Into Normalized (Financial) Temporary Tables—Using the Financial tool's extract procedures, insert the supporting hierarchy and relationship information into normalized (financial) temporary tables.

4.0 Insert Into Summary (Financial) Temporary Tables—Using the Financial tool's extract procedures, insert the consolidated financial information into summary (financial) temporary tables.

If the Financial Consolidation tool's database does not reside on the Transformation and staging server 108:

3.0 Load Normalized (Financial) Temporary Tables—Using the extract procedures of the Financial tool, load the supporting hierarchy and relationship information from Windows NT flat file extracts into normalized (financial) temporary tables.

4.0 Load Summary (Financial) Temporary Tables—Using the extract procedures of the Financial tool, load the consolidated financial information from Windows NT flat file extracts into summary (financial) temporary tables. Regardless of the database that is used perform the following:

5.0 Delete/Insert Into Normalized (Financial) Tables—Delete rows from the normalized (financial) tables where they exist in the normalized (financial) temporary tables. Then, insert all rows from the normalized (financial) temporary tables into the normalized (financial) tables.

6.0 Delete/Insert Into Summary (Financial) Tables—Delete rows from the summary (financial) tables where they exist in the summary (financial) temporary tables (periodic key if history). Then, insert all rows from the summary (financial) temporary tables into the summary (financial) tables.

If any of the information from the Financial tool needs to be further denormalized, then perform the following:

7.0 Delete From Denormalized (Financial) Temporary Tables—Delete all of the previous period's denormalized (financial) temporary information.

8.0 Insert Into Denormalized (Financial) Temporary Tables—Insert rows from the normalized or summary (financial) temporary tables, that are to be combined and/or have dimensional keys added, into the denormalized (financial) temporary tables.

9.0 Delete/Insert Into Denormalized (Financial) Tables—Delete rows from the denormalized (financial) tables where they exist in the denormalized (financial) temporary tables. Then, insert all rows from the denormalized (financial) temporary tables into the denormalized (financial) tables.

The following is a general discussion covering when a complete refresh of information is used and when a non-refresh update of information is used. This is for the Transformation and staging server 108 and usually determines whether temporary tables is involved or not.

Generally, Complete Refresh processing is used when:

1) Source data updates are for a relatively small table (<1000 rows).

2) A summary (normalized or denormalized) table is non-periodic (not stored by a time dimension or something similar).

Refresh Processing Steps (FIG. 22-I):

1.0 Delete From Permanent Table—Delete all of the permanent information created in the previous processing batch.

2.0 Insert Into Permanent Table—Insert rows from an external source or a normalized or denormalized table into the permanent table. If this is a summary table, aggregate information on insert.

Generally, Non-Refresh processing is used when:

1) Source data updates are for a relatively large table (>1000 rows). These are transactional updates "by nature".

2) A summary (normalized or denormalized) table is periodic (stored by a time dimension or something similar—History).

Non-refresh Processing Steps (transactional or periodic FIG. 22-J):

1.0 Delete From Temporary Tables—Delete all of the previous period's (transactional) temporary information.

2.0 Insert Into Temporary Tables—Insert rows from a normalized or denormalized temporary table into the temporary table. If this is for a summary table, aggregate information on insert.

3.0 Delete/Insert Into Permanent Table—Delete rows from the permanent table where they exist in the temporary table (periodic key if history).

Then, insert all rows from the temporary table into the permanent table.

Note: The Delete in Step 3.0 may not be necessary if the periodic information currently does not exist in the permanent table.

The following processes describe getting information from the Transformation and staging server 108 to the Data Warehouse server 104.

There are two methods for loading information on the Data Warehouse server 104 in order to:

1) Minimize as much as possible the "down time" for the end users

2) Eliminate the possibility of "dirty reads" of the information in the tables

The two methods is referred to as the "Round Robin" approach and the "See-Saw" approach.

Generally, the "Round Robin" approach is used for Refresh processing and extracts information from permanent tables. It minimizes the "down-time" for the users to a time frame of seconds, but requires two copies of a table. Therefore, it is best for Refresh processing because one table can store the information the users see and one is empty for loading. This approach can be used for Non-Refresh processing, but both copies of the table would need to be kept in sync and both would need to contain all of the information. This is only recommended for situations where the "down time" for the users absolutely needs to be kept to seconds and there is appropriate disk space to store two copies of the information.

Generally, the "See-Saw" approach is used for Non-Refresh processing and extracts information from temporary tables. The "down time" for this approach can be a few minutes to 30 minutes, but this approach only requires one copy of a table. Therefore, it is best for Non-Refresh processing because only one complete copy of the table is needed.

| Associated System Flow Processes (FIG. 22-K) |
| --- |
| 7.0 Extract & Load Data Warehouse |

"Round Robin" Steps: (FIG. 22-K)
1.0 Export From Permanent Tables—Export information to NT flat files on the Transformation and staging server 108 selecting rows from the normalized, denormalized, and summary (permanent) tables.
2.0 Load Into Load Tables—Using MS SQL Server's BCP utility, load information into the normalized, denormalized, and summary load tables.
For Each Table:
3.0 Update Metadata to "Start Status"—Update the load statistics metadata on the Data Warehouse server 104 indicating that the information is in a "Loading" state.
4.0 Rename Permanent Table to Temporary Table—The current normalized, denormalized, or summary (permanent) table is renamed to the normalized, denormalized, or summary temporary table as a temporary holding area.
5.0 Rename Load Table to Permanent Table—The normalized, denormalized, or summary load table is renamed to the normalized, denormalized, or summary (permanent) table making the latest information available to the users.
6.0 Rename Temporary Table to Load Table—The normalized, denormalized, or summary temporary table is renamed to the normalized, denormalized, or summary load table to prepare for the next period's processing batch.
7.0 Update Metadata to "Finish Status" Update the load statistics metadata on the Data Warehouse server 104 indicating that the information is in a "Updated" state and update the date, time, number of records loaded, etc. End For Each Table:
8.0 Delete From Load Tables—Delete all of the information from the normalized, denormalized, and summary load tables to prepare for the next period's processing batch.

"See-Saw" Steps: (FIG. 22-L)
1.0 Export From Temporary Tables—Export information to NT flat files on the Transformation and staging server 108 selecting rows from the normalized, denormalized, and summary temporary tables.
For Each Table:
2.0 Update Metadata to "Start Status"—Update the load statistics metadata on the Data Warehouse server 104 indicating that the information is in a "Loading" state.
3.0 Rename Permanent Table to Load Table—The current normalized, denormalized, or summary (permanent) table is renamed to the normalized, denormalized, or summary load table.
4.0 Load Into Load Table—Using MS SQL Server's BCP utility, load information into the normalized, denormalized, or summary load table.
5.0 Rename Load Table to Permanent Table—The normalized, denormalized, or summary load table is renamed to the normalized, denormalized, or summary (permanent) table.
6.0 Update Metadata to "Finish Status"—Update the load statistics metadata on the Data Warehouse server 104 indicating that the information is in a "Updated" state and update the date, time, number of records loaded, etc.
End For Each Table:
History Processing
In some embodiments, historic information is stored on the Transformation and staging server 108. If historical information is stored on both the Data Warehouse server 104 and the Transformation and staging server 108, then processing follows the Non-Refresh processing approach on the Transformation and staging server 108 and the "See-Saw" approach on the Data Warehouse server 104. This is the standard combination of approaches.

However, if the historical information is stored on the Data Warehouse server 104 only and not on the Transformation and staging server 108, then the processing follows the Refresh processing on the Transformation and staging server 108. However, the processing follows a modified version of the "See-Saw" approach on the Data Warehouse server 104 by extracting information from a permanent table instead of a temporary table. The "Round Robin" approach can be used for history tables on the Data Warehouse server 104, but there are drawbacks to using this approach.

Application Architecture

Because of the robust functionality required in a data warehousing application solution, and due to the abundant software packages currently on the market that address one or more of these requirements, EIM will pursue the purchase of a third party product for use in reporting and analysis. The software vendor chosen to provide these products is MicroStrategy (see the Vendor Selection Process section elsewhere in this document). EIM will integrate the MicroStrategy 5.0 product suite into its solution.

EIM also provides the capability to consolidate financial information according to generally accepted accounting principles (GAAP).

Software Location
Client

The EIM application runs on personal computers (PCs) with Windows95™, Windows98™, or Windows NT™ operating systems. The application functionality is delivered through the PC's web browser. The only web browser that EIM supports in one preferred embodiment is Microsoft's Internet Explorer version 4.01 or greater. Generally, EIM's present embodiments operate on browsers with support for ActiveX controls and Visual Basic Scripting.

The report and graph viewing capabilities is delivered with the aid of the "DSS Graph" and "DSS Grid" ActiveX controls that are delivered with MicroStrategy's product set. In addition, the report creation and auto-prompting wizards are written as Java™ applets, provided by MicroStrategy. The remaining application functionality delivered by EIM is preferably through Dynamic HTML pages.

Web Server 106 Since EIM is a web-based solution, it requires a web server. The web server 106 that EIM integrates is preferably Microsoft's Internet Information Server (IIS) version 4.0 running on Windows NT 4.0. This web server provides built-in support for Active Server Pages, ISAPI server extensions, and CGI routines. EIM make use of all of these features in some form.

Active Server Pages—Any processing not taking place on the client's personal computer takes place on the web server 106 in the form of Active Server Pages (ASP). The ASP pages generate the DHTML necessary for the EIM application. They also initiate any online database update or access necessary for system administration.

ISAPI Sever Extensions—MicroStrategy's DSS Web 5.0 solution provides an ISAPI (Internet Server API) dynamic link library which will dynamically bind to Microsoft's IIS web server 106. This solution provides a much more efficient and robust access to web server 106 resources than does a CGI interface. All reporting and analysis functions (query, graph, drill, etc.) take place through this extension.

CGI—The MicroStrategy application server administration pages, provided with the MicroStrategy 5.0 product set, use the older CGI protocol when calling web server functions. While this technology is less efficient than ISAPI extensions or ASP pages, it is limited to administration functions and thus is not expected to place any burden upon the web server processing.

Windows NT services, backup, restore, and other system functions will preferably be performed by Windows NT and are not be provided by EIM. However, EIM makes use of these capabilities.

Electronic mail ("email") services are not provided with preferred embodiments of EIM. If an enterprise has email capabilities then EIM will interface with the existing system as long as it is MAPI compliant. (note: EIM currently does not use any email capabilities)

Database Access

Access to information residing within the EIM Data Warehouse is restricted to read-only access for all except system administration functions. For end users, this means that there can not be any update of information within the warehouse. However, in each case the user is presented with business terminology in selecting or defining their query and shielded from the actual database tables and columns.

The first access mechanism uses the MicroStrategy's DSS Server tool set. This tool set, embedded within the EIM solution, dynamically generates the SQL statements necessary to query the database for the requested information. It does this by first reading a metadata repository which cross-references the information that the query user is requesting with the actual tables and columns in the data warehouse. If necessary, several SQL queries are created and run against the warehouse and the result sets from those queries are combined and presented to the user as one unified information result. The data that is returned in these queries is always be the latest and most up to date information available. However, because the data warehouse is updated on an infrequent basis (see the Database Update Process section elsewhere in this document), once the results from the query have been obtained they are stored within a data cache. Subsequent requests for the same information retrieve the results from the cache rather than creating and executing SQL against the data warehouse. This greatly improves response time for query. While the System Administrator can configure the frequency with which the cache is emptied, it is expected that most installations will use the default of scheduling it in conjunction with the warehouse update process. The data cache can be configured to store the results in text files on a file server, in memory (less efficient), or even in a database separate from the warehouse.

The second access mechanism is used primarily for financial reporting. Financial statements are produced not only in printed or word processor forms but also in HTML. These HTML pages, static in nature, are accessible through the EIM system and allow an enterprise to distribute their financial statements and other financial reports electronically.

The third mechanism is used for system reporting like system and application statistics, security reports, and user access reports. The reports are produced through stored procedures that are accessible only from the EIM application. Like financial statements, these reports are produced in HTML output and presented to the user upon request.

Administrator Access

System Administrators have the ability to update a limited portion of the data used by the EIM system. The updates may be performed by stored procedures that are called from the EIM Active Server Pages. The information that may be available for this update is outlined in the "Application Administration" section of this document. It is important to point out that what the administrator can update is not the actual data in the warehouse. Updates is allowed to the metadata that is used for security and data mapping. The administrator may also need to modify the incoming transactions as they are loaded into the warehouse if any data integrity or other issues are discovered by the EIM load mechanism.

Data Models, Definitions, & Mapping

Data Staging Models

The staging area consists of a separate database that resides on the transformation and staging server 108. The staging tables within the database closely resemble the same design as the data warehouse. The staging database also consists of tables that are only used at the time of the transformation and cleansing process. These types of tables are used primarily for lookup purposes only and do not need to reside in the warehouse. By keeping the design of the databases fairly consistent, it should help increase the performance of the load process. The Data Warehouse Model is shown in FIG. 23-A. FIG. 25 depicts the logical data model according to embodiments of this invention.

Meta Data

Meta Data is "data about data". Meta Data provides a blueprint to users that detail the data. Meta Data also includes information regarding the common algorithms used in summarizing or processing data before it was integrated into the warehouse, the structure and formatting of the data to be published and actual volumes of data by major dimensions. Sagent and Microstrategy have their own Meta Data repositories therefore EIM provides a single point of entry to ensure a seamless interface for end-users. In addition to the Meta Data provided by the third party tools, EIM provides two types of Meta Data; Technical and Business.

Figure 26:
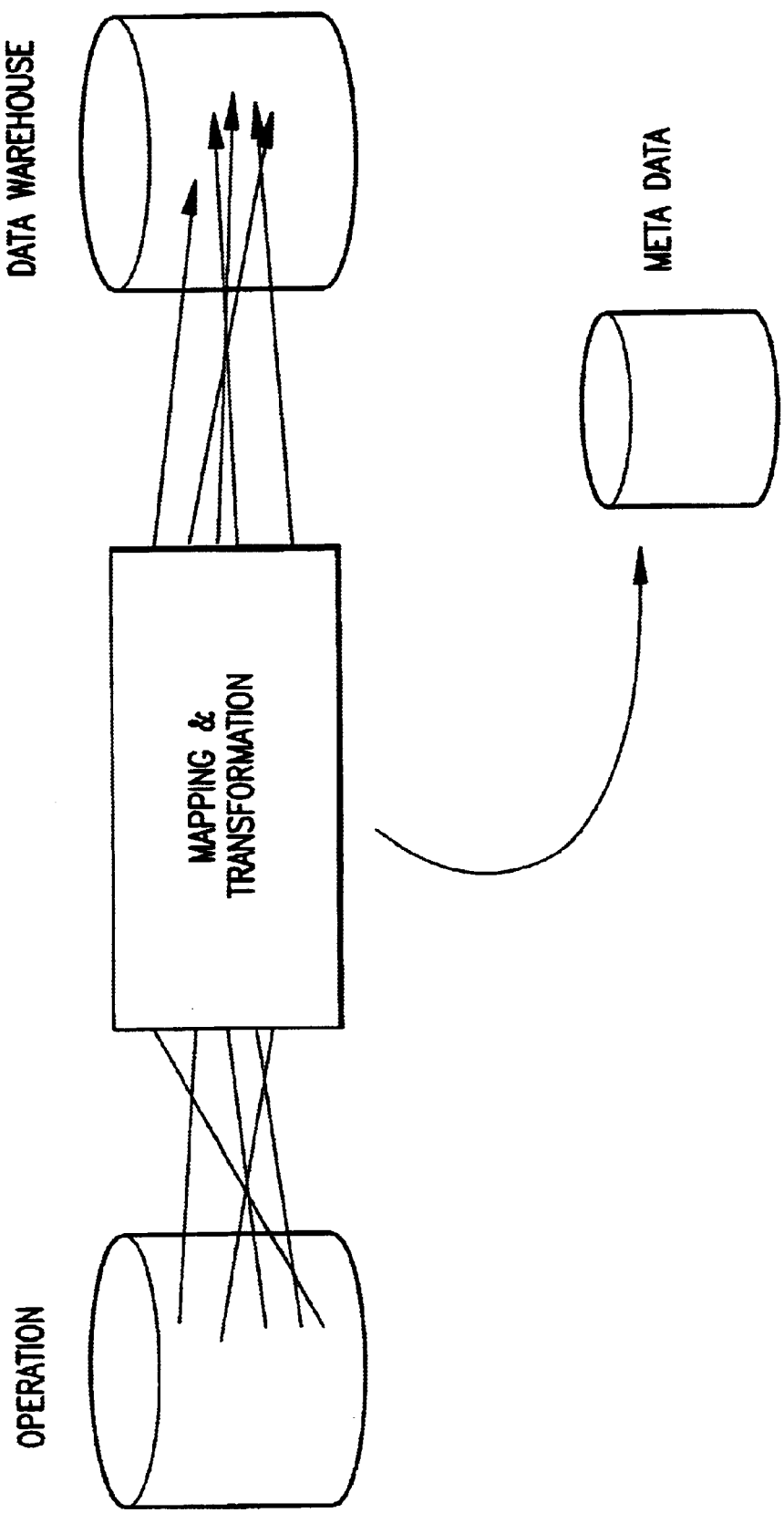
FIG. 26 depicts aspects of metadata analysis according to embodiments of this invention.

FIG. 26 depicts the point at which certain Meta Data elements is trapped during the Extraction and Transformation phase. The remainder of the Meta Data elements is provided by the front-end report and querying tool.

The following tables define some Meta Data elements of embodiments of this invention.

| Business Meta Data | |
| --- | --- |
| Field/Object Description | This includes the business term used to define the field and a long descriptive text defining the field. |
| Confidence Level | EIM provides levels of confidence. Examples: CEO worthy to "use at your own risk" levels |
| Frequency of Update | Indicates how often data is updated. Example: NIGHTLY, WEEKLY, END-OF-MONTH. |

Business Meta Data (continued)

| | |
|---|---|
| Valid Entries | defines all valid entries for a specified field. Example: Field A may contain values 1, 2 & 5) Field B may contain Null Data |
| Formats | Defines any required formatting of a data field. Example: Journal Date: May 10, 1998 |
| Business Rules | Rules used to calculate and derive the data. |
| Level of Summarization | Defines the algorithms for summarizing the detail data. |
| Field Type | Defines the data type of the field. Also where appropriate, we will include level of precision. Example: Data field is of type DECIMAL and it contains two digits to the right of the decimal. |

Technical Meta Data

| | |
|---|---|
| Source Field/Location | This is the physical field name and the name of the table from where it originated. |
| Target Field/Location | This is the physical field name and the name of the table where it resides in the warehouse. |
| Business Rules | Defines the business rules that were applied prior to loading the data field into the warehouse. |
| Source System Name | The name of the server where the data originated. |
| Extract program name and version | Contains the name of the Sagent Data Flow Plan and the version ID of the software. |
| Load Script Name | Contains the name of the Sagent Data Flow Plan. |
| Total number of records from source/ Total number of records rejected | Provides the total of records for incoming records and how many were rejected |
| Extract Dependencies | Provides information on any extract dependencies. Example: Program A on the source system must run on Data Set X prior to extracting. |
| Load Dependencies | Defines any load dependencies on a particular data set. Example: A dimension table must be loaded prior to loading a fact table. |
| Load Completion date/time stamp | Provides the execution date and time of a Sagent's Data Flow Plan. |
| Load Status | Provides the status of the plan whether it was completed or aborted. |
| Load Duration | Provides total time to run a Data Flow Plan. |
| Data Volumes | Will define how many available rows. This will help end-user to avoid submitting an unrealistic query. |
| Date Updated | Contains the date that the data was last updated in the actual database. |
| Utilization Statistics | Provides statistics on the use of data fields. Last time the field was accessed and by whom. |

Data Mapping

The tables in FIGS. 27(A)–27(Q) summarize data mapping according to embodiments of this invention.

ADP Data Mapping

The following files on the ADP system that need to extracted. In some embodiments, other files may need to be extracted.

ADP FILES:
 ACCT
 NAME-FILE
 TITLE
 DEAL
 DETAIL-GL
 CAR-INV
 TITLE
 BALANCE-FWD
 AR-OPEN
 AR-BAL
 DETAIL-FWD
 INVOICE

Queries and Reports

EIM provides many pre-created reports and charts from which the enterprise can choose. The reports cover all aspects of vehicle sales, financial, and vehicle inventory analysis. As identified in the "EIM Application Features" section many of these reports is tied together logically to produce an analysis path that will help the dealership or enterprise narrow down the information being viewed. Of course, the enterprise is able to modify these or create their own to achieve the exact analysis model that they desire.

Hardware

Server Hardware

The hardware necessary for EIM is directly dependent upon the volume of information being stored in the warehouse and the number of users that are attempting to access it. The table below captures the characteristics of the three market segments that embodiments of EIM target, and the hardware necessary to satisfy each. All hardware requirements are stated as minimum acceptable configurations.

Estimated Enterprise Data Volume

| | Small | Medium | Large |
|---|---|---|---|
| Number of stores | <10 | 6–40 | >40 |
| Estimated current data size | 10 GB | 75 GB | 200 GB |
| Estimated volume/year | 10 GB/year | 15 GB/year | 40 GB/year |
| Total number of users | 10 | 45 | 170 |
| Estimated concurrent users | 5 | 15 | 35 |

Database Server

The database server houses the data warehouse and performs all database processing.

| | Small | Medium | Large |
|---|---|---|---|
| CPU | Dual Pentium II 300 | Quad Pentium Pro 200 | Quad Pentium Pro 200 |
| Memory (RAM) | 512 MB | 1 GB | 1 GB |
| Estimated disk space (database) | 1–45 GB RAID | 1–136 GB RAID | 1–309 GB RAID |
| Estimated disk space (additional) | 2–4.2 GB | 4–4.2 GB | 4–4.2 GB |

Application Server

The application sever is where the MicroStrategy DSS Server processes the user's request, formulates the SQL query, executes the query against the database, and compiles the results for return to the user. As mentioned earlier, the result sets returned from the database is cached to either disk or a database. The default setting is to cache them to text files on one of this machine's additional disk devices.

In all but very large enterprises, the processing described for this machine will take place on the database server. In large enterprises the number of concurrent users dictates that a separate server be installed to handle this processing.

Estimated Configuration

|  | Small | Medium | Large |
| --- | --- | --- | --- |
| CPU |  |  | Dual Pentium II 300 |
| Memory (RAM) |  |  | 512 MB |
| Estimated disk space (database) |  |  | N/A |
| Estimated disk space (additional) |  |  | 4–9.1 GB |

Web Server 106

The web server 106 is the interface between the client personal computers and the EIM application. All of the Active Server Pages developed for EIM execute on this machine, as well as the MicroStrategy DSS Web software. DSS Web will interpret the requests coming from the web browser and translate it into one or more calls to the Application Server.

Estimated Configuration

|  | Small | Medium | Large |
| --- | --- | --- | --- |
| CPU | Pentium II 300 | Dual Pentium II 300 | Dual Pentium II 300 |
| Memory (RAM) | 512 MB | 512 MB | 512 MB |
| Estimated disk space (database) | N/A | N/A | N/A |
| Estimated disk space (additional) | 2–4.2 GB | 2–4.2 GB | 2–4.2 GB |

Transformation and Staging Server 108

The transformation and staging server 108 integrates all of the transactional information from operational systems' databases. All cleansing activities takes place on this machine. There may also be a subset of the data warehouse resident on this machine to speed up the cleansing and database key lookup functions. The Sagent solution executes on this machine to perform the cleansing.

Estimated Configuration

|  | Small | Medium | Large |
| --- | --- | --- | --- |
| CPU | Pentium II 300 | Dual Pentium II 300 | Dual Pentium II 300 |
| Memory (RAM) | 512 MB | 512 MB | 512 MB |
| Estimated disk space (database) | N/A | N/A | N/A |
| Estimated disk space (additional) | 2–4.2 GB | 2–4.2 GB | 4–9.1 GB |

Data Extraction Workstation (ADP System Integration only)

When integrating with existing ADP systems, the preferred embodiment deploys a dedicated data extraction workstation, one per ADP server. The data extraction workstation executes the application on a frequent, scheduled basis, and create difference files of new data. These files are uploaded to the EIM data-warehouse using FTP.

Operating System
    Windows NT Workstation
Application
    EIM Parsing Application
Network Protocol
    TCP/IP
Network Settings
    DHCP or Static IP Address. Default setting should be DHCP enabled.
Client Hardware
    Minimum Acceptable Configuration
    Pentium 166 MHz CPU
    32 MB RAM
    15" monitor—800×600 resolution with 256 colors
    Windows 95 operating system
    Optimized Configuration
    Pentium II 266 MHz CPU
    64MB RAM
    17" monitor—1024×768 resolution with 256 colors
    Windows 98 operating system
Network The EIM system functions as an application server with an embedded database management system. The hardware and networking services provided by the EIM system only supplies the services needed to deliver the data warehousing applications and integrate with the existing DMS system infrastructure.

Network functions such as user security and authentication, electronic mail, file and print services, fax services, etc, are assumed to be provided as part of the existing dealership management system. For example, if the existing infrastructure provides electronic mail through a proprietary package that does not support current industry standards such as the Messaging Application Programming Interface (MAPI), then mail-enabled features, if any, will not be available. The email feature within ERA is an example of a proprietary solution that does not support MAPI.

Network Settings
    Static IP Address I Subnet Setting
Name Resolution
    Assume static name resolution.
    WINS client is automatic
    DNS not installed
Local Area Network The EIM server(s) participate in the Windows Network as "workgroup servers". Existing servers provides the Domain Controller functions for user authentication and login. In this scenario, the EIM server(s) and workstations naturally form a "Windows workgroup". Microsoft "share level" security is sufficient to provide authentication for the limited number of users. The database server must control data access.

Wide Area Network

The wide-area network is assumed to be a private virtual network. Access through the Internet is not assumed, unless done through a service such as Point to Point Tunneling Protocol (PPTP). Public access to the data warehouse where all corporate records are available is too risky to be feasible.

Peripherals and Services
Printers

EIM server shall access existing printers within the dealership network. The following chart shows integration points for printing services:

Electronic Mail (E-Mail)

The EIM Server will not provide electronic mail services. Mail enabled EIM applications shall interface with any existing enterprise email service if available on the dealership network through the Mail Application Programming Interface (Simple-MAPI).

System Administration

Scheduling

The Scheduling process for data flow plans is handled by Sagent's Automation tool. Sagent's automation tool includes an event-driven scheduler along with remote administration features.

The capabilities provided with the automation tool include starting a data flow plan based upon time (at a certain hour, on specified day, or upon an interval) without intervention. This feature allows for EIM to schedule the execution of plans at a specific time without interfering with the peak usage of the source system. Plans can also be started based upon an event. This allows data sets to be loaded in a specific order and also to help prevent any problems that may occur if a critical plan does not complete.

It will also monitor the network and Windows NT system (processes, services, file-systems, Event Viewer, databases) and take any action based upon conditions defined. EIM will use these features to monitor performance and provide error reporting for support purposes. The tool can also be managed remotely, which is also beneficial from a support viewpoint.

Figure 28:
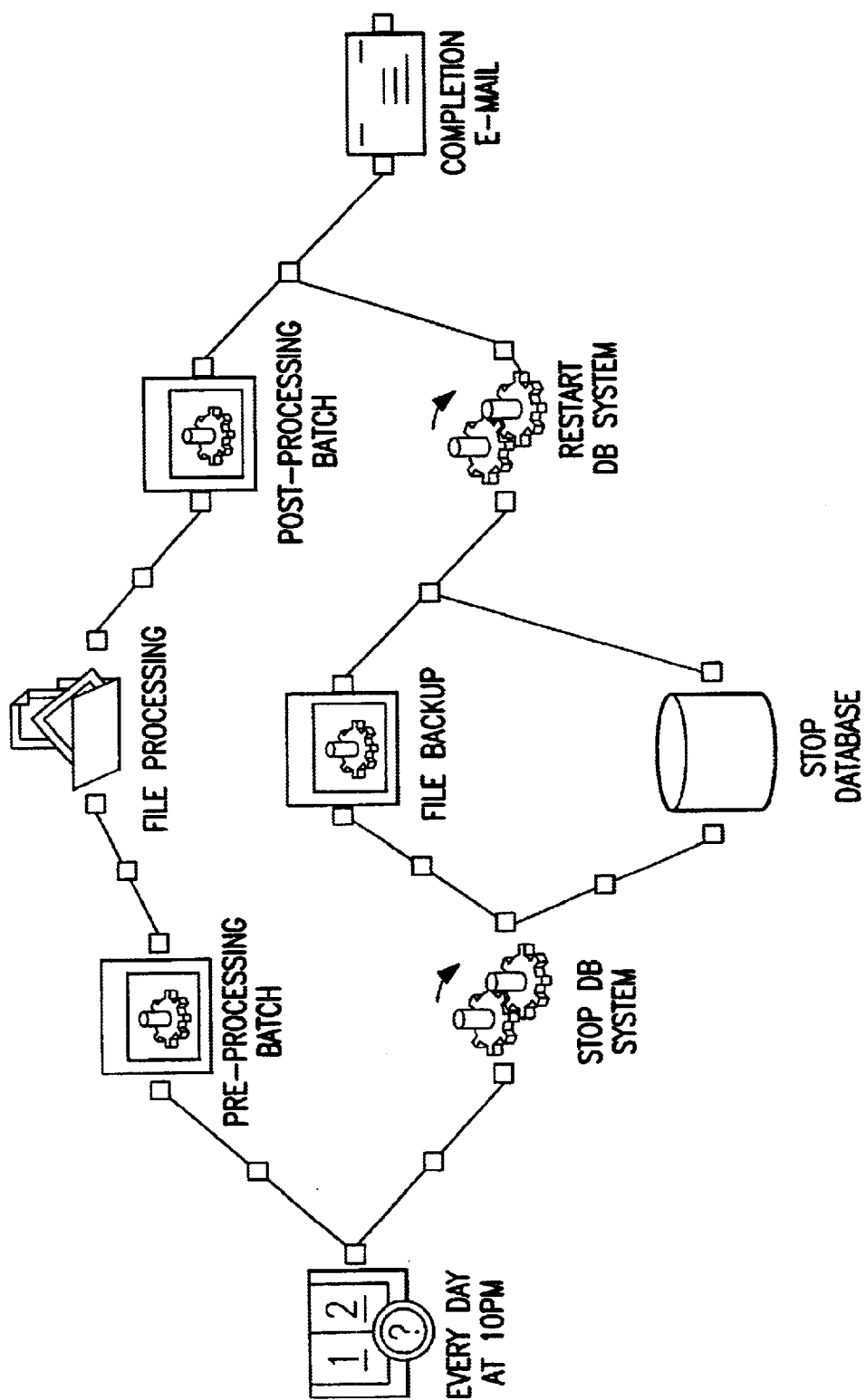
FIG. 28 depicts an example of setting up scheduled events and tasks according to embodiments of the present invention.

FIG. 28 depicts an example of setting up scheduled events and tasks.

Data Loans

The volume of data being extracted from the operational systems can be quite large. Therefore, EIM will determine how often to refresh the data after the initial load of the warehouse. This will depend on the grain of the most detailed fact table. If the grain of the fact table is daily, we will refresh daily. However, if the most detailed facts are summarized at the month level, then it only makes sense to pull this detail monthly. The general rule is that fact tables are more frequently updated than dimension tables. This is because fact table data in a decision support database is typically historical, and requires regular additions and updates to remain current.

Backup and Recovery

Overview

The EIM solution will use the backup utilities and procedures defined in the Service Readiness Solution Specification as much as possible and where applicable. In general, their solution is to use the custom backup and restore using SQL Server utilities written by EGIS and some additional maintenance and housekeeping scripts. Their solution is defined to do full system backups on a nightly basis. Due to the size and nightly batch updating processes defined for the EIM solution, the Service Readiness solution can not be fully used as defined. However, their solution is used when full system backups are done for EIM and the maintenance and housekeeping scripts is used as much as possible.

Full System Backups

The Full System backup is of all NT files, folders, registry, and databases as defined in the Service Readiness Solution Specification.

Frequency

Monthly and on-request with EIM upgrades.

Retention

One tape generation on-site. One tape generation off-site.

Database Backups

Database backups is a combination of full and incremental backups of the Microsoft SQL Server databases that are most frequently updated. These databases is the EIM__Staging, EIM__Error, EIM__Financial, and EIM__Sagent Repository on the Transformation and staging server 108 and the EIM__Meta__Views and EIM__DW on the Data Warehouse server 104. Incremental database backups in Microsoft SQL Server 7.0 include all transactions since the last full backup. Therefore, it is only necessary to keep the latest copy of an incremental backup between full backups using MS SQL Server's utilities.

Frequency

Daily—Incremental backups

Weekly—Full database backups

Procedures

Use Microsoft SQL Server 7.0's database backup facilities in combination with as many of the Service Readiness procedures and scripts as possible.

Retention

One tape generation on-site and one tape generation off-site for each the Incremental and Full database backups.

System File Backups

System file backups will normally be taken care of with the Full System backups defined above. However, if there are highly volatile table requiring a more frequent backup, then an additional backup will need to be performed of only those files. An example with EIM is a backup of all of the Windows NT extract files that contain source system information used to load/update the Data Warehouse each night.

Frequency

Daily

Procedures

Use all of the backup procedures and scripts defined in the Service Readiness Solution Specification, but only perform the backup on directories or files that need backed up on a daily basis.

Retention

Five tape generations on-site.

Thus, methods, systems and devices for enterprise information management are provided. One skilled in the art will appreciate that the present invention can be practiced by other than the described embodiments, which are presented for purposes of illustration and not limitation, and the present invention is limited only by the claims that follow.

We claim:

1. A system for enterprise information management, comprising:

a data warehouse server;

a transformation and staging server connected to the data warehouse server for providing transformed and cleansed data to the data warehouse server;

a data source application connected to the transformation and staging server to provide data to the transformation and staging server;

a financial consolidation application connected to the transformation and staging server for performing consolidation and reporting of financial data;

a web server connected to the data warehouse server; and a plurality of clients connectable to the web server for accessing data from the data warehouse server via the web server, wherein a client accessing the data warehouse server via the web server is presented with a login screen and is required to provide a valid user identifier and password in order to access the system, and wherein, upon authentication of the user identifier and password, a new browser window is opened at the client and the client is presented with a user interface (UI) tailored to the client's preferences and security privileges, wherein the UI comprises,
 a task list,
 buttons/controls for launching components of the system, and
 a content area for task related data and output, wherein each item listed in the task list has supporting screens that populate the content area, wherein the UI provides access to performance indicators through home paves made up of one to four reports or graphs displayed on the content area, and wherein clients are provided with a set of predefined drill paths or next steps for the user to follow in analyzing their data, wherein the predefined next steps display additional reports with new, more detailed, or related information to a report currently being viewed.

2. A system as in claim 1 wherein the transformation and staging server obtains data from the data source application via requests and places the data into temporary staging tables to prepare for the transformation and cleansing process prior to movement of the data to the data warehouse server.

3. A system as in claim 1 wherein the transformation and staging server includes the following databases and files:
 a master database that contains all system tables;
 a model database template for the creation of all new databases;
 a staging database which contains all data from systems that is being or has been cleansed, transformed, denormalized, summarized;
 an error database which contains source information that could not automatically be cleansed or transformed;
 a financial database used by the financial consolidation application and containing consolidated and summarized financial information;
 at least one flat file for loads;
 a repository database used by the transformation tool and containing information regarding the transformation procedures and automation plans; and
 a temporary work area for the creation of temporary tables and information.

4. A system as in claim 3 wherein the transformation and staging server comprises:
 four physical disk drives and wherein the physical disk drives for the transformation and staging server, are separated by individual logical drives.

5. A system as in claim 4 wherein the disk drives serve separate purposes and functionality of the system has been separated by drive so as to minimize disk contention during the various process that run on the transformation and staging server.

6. A system as in claim 1 wherein the data warehouse server includes the following databases and files:
 a master database that contains all of the system tables on the data warehouse server;
 a model database template for the creation of all new databases on the data warehouse server;
 a temporary database used as a temporary work area for the creation of temporary tables and information on the data warehouse server;
 a meta-view database that contains all of the metadata, views, and stored procedures that are to be used by the users of the system; and
 a database that contains some normalized data, but mostly denormalized and summarized data that has been cleansed, transformed on the transformation and staging server.

7. A system as in claim 6 wherein the meta-view database is the sole access method for users to the information in the database.

8. A system as in claim 6 wherein the data warehouse server comprises a plurality of physical disk drives combined into one logical drive to take full advantage of Redundant Array of Independent Disks (RAID) technology.

9. A system as in claim 1 wherein the data relate to automobiles.

10. A system as in claim 1 wherein the home pages can be customized.

11. A system for enterprise information management, comprising:
 a data warehouse server;
 a transformation and staging server connected to the data warehouse server for providing transformed and cleansed data to the data warehouse server;
 a data source application connected to the transformation and staging server to provide data to the transformation and staging server;
 a financial consolidation application connected to the transformation and staging server for performing consolidation and reporting of financial data;
 a web server connected to the data warehouse server; and
 a plurality of clients connectable to the web server for accessing data from the data warehouse server via the web server, wherein a client accessing the data warehouse server via the web server is presented with a login screen and is required to provide a valid user identifier and password in order to access the system, and wherein, upon authentication of the user identifier and password, a new browser window is opened at the client and the client is presented with a user interface (UI) tailored to the client's preferences and security privileges, wherein the UI comprises,
 a task list,
 buttons/controls for launching components of the system, and
 a content area for task related data and output, wherein each item listed in the task list has supporting screens that populate the content area, wherein the UI provides access to performance indicators through home pages made up of one to four reports or graphs displayed on the content area, wherein clients are provided with a set of predefined drill paths or next steps for the user to follow in analyzing their data, wherein the predefined next steps display additional reports with new, more detailed, or related information to a report currently being viewed, and wherein predefined next step buttons are only provided with the original reports provided with the system.

12. A system as in claim 11, wherein the data relate to automobiles.

13. A method for enterprise information management, comprising:
 providing an enterprise information management system, the system comprising a data warehouse server, a transformation and staging server connected to the data warehouse server for providing transformed and cleansed data to the data warehouse server, a data source application connected to the transformation and staging server to provide data to the transformation and staging server, a financial consolidation application connected to the transformation and staging server for performing consolidation and reporting of financial data, a web server connected to the data warehouse server, and a plurality of clients connectable to the web server for accessing data from the data warehouse server via the web server;

by the transformation and staging server:
retrieving operational data from the data source application using a data flow plan;
validating and cleansing the retrieved operational data;
loading the data into an appropriate temporary staging table; and performing a second phase of validations and cleansing, including referential integrity validations and aggregate processing validations; and loading information from the transformation and staging server on the data warehouse server, wherein the loading of information comprises one of:
a round-robin approach used for refresh processing and extracting information from permanent tables; and
a see-saw approach used for non-refresh processing and extracting information from temporary tables, wherein the round-robin approach comprises:
(a) exporting information to flat files on the transformation and staging server, selecting rows from normalized, denormalized, and summary tables,
(b) loading information into the normalized, denormalized, and summary load tables;
(c) for each table
(c1) updating load statistics metadata on the data warehouse server, indicating that the information is in a "loading" state;
(c2) renaming the current table to a temporary table as a temporary holding area;
(c3) renaming the load table to the actual table, making the latest information available to the users;
(c4) renaming the temporary table to the load table to prepare for the next period's processing batch;
(c5) updating the load statistics metadata on the data warehouse server indicating that the information is in a "updated" state and updating the date, time, number of records loaded; and
(d) deleting all of the information from the normalized, denormalized, and summary load tables to prepare for the next period's processing batch.

14. A method as in claim 13 further comprising:
writing data with an error to an error table along with an error message describing a reason for rejection.

15. A method as in claim 14 further comprising: correcting errors and reprocessing the data.

16. A method as in claim 13 wherein the validations and transformations performed include at least one of:
checking for absence of data;
checking data typing;
checking free form text fields;
checking multipurpose fields;
checking dummy values entered in a mandatory field;
checking for contradicting data;
checking violation of business rules;
checking data anomalies;
restructuring operational keys;
checking data integrity;
supplying default values;
renaming data elements moved from the operational environment to the data warehouse;
data format conversion; and
aggregating data values.

17. A method as in claim 13 wherein the round-robin approach is used if the system requires minimal down time.

18. A method as in claim 13, wherein the data relate to automobiles.

19. A method for enterprise information management, comprising:

providing an enterprise information management system comprising a data warehouse server, a transformation and staging server connected to the data warehouse server for providing transformed and cleansed data to the data warehouse server, a data source application connected to the transformation and staging server to provide data to the transformation and staging server, a financial consolidation application connected to the transformation and staging server for performing consolidation and reporting of financial data, a web server connected to the data warehouse server, and a plurality of clients connectable to the web server for accessing data from the data warehouse server via the web server;

by the transformation and staging server:
retrieving operational data from the data source application using a data flow plan;
validating and cleansing the retrieved operational data;
loading the data into an appropriate temporary staging table; and performing a second phase of validations and cleansing, including referential integrity validations and aggregate processing validations; and loading information from the transformation and staging server on the data warehouse server, wherein the loading of information comprises one of:
a round-robin approach used for refresh processing and extracting information from permanent tables; and
a see-saw approach used for non-refresh processing and extracting information from temporary tables, wherein the see-saw approach comprises:
(a) exporting information to flat files on the transformation and staging server, selecting rows from the normalized, denormalized, and summary temporary tables;
(b) for each table of the normalized, denormalized, and summary temporary tables:
(b1) updating the load statistics metadata on the data warehouse server indicating that the information is in a "loading" state;
(b2) renaming the current table load table;
(b3) loading information into the load table;
(b4) renaming the load table to the permanent table; and
(b5) updating the load statistics metadata on the data warehouse server indicating that the information is in a "updated" state and updating the date, time, number of records loaded.

20. A method as in claim 19 further comprising:
storing historic information on the transformation and staging server.

21. A method as in claim 19, wherein the data relate to automobiles.

22. A method for enterprise information management, comprising:

provrding an enterprise information management system comprising a data warehouse server, a transformation and staging server connected to the data warehouse server for providing transformed and cleansed data to the data warehouse server, a data source application connected to the transformation and staging server to provide data to the transformation and staging server, a financial consolidation application connected to the transformation and staging server for performing consolidation and reporting of financial data, a web server connected to the data warehouse server, and a plurality of clients connectable to the web server for accessing data from the data warehouse server via the web server;

by the transformation and staying server:

retrieving operational data from the data source application using a data flow plan;

validating and cleansing the retrieved operational data;

loading the data into an appropriate temporary staging table; and performing a second phase of validations and cleansing, including referential integrity validations and aggregate processing validations; and loading information from the transformation and staging server on the data warehouse server, wherein the loading of information comprises one of:

a round-robin approach used for refresh processing and extracting information from permanent tables: and a see-saw approach used for non-refresh processing and extracting information from temporary tables, and storing historical information on both the data warehouse server and the transformation and staging server, and using the non-refresh processing approach on the transformation and staging server and the see-saw approach on the data warehouse server.

23. A method as in claim 22, wherein the data relate to automobiles.

24. A computerized record-keeping system that tracks and records transactions of a method for enterprise information management, comprising:

providing a system for enterprise information management comprising a data warehouse server, a transformation and staging server connected to the data warehouse server for providing transformed and cleansed data to the data warehouse server, a data source application connected to the transformation and staging server to provide data to the transformation and staging server, a financial consolidation application connected to the transformation and staging server for performing consolidation and reporting of financial data, a web server connected to the data warehouse server, and a plurality of clients connectable to the web server for accessing data from the data warehouse server via the web server;

by the transformation and staging server:

retrieving operational data from the data source application using a data flow plan;

validating and cleansing the retrieved operational data;

loading the data into an appropriate temporary staging table; and performing a second phase of validations and cleansing, including referential integrity validations and aggregate processing validations; and loading information from the transformation and staging server on the data warehouse server, wherein the loading of information comprises one of:

a round-robin approach used for refresh processing and extracting information from permanent tables, and a see-saw approach used for non-refresh processing and extracting information from temporary tables, wherein the round-robin approach comprises:

(a) exporting information to flat files on the transformation and staging server, selecting rows from normalized, denormalized, and summary tables;

(b) loading information into the normalized, denormalized, and summary load tables;

(c) for each table:

(c1) updating load statistics metadata on the data warehouse server, indicating that the information is in a "loading" state;

(c2) renaming the current table to a temporary table as a temporary holding area;

(c3) renaming the load table to the actual table, making the latest information available to the users;

(c4) renaming the temporary table to the load table to prepare for the next period's processing batch; and (c5) updating the load statistics metadata on the data warehouse server indicating that the information is in a "updated" state and updating the date, time, number of records loaded; and (d) deleting all of the information from the normalized, denormalized, and summary load tables to prepare for the next period's processing batch.

25. A system as in claim 24 where the method further comprises:

writing data with an error to an error table along with an error message describing a reason for rejection.

26. A system as in claim 25 where the method further comprises correcting errors and reprocessing the data.

27. A system as in claim 24 wherein the validations and transformations performed include at least one of:

checking for absence of data;

checking data typing;

checking free form text fields;

checking multipurpose fields;

checking dummy values entered in a mandatory field;

checking for contradicting data;

checking violation of business rules;

checking data anomalies;

restructuring operational keys;

checking data integrity;

supplying default values;

renaming data elements moved from the operational environment to the data warehouse, data format conversion; and aggregating data values.

28. A system as in claim 24 wherein the round-robin approach is used if the system requires minimal down time.

29. A computerized record-keeping system that tracks and records transactions of a method for enterprise information management, comprising:

providing a system for enterprise information management comprising a data warehouse server, a transformation and staging server connected to the data warehouse server for providing transformed and cleansed data to the data warehouse server, a data source application connected to the transformation and staging server to provide data to the transformation and staging server, a financial consolidation application connected to the transformation and staging server for performing consolidation and reporting of financial data, a web server connected to the data warehouse server, and a plurality of clients connectable to the web server for accessing data from the data warehouse server via the web server;

by the transformation and staging server:
  retrieving operational data from the data source application using a data flow plan;
  validating and cleansing the retrieved operational data;
  loading the data into an appropriate temporary staging table; and
  performing a second phase of validations and cleansing, including referential integrity validations and aggregate processing validations; and
loading information from the transformation and staging server on the data warehouse server,
wherein the loading of information comprises one of:
  a round-robin approach used for refresh processing and extracting information from permanent tables, and
  a see-saw approach used for non-refresh processing and extracting information from temporary tables,
wherein the see-saw approach comprises:
  (a) exporting information to flat files on the transformation and staging server, selecting rows from the normalized, denormalized, and summary temporary tables;
  (b) for each table of the normalized, denormalized, and summary temporary tables:
    (b1) updating the load statistics metadata on the data warehouse server indicating that the information is in a "loading" state;
    (b2) renaming the current table load table;
    (b3) loading information into the load table;
    (b4) renaming the load table to the permanent table; and
    (b5) updating the load statistics metadata on the data warehouse server indicating that the information is in a, "updated" state and updating the date, time, number of records loaded.

30. A system as in claim 29 wherein the method further comprises:
  storing historic information on the transformation and staging server.

31. A computerized record-keeping system that tracks and records transactions of a method for enterprise information management, comprising:
  providing a system for enterprise information management comprising a data warehouse server, a transformation and staging server connected to the data warehouse server for providing transformed and cleansed data to the data warehouse server, a data source application connected to the transformation and staging server to provide data to the transformation and staging server, a financial consolidation application connected to the transformation and staging server for performing consolidation and reporting of financial data, a web server connected to the data warehouse server, and a plurality of clients connectable to the web server for accessing data from the data warehouse server via the web server;
  by the transformation and staging server:
    retrieving operational data from the data source application using a data flow plan;
    validating and cleansing the retrieved operational data;
    loading the data into an appropriate temporary staging table; and
    performing a second phase of validations and cleansing, including referential integrity validations and aggregate processing validations;
  loading information from the transformation and staging server on the data warehouse server;
  wherein the loading of information comprises one of:
    a round-robin approach used for refresh processing and extracting information from permanent tables, and
    a see-saw approach used for non-refresh processing and extracting information from temporary tables,
  further comprising storing historical information on both the data warehouse server and the transformation and staging server, and using the non-refresh processing approach on the transformation and staging server and the see-saw approach on the data warehouse server.

32. A system for enterprise information management comprising:
  a data warehouse server;
  a transformation and staging server connected to the data warehouse server for providing transformed and cleansed data to the data warehouse server;
  a data source application connected to the transformation and staging server to provide data to the transformation and staging server;
  a financial consolidation application connected to the transformation and staging server for performing consolidation and reporting of financial data;
  a web server connected to the data warehouse server; and
  a plurality of clients connectable to the web server for accessing data from the data warehouse server via the web server,
  wherein a client accessing the data warehouse server via the web server is presented with a login screen and is required to provide a valid user identifier and password in order to access the system, and wherein, upon authentication of the user identifier and password, a new browser window is opened at the client and the client is presented with a user interface (UI) tailored to the client's preferences and security privileges,
  wherein the UI comprises,
    a task list.
    buttons/controls for launching components of the system, and
    a content area for task related data and output, wherein each item listed in the task list has supporting screens that populate the content area,
  wherein the UI provides access to performance indicators through home pages made up of reports or graphs displayed on the content area, and
  wherein the UI provides an exception folder to store at least one exception report satisfying at least one exception condition defined by a user, wherein the at least one exception condition has an associated color identifier and cannot be changed by a user when the at least one exception report is run.

33. A system as in claim 32, wherein the at least one exception condition has an associated textual description.

34. A system as in claim 32, wherein contents of the exception folder are automatically processed on a nightly basis.

* * * * *